United States Patent
Lee et al.

(10) Patent No.: US 9,313,378 B2
(45) Date of Patent: Apr. 12, 2016

(54) IMAGE PROCESSING APPARATUS AND METHOD OF CAMERA

(71) Applicant: Samsung Electronics Co. Ltd., Suwon-si, Gyeonggi-do (KR)

(72) Inventors: Yonggu Lee, Seoul (KR); Jinaeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 13/862,748

(22) Filed: Apr. 15, 2013

(65) Prior Publication Data

US 2013/0271621 A1    Oct. 17, 2013

(30) Foreign Application Priority Data

Apr. 16, 2012   (KR) .................. 10-2012-0039076
Jan. 17, 2013   (KR) .................. 10-2013-0005222

(51) Int. Cl.
| | |
|---|---|
| *H04N 5/228* | (2006.01) |
| *H04N 5/225* | (2006.01) |
| *H04N 5/232* | (2006.01) |
| *G06K 9/36* | (2006.01) |
| *G06K 9/46* | (2006.01) |

(52) U.S. Cl.
CPC .............. *H04N 5/225* (2013.01); *H04N 5/232* (2013.01)

(58) Field of Classification Search
CPC . H04N 1/2104; H04N 1/2112; H04N 1/2137; H04N 1/2141; H04N 1/2145; H04N 5/232; H04N 5/2628; H04N 5/772
USPC ............................................... 382/232
See application file for complete search history.

(56) References Cited

U.S. PATENT DOCUMENTS

| | | | |
|---|---|---|---|
| 4,714,963 A | 12/1987 | Vogel | |
| 2002/0054229 A1 | 5/2002 | Sasaki | |
| 2004/0070679 A1 | 4/2004 | Pope | |
| 2006/0050082 A1 | 3/2006 | Jeffrey | |
| 2008/0187235 A1* | 8/2008 | Wakazono et al. | 382/255 |
| 2009/0015701 A1 | 1/2009 | Noh | |
| 2010/0321530 A1* | 12/2010 | Baek | 348/231.99 |
| 2011/0261217 A1* | 10/2011 | Muukki et al. | 348/222.1 |
| 2011/0261228 A1* | 10/2011 | Peng et al. | 348/231.6 |

* cited by examiner

*Primary Examiner* — Kelly L Jerabek
(74) *Attorney, Agent, or Firm* — Jefferson IP Law, LLP

(57) ABSTRACT

An image processing apparatus and method of a camera is provided for compensating for shutter lag. An image processing apparatus includes an image scaler which scales a camera output image to a viewing image, a buffer which buffers the camera output image, a multiplexer which multiplexes outputs of the image scaler and the buffer, an image processor which processes multiplexed images corresponding to the multiplexed outputs of the image scaler and the buffer, a demultiplexer which demultiplexes an output of the image processor so as to supply the viewing image to a display unit, a codec which encodes the camera output image output by the demultiplexer into a capture image, and a controller which controls the multiplexer and the demultiplexer in a time divisional manner within a frame duration such that the image processor processes the viewing and camera output image sequentially in a capture mode.

36 Claims, 34 Drawing Sheets

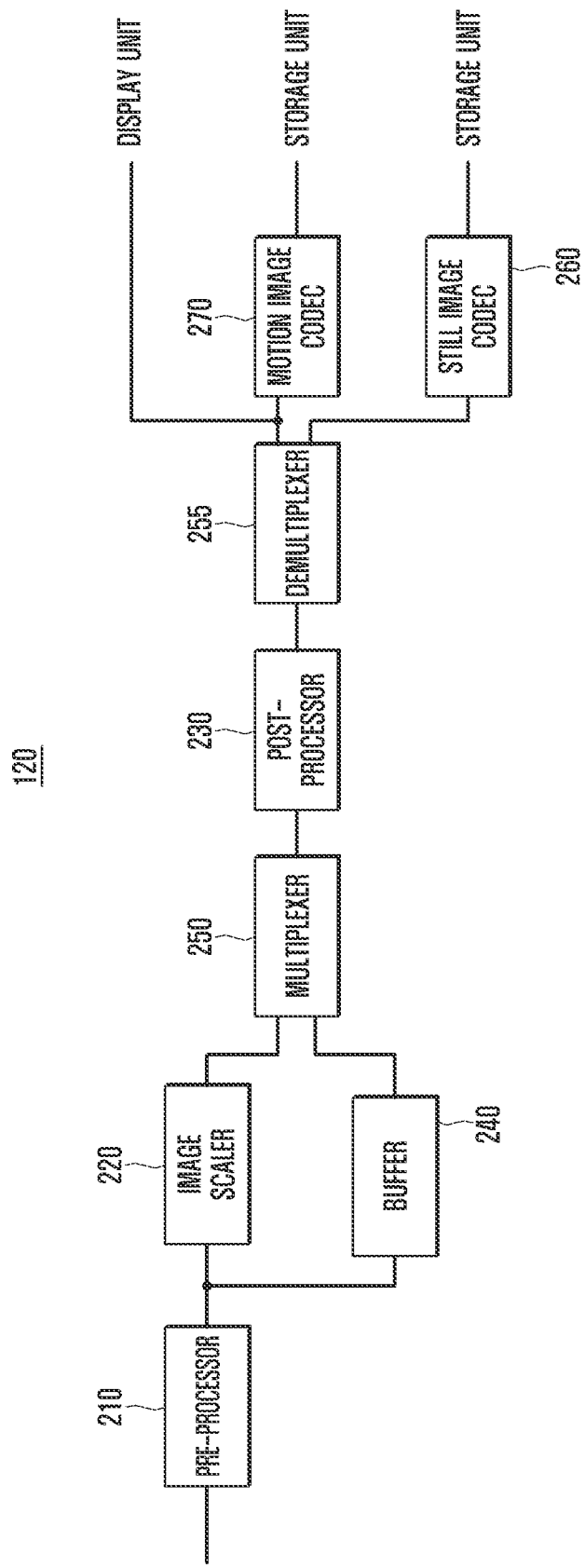

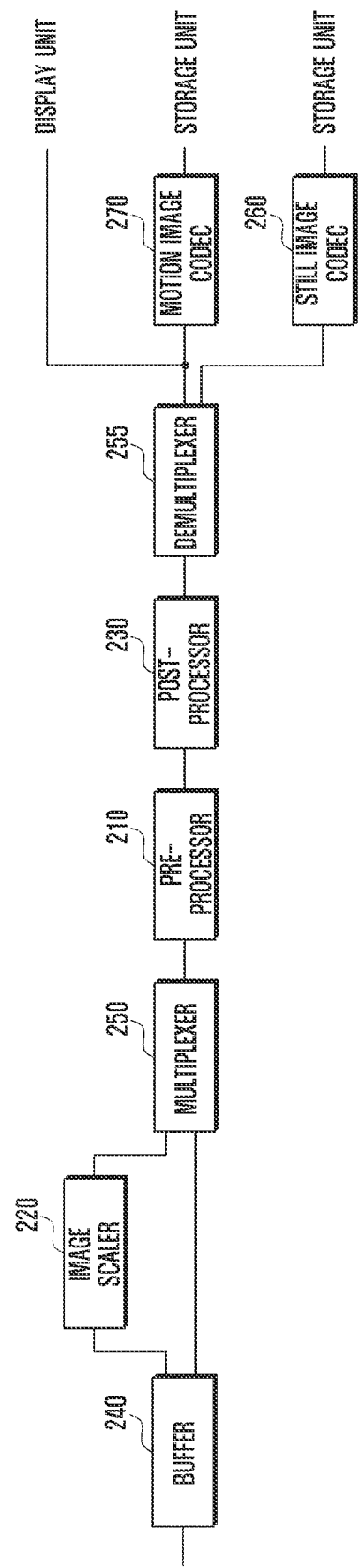

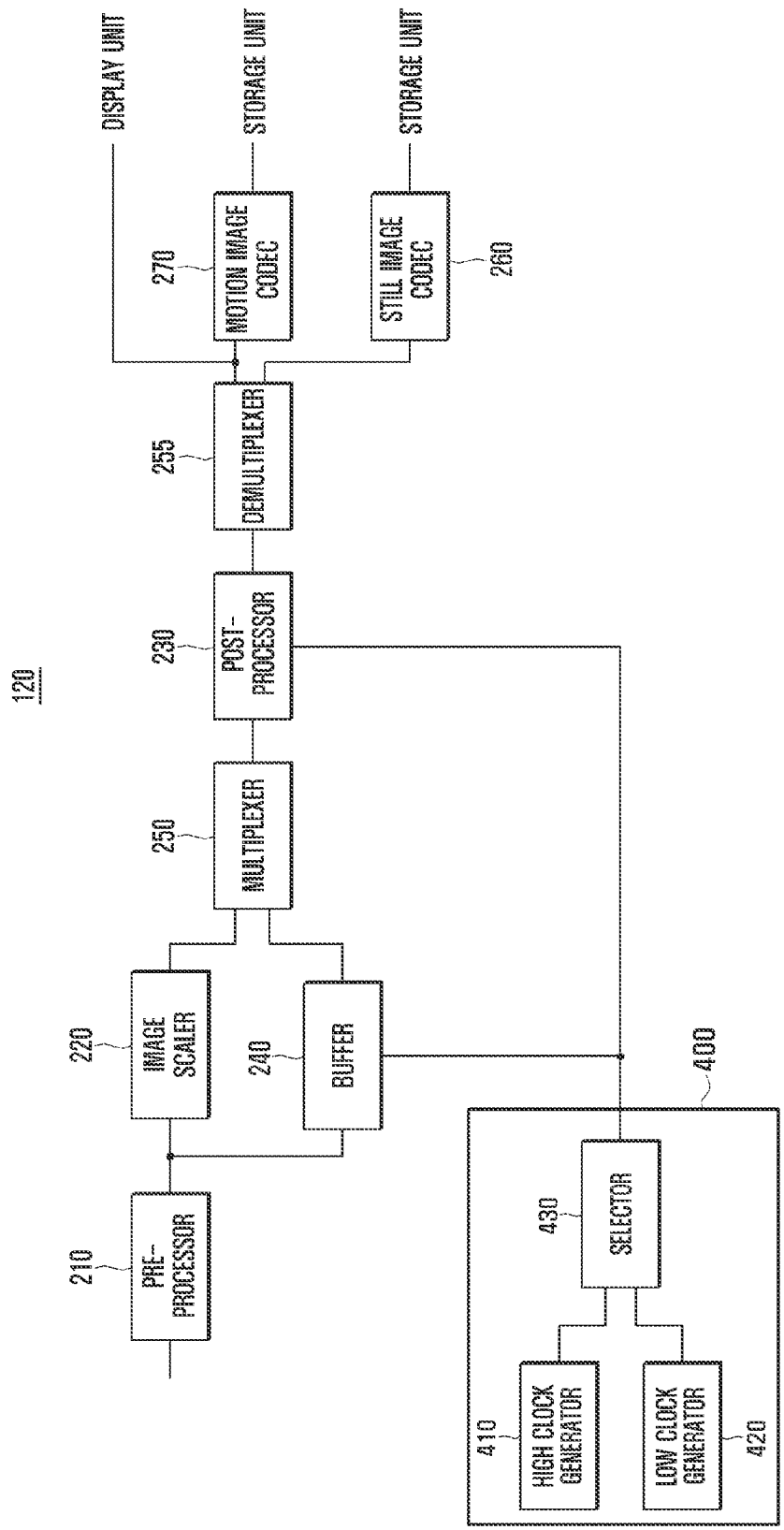

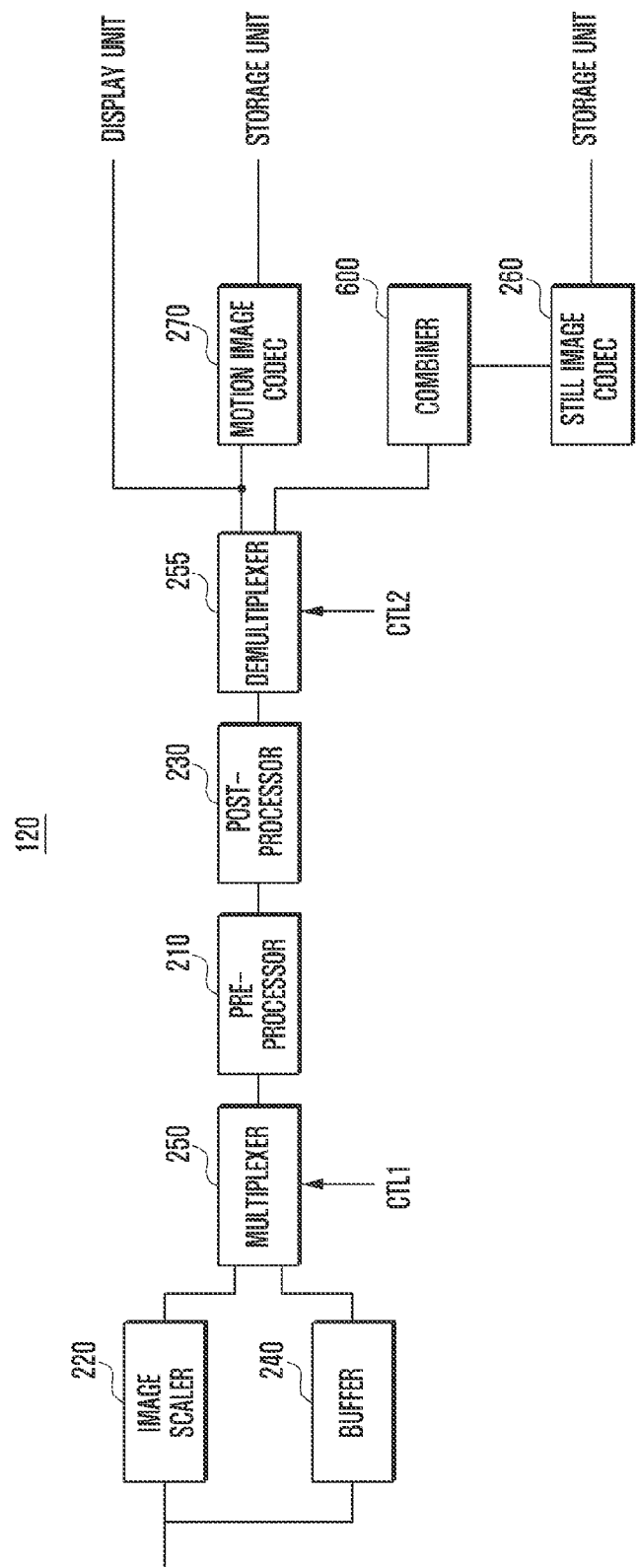

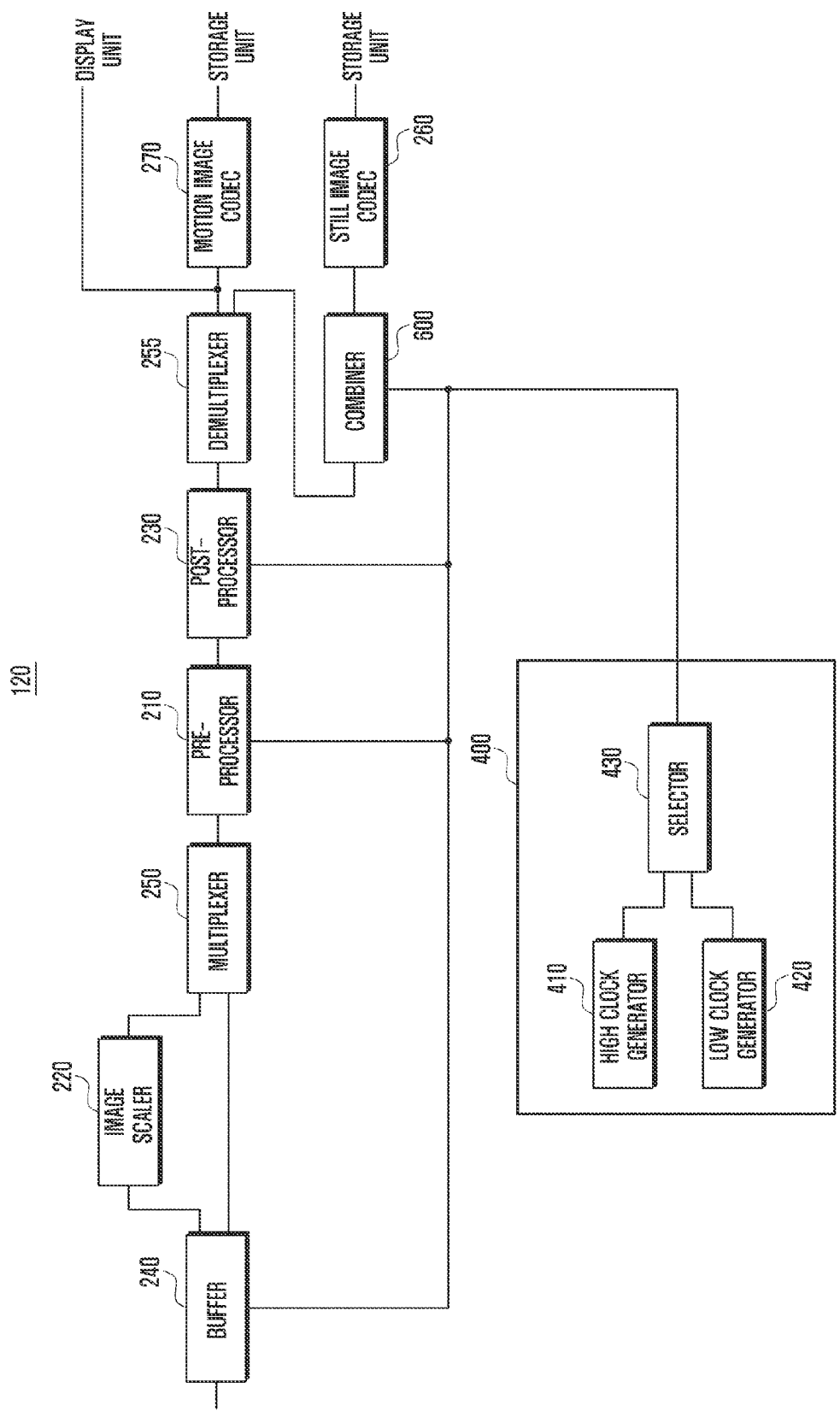

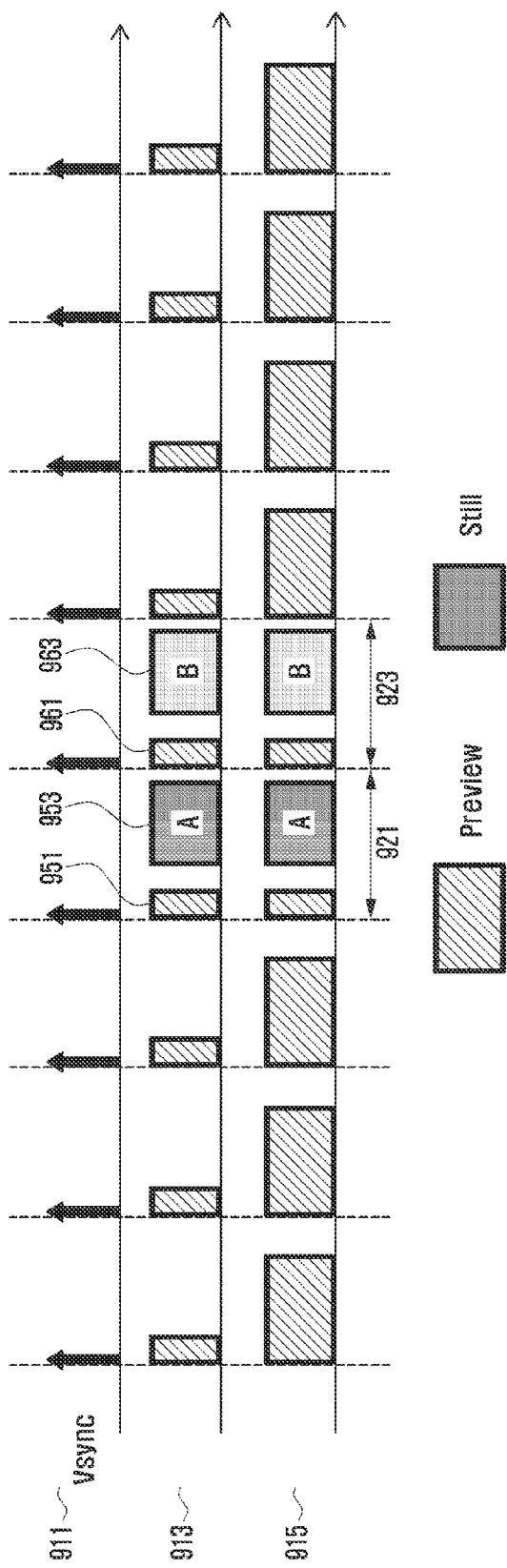

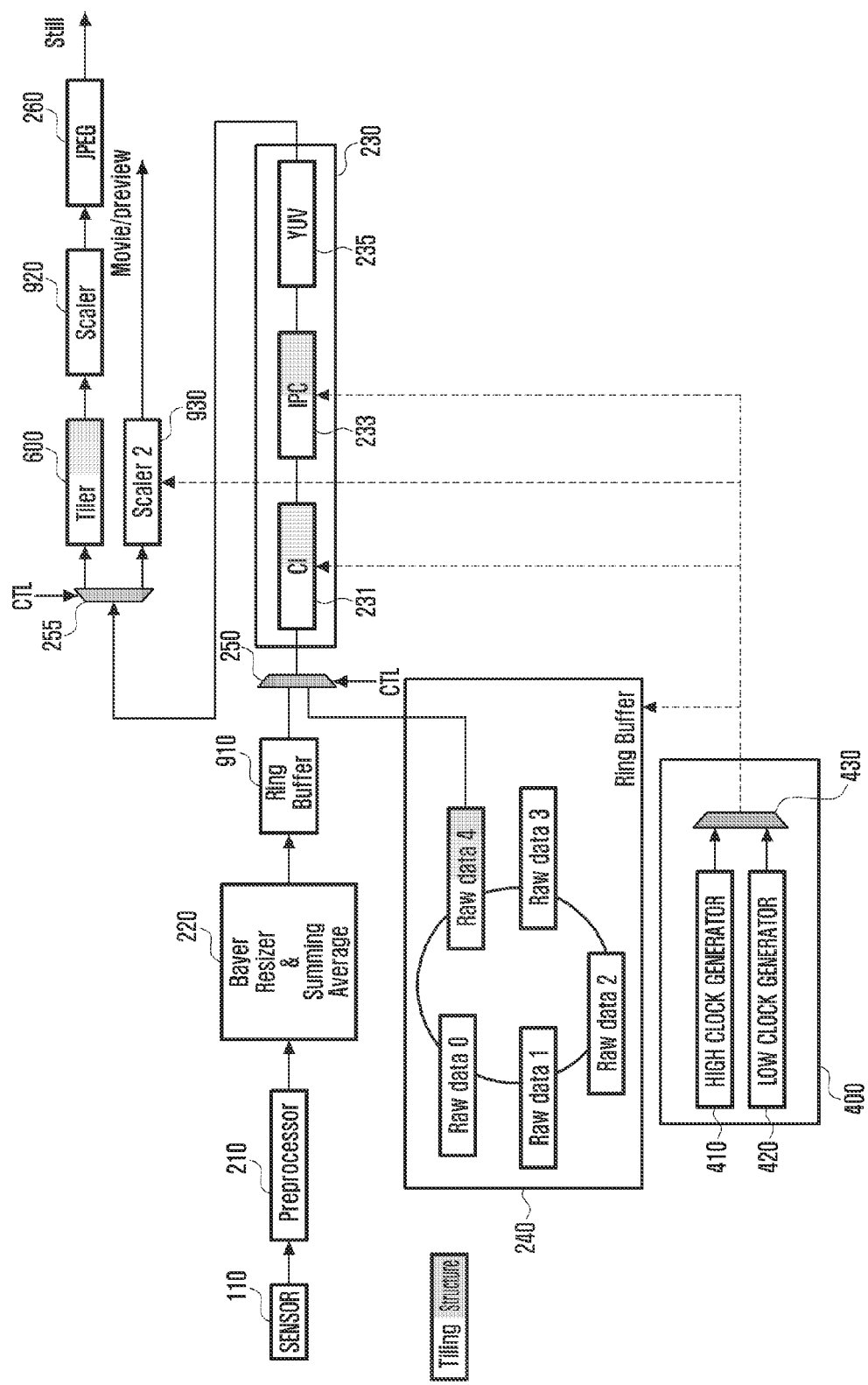

IMAGE PROCESSING APPARATUS AND METHOD OF CAMERA

PRIORITY

This application claims benefit under 35 U.S.C. 119(a) of Korean patent application filed on Apr. 16, 2012 in the Korean Intellectual Property Office and assigned Serial No. 10-2012-0039076 and Korean patent application filed on Jan. 17, 2013 in the Korean Intellectual Property Office and assigned Serial No. 10-2013-0005222, the entire disclosures of which are hereby incorporated by reference.

BACKGROUND OF THE INVENTION

1. Field of the Invention

The present invention relates to a camera. More particularly, the present invention relates to an image processing apparatus and method of a camera that is capable of compensating for shutter lag.

2. Description of the Related Art

Research is being conducted to provide users with various services requiring various data transmission capacities in the 4th Generation (4G) communication system. In the 4 G communication system, particularly, research focused on the support of high data rate service while guaranteeing mobility and service quality for the Broadband Wireless Access communication.

A camera device and camera-equipped mobile terminal device are respectively capable of processing high quality images and providing various user convenience functions. The recent developed camera device according to the related art is equipped with an image sensor (or camera sensor) capable of processing full High Definition (HD) or higher resolution images.

The camera device displays the image sensed by the camera sensor in a preview mode and records the image output by the camera sensor in response to the push on a shutter button. At this time, there exists a shutter delay or (shutter lag) between triggering the shutter and when the camera records a photograph actually. For example, a camera device according to the related art experiences a time difference between when the user presses the shutter and when the image processor processing the photo completely. Such a time difference is commonly referred to as lag. Oftentimes, shutter delay (shutter lag) corresponds to the reason for poor photography experiences (e.g., a reason for the user missing the 'perfect shot').

If the camera is shaken or if the person as an object to be shot takes an unintended action, such as closing eyes, at shooting timing, there is a limit in correcting the capture image and in restaging the same situation, resulting in failure of perfect shot.

Therefore, a need exists for a method and apparatus for capturing an image at the correct timing without shutter lag in a camera device or camera-equipped terminal.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for capturing an image at the correct timing without shutter lag in a camera device or camera-equipped terminal.

Another aspect of the present invention is to provide an image processing apparatus and/or method of a camera device or camera-equipped terminal that is capable of processing images output by the camera to generate plural images at every frame for use as a preview image and a capture image.

Another aspect of the present invention is to provide an image processing apparatus and method of a camera device or a camera-equipped terminal that is capable of processing the images output by the camera at every frame to generate preview images and to buffer as candidate capture images, displaying, in a preview mode, the preview image while buffering the candidate capture images, and processing the viewing image and buffered images in divisional manner to record a shutter lag-compensated capture image in response to a capture request.

In accordance with an aspect of the present invention, an image processing apparatus is provided. The apparatus includes an image scaler which scales a camera output image so as to correspond to a viewing image, a buffer which buffers the camera output image, a multiplexer which multiplexes outputs of the image scaler and the buffer, an image processor which processes multiplexed images corresponding to the multiplexed outputs of the image scaler and the buffer, a demultiplexer which demultiplexes an output of the image processor so as to supply the viewing image to a display unit, a codec which encodes the camera output image output by the demultiplexer into a capture image, and a controller which controls the multiplexer and the demultiplexer in a time divisional manner within a frame duration such that the image processor processes the viewing and camera output image sequentially in a capture mode.

In accordance with another aspect of the present invention, an image processing method of a camera is provided. The method includes processing a viewing image by controlling an image processor so as to establish a viewing image processing path, to buffer camera output images, and to convert at least one of the camera output images to at least one corresponding viewing image to be displayed, and processing a capture image by controlling the image processor so as to establish the viewing image processing path and a capture image processing path sequentially in a time divisional manner within a frame duration in a capture mode, and so as to process the viewing image on the viewing image processing path and a camera output image of a pre-designated frame which is selected among buffered camera output images on the capture image processing path.

In accordance with another aspect of the present invention, a camera device is provided. The camera device includes a camera which generates full resolution images in a camera driving mode, a display unit which display a viewing image, an input unit which generates a preview mode signal and a capture mode signal, a storage unit which stores a capture image, a control unit which controls to establish a viewing image processing path in response to the preview mode signal and to establish the viewing image processing path and a capture image processing path sequentially in a time divisional manner in response to the capture mode signal within one frame duration, and an image processor which, in the preview mode, establishes the viewing image processing path, buffers the camera output image, converts the camera output image to a viewing image, processes the viewing image, and outputs the processed viewing image to the display unit, and which, in the capture mode, establishes a viewing image processing path, buffers the camera output images, converts at least one of the camera output images to at least one corresponding viewing image, processes the viewing image, displays the processed viewing image on the display unit, establishes a capture image processing path, reads out the camera output image of a pre-designated frame among the buffered images, processes the camera output image, encodes the processed image to a capture image, and stores the capture image in the storage unit, under the control of the control unit.

In accordance with another aspect of the present invention, a portable terminal is provided. The portable terminal includes a camera which generates full resolution images in a camera driving mode, a display unit which display a viewing image, an input unit which generates a preview mode signal and a capture mode signal, a storage unit which stores a capture image, an application processor which processes applications of the portable terminal, controls to establish a viewing image processing path in response to a camera preview mode signal, and controls to establish the viewing image processing path and a capture image processing path sequentially within a frame duration in a time divisional manner in response to a camera capture mode signal, a control unit which controls a communication unit for communication of the terminal and communicates with the application processor, and an image processor which, in the preview mode, establishes the viewing image processing path, buffers the camera output image, converts the camera output image to a viewing image, processes the viewing image, and outputs the processed viewing image to the display unit, and which, in the capture mode, establishes a viewing image processing path, buffers the camera output images, converts at least one of the camera output images to at least one corresponding viewing image, processes the viewing image, displays the processed viewing image on the display unit, establishes a capture image processing path, reads out the camera output image of a pre-designated frame among the buffered images, processes the camera output image, encodes the processed image to a capture image, and stores the capture image in the storage unit, under the control of the application processor.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 2A to 2D are block diagrams illustrating exemplary configurations of an image processor such as, for example, the image processor 120 of FIG. 1 according to a first exemplary embodiment of the present invention;

FIGS. 4A to 4C are block diagrams illustrating exemplary configurations of an image processor such as, for example, the image processor of FIG. 1 according to a second exemplary embodiment of the present invention;

FIGS. 6A to 6C are block diagrams illustrating exemplary configurations of an image processor such as, for example, the image processor of FIG. 1 according to another exemplary embodiment of the present invention;

FIGS. 8A to 8C are block diagrams illustrating exemplary configurations of an image processor such as, for example, the image processor of FIG. 1 according to an exemplary embodiment of the present invention;

FIG. 9 is a diagram illustrating an image processing timings of an image processor such as, for example, the image processor 120 structured as shown in any of FIGS. 8A to 8C according to an exemplary embodiment of the present invention;

FIGS. 10A and 10B are block diagrams illustrating detailed configurations of an image processor such as, for example, the image processor according to exemplary embodiments of the present invention;

Throughout the drawings, it should be noted that like reference numbers are used to depict the same or similar elements, features, and structures.

DETAILED DESCRIPTION OF EXEMPLARY EMBODIMENTS

Figure 1:
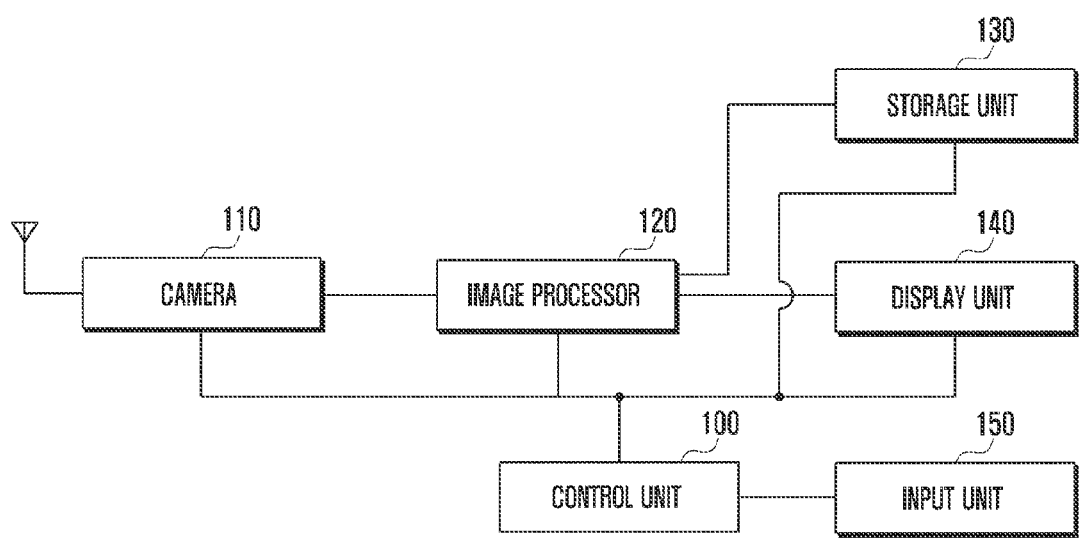
FIG. 1 is a block diagram illustrating the configuration of a camera device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is made with reference to numerous specific details such as the number of pixels of a camera and frame rate to provide a thorough understanding of exemplary embodiments of the present invention, those skilled in the art will appreciate that exemplary embodiments of the present invention can be practiced without some or all of these specific details. Also, a detailed description of well-known functions and structures incorporated herein may be omitted to avoid obscuring the subject matter of exemplary embodiments of the present invention.

When the camera device or camera-equipped terminal powers on (e.g. operates in a preview mode), the camera device or camera-equipped terminal according to an exemplary embodiment of the present invention processes frame images output by the camera sensor to generate images for use as preview and motion picture images (hereinafter, referred to as viewing image) and images for use as still images (hereinafter, referred to as capture image). The viewing image is smaller than the capture image in size. When the camera device or camera-equipped terminal powers on, the camera acquires images at every frame period and the acquired images are buffered. The camera device or camera-equipped terminal operating in the preview mode processes the image output by the camera so as to display the image in the form of the viewing image and, in the capture mode, selects an image capable of compensating for shutter lag among the buffered images and processes the selected into a capture image. Typically, a camera has a shutter delay (e.g., shutter lag) between triggering the shutter and when the image is actually recorded. The camera according to an exemplary embodiment of the present invention is provided with a buffer for storing the camera's full resolution images temporarily in separation from the viewing image so as to buffer the images taken by the camera in a camera operation mode. In response to the capture request, the camera device or camera-equipped terminal selects the image capable of achieving (e.g., corresponding to) zero shutter lag among the buffered frame images and processes the selected frame image into the capture image. According to an exemplary embodiment of the present invention, the buffer is capable of being configured to have a size capable of storing a predetermined number of frame images enough to compensate for shutter lag. Assuming that the shutter lag is about two frames in the camera device or camera-equipped terminal, it may be preferred to configure the buffer to have a size large enough to buffer about 5 frames. In the following description, the term 'camera output image' denotes the image output by the camera, and the size (number of pixels) of a camera output image is determined by the image sensor (number of pixels acquired by the image sensor) of the camera 110. The term 'viewing image' denotes the image for use as preview image to be displayed on the display unit in the preview mode or as motion image, the viewing image being generated by scaling the image output by the camera to a predetermined size (or resolution). The viewing image may be identical with or different from the preview image and motion image in resolution (or size). The term 'capture image' denotes the image capable of being recorded as a still image, the capture image being generated by scaling the camera output image or the image output by the camera to a predetermined size. In an exemplary embodiment of the present invention, the description is made under the assumption that the capture image corresponds to the camera output image.

The term 'image scaling' denotes adjusting the camera output image to a predetermined size (or resolution). In an exemplary embodiment of the present invention, the image scaling can be accomplished through at least one of resizing, adding, and averaging processes. The term 'resizing' denotes a process of adjusting image size through decimation, interpolation, and cropping. The adding and averaging processes denote processing adjacent pixels into one pixel to adjust the number of pixels, and the decimation, interpolation, and cropping processes may follow the averaging process.

In the following description, the terms 'pre-processor' and 'post-processor' may be referred to as simply 'image processor' interchangeably.

FIG. 1 is a block diagram illustrating the configuration of a camera device according to an exemplary embodiment of the present invention.

Referring to FIG. 1, camera device or camera-equipped terminal includes a control unit 100, a camera 110, an image processor 120, a storage unit 130, a display unit 140, and an input unit 150.

When the camera 110 powers on, the camera 110 acquires an image by means of an internal sensor. The camera 110 is capable of including an optical unit, an image sensor, and a signal processing unit. The optical unit is driven by a Mecha-shutter, a motor, and a actuator, and performs zooming and focusing operations by means of the actuator. The optical unit takes a scene image, and the image sensor detects the image taken by the optical unit and converts the image to an electrical signal. The image sensor can be any of CMOS and CCD sensors and other high resolution image sensors. The image sensor of the camera may integrate a global shutter. The global shutter is responsible for the function similar to the Mecha-shutter included in the sensor. The camera 110 is also capable of including a viewfinder. In an exemplary embodiment of the present invention, the image sensor can be a sensor capable of detecting image having Ultra High Definition (UHD) or higher resolution. The image output by the image sensor is processed by the signal processor so as to be output in the form of a digital image. The data output by the camera 110 can be Bayer data (raw data).

The image processor 120 buffers the frame image output by the camera 110, scales and processes the frame image output by the camera 110 to a viewing image in the preview mode, and selects and encodes compressively the frame images predetermined among the frame images buffered in the capture mode. The compressively-encoded image can be the frame image with zero shutter lag.

The control unit 100 controls overall operations of the camera according to an exemplary embodiment of the present invention. The control unit 100 controls the operations of the camera according to the control commands input through the input unit 150. If a camera driving command is input through the input unit 150, the control unit 100 controls the camera 110 and image processor 120 to operate in the preview mode. If a capture request is input through the input unit 150, the image processor 120 selects the camera output image taken at the occurrence of the capture request and encodes the selected camera output image compressively and store the compressed image in the storage unit 130. Particularly in an exemplary embodiment of the present invention, the control unit 100 controls the image processor 120, in the preview mode, to generate the viewing image and, in the capture mode, to display the viewing image and record capture image in time divisional manner.

The storage unit 130 is a memory for storing the images taken by the camera 110 and, although the description is directed to the case in which the still images are stored in an exemplary embodiment of the present invention, the storage unit 130 may store motion images.

The display unit 140 can be a display device such as LCD or OLED capable of displaying images taken by the camera and shooting informations.

The input unit 150 is capable of including buttons generating commands for configuration and operations of the functions of the camera. The buttons of the input unit 150 may include physical buttons arranged outer surface of the camera and virtual buttons presented on the touch panel. In this case, the display unit 140 and the input unit 150 can be integrated into a touchscreen.

In the camera device structured as shown in FIG. 1, the image processor 120 processes the viewing and capture images in a time divisional manner in response to the capture request. In order to achieve this, the image processor 120 according to an exemplary embodiment of the present invention processes the viewing and capture images as divided in time within one frame period. The image processor 120 for processing the image output by the camera 110 can be divided into a pre-processor and a post-processor. The image processor 120 may include an image scaler and a buffer for buffering a predetermined number of frame images for accomplishing zero shutter lag. At this time, the image processor 120 composed of the above components is capable of processing the viewing and capture images in a time divisional manner.

FIGS. 2A to 2D are block diagrams illustrating exemplary configurations of an image processor such as, for example the image processor 120 of FIG. 1 according to the first exemplary embodiment of the present invention.

Referring to FIGS. 2A to 2D, the image processor 120 includes a pre-processor 210, an image scaler 220, a post processor 230, a buffer 240, a multiplexer 250, a demultiplexer 255, a still image codec 260, and a motion image codec 270.

Figure 2B:
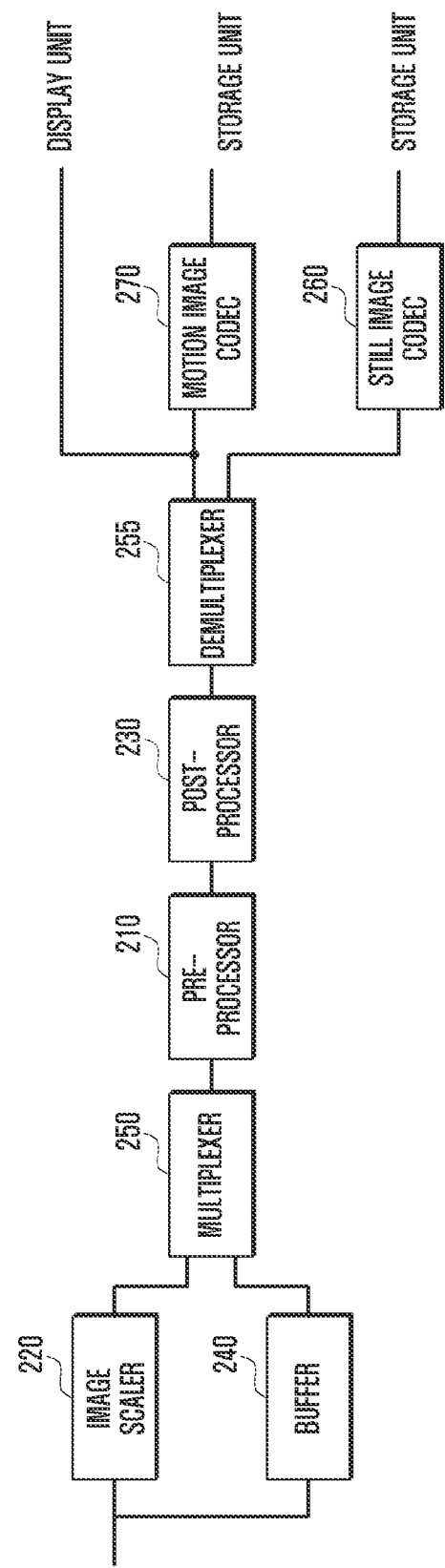
Figure 2D:
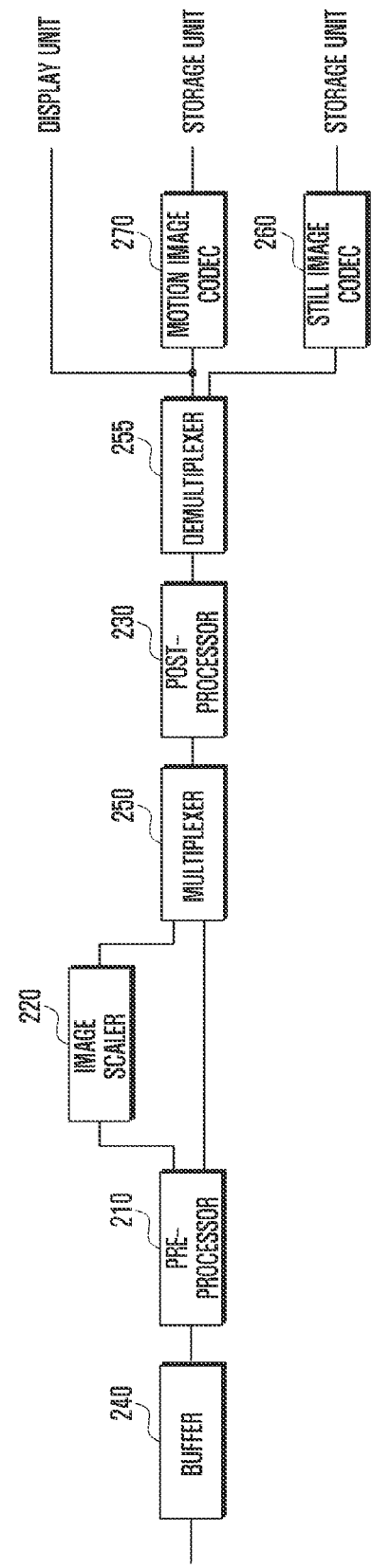

In the configuration of FIG. 2A, the image processor 120 pre-processes the images output by the camera 110 to generate viewing images that are buffered as capture images and processes the pre-processed images and the buffered pre-processed images into viewing and capture images in a time divisional manner. In the configuration of FIG. 2B, the image processor 120 buffers and simultaneously scales the images output by the camera 110 in a time divisional manner. In the configurations of FIGS. 2C and 2D, the image processor 120 buffers the images output by the camera 110 and processes the buffered images into viewing and capture images in a time divisional manner.

According to the exemplary embodiment of the present invention illustrated in FIG. 2A, the pre-processor 210 performs pre-processing on the images output by the camera 110. The pre-processing may include Auto White Balance (AWB), Auto Exposure (AE), and Auto Focusing (AF) (3A) extraction and processing, lens shading correction, dead pixel correction, knee compensation, and the like. The pre-processor 210 should have the capability of preprocessing the viewing images or capture images under the control of the control unit 100. For example, the pre-processor 210 preprocesses the images acquired by the camera 110 (camera's full resolution images detected by the image sensor of the camera), the preprocessed images being input to both the image scaler 220 and the buffer 240 simultaneously.

The scaler 220 scales the camera's full resolution image output by the pre-processor 210 to the size appropriate for display on the display unit 140. The image scaling can be performed with at least one of resizing, decimation, interpolation, crop, addition, and averaging. The image scaling is performed to reduce the number of pixels of the full resolution image acquired from the camera 110 to an extent of being appropriate for display on the display unit 140 or fit for the screen aspect ratio of the display unit 140. The image scaling can be performed in various aspect ratios. For example, assuming that the camera 110 outputs 8 Mbyte image and the scaling ratio is 4:1, the scaler 220 scales down the camera's output image to a 2 Mbyte viewing image.

The buffer 240 buffers the images output by the pre-processor 210 and outputs an image of a frame pre-designated in the capture mode under the control of the control unit 100. At this time, the buffer 240 is capable of buffering a predetermined number of frame images. The buffer 240 can be structured as an N-element ring buffer capable of buffering N frame images. In this case, the buffer 240 buffers the images output by the camera 110 in an order of first to last buffer elements in sequence and, if the buffer is full, the subsequent image overwrites the oldest buffer element. In an exemplary embodiment of the present invention, N is set to 5 and, in this case, the buffer 240 is structured as a 5-element ring buffer capable of buffering 5 frame image data. The buffer size can be equal to the number of frame images enough to compensate for shutter lag.

The multiplexer 250 receives the outputs the buffer 240 and the scaler 220 and outputs the viewing images from the scaler 220 and/or the camera output image buffered in the buffer 240 selectively under the control of the control unit 100. For example, the multiplexer 250 outputs the image from the scaler 220 in the preview mode under the control of the control unit 100. The multiplexer 250 also outputs the camera output image from the buffer 240 or the viewing image from the scaler 220 and the capture image from the buffer 240 in the time divisional manner during the corresponding frame period (capture image processing frame period) in the capture mode under the control of the control unit 100. For example, the multiplexer 250 is capable of outputting only the capture image or both the viewing and capture images in time divisional manner under the control of the control unit 100 in the capture mode.

The post-processor 230 performs post-processing on the image output from the multiplexer 250. The post-processing includes the operations of color interpolation, noise correction, gamma compensation, image conversion, and the like to generate YUV data. The post-processor 230 post-processes the viewing image in the preview mode and the camera output image in the capture mode. At this time, the post-processor 230 is capable of post-processing the viewing and capture images output from the multiplexer 250 sequentially in a time divisional manner during the one frame period in the capture mode.

The demultiplexer 255 demultiplexes the output of the post-processor 230 under the control of the control unit 100. The demultiplexer outputs the viewing image from the post-processor to the display 140 in the preview mode and the capture image from the post-processor 230 to the still image codec 260 in the capture mode. In the capture mode, the demultiplexer 255 performs time division demultiplexing on the viewing and capture images to output the viewing image to the display unit 140 and the capture image to the still image codec 260 under the control of the control unit 100. The demultiplexer 255 can be implemented with one of various types of demultiplexers.

The still image codec 260 encodes the capture image output by the demultiplexer 255 so as to be stored compressively in the storage unit 130. For example, the still image codec 260 can be a Joint Photographic Expert Group (JPEG) codec. The viewing image can be used as the image for recording a motion image. In this case, if a motion image shot request is input, the motion image codec 270 encodes the viewing images output by the demultiplexer 255 and stores the encoded motion image in the storage unit 130. The viewing image may be equal to the viewing image for use in the preview mode in size. The motion image can be the viewing images with more pixels than the viewing image in the preview mode. In this case, the scaler 220 can be provided with a preview mode scaler and a motion image mode scaler or a variable scaler capable of varying the scaling ratio depending on the operation mode. If motion image recording is requested, the control unit 100 controls the scaler 220 to scale the image to the viewing image size of the motion image such that the scaler 220 scales the full resolution image output by the pre-processor 210 to the viewing image size of the motion image. The motion image encoding can be performed in various formats such as H.264.

A description is made of the operations of the image processor 120 structured as shown in FIG. 2A. If the user enters a camera driving command by means of the input unit 150, the control unit 100 drives the camera 110 to operate in the preview mode. In the preview mode, the control unit 100 controls the multiplexer 250 to supply the output of the scaler 220 to the post-processor 230 and controls the demultiplexer 255 to supply the output of the post-processor 230 to the display unit 140. The control unit 100 also controls the post-processor 230 to perform post-processing on the viewing image-size image.

The image output by the camera 110 can be a Bayer image, and the full resolution image is pre-processed by the camera 110. The pre-processor 210 extracts 3A and performs lens shading correction, dead pixel correction, knee compensation, and the like. The camera image pre-processed by the pre-processor 210 is input to the buffer 240 and the scaler 220. For example, in the preview mode, the camera output image taken by the camera 110 is pre-processed and then buffered to the buffer 240 and scaled to a viewing image by the scaler 220 simultaneously. In the preview mode, the buffer 240 buffers the images up to N frames and discards the old image buffered before N frames. This is to capture the camera output image of a pre-designated frame (the image capable of achieving zero shutter lag) in the capture mode.

The scaler 220 scales the input full resolution image to the size appropriate for display on the display unit 140. The image scaling can be accomplished through at least one of resizing, decimation, interpolation, crop, addition, and averaging processes. The image scaling is performed to reduce the number of pixels of the full resolution image acquired from the camera 110 to an extent of being appropriate for display on the display unit 140 or fit for the screen aspect ratio of the display unit 140. The scaler 220 can be implemented with a resizer and/or summing and averaging part. In the case that the scaler 220 is implemented with the resizer, the resizer resizes the image output from the camera to the size appropriate for display on the display unit 140. At this time, resizing is performed through decimation, interpolation and/or crop. In the case that the scaler 220 is implemented with a summing and averaging part, the summing and averaging part sums and averages the adjacent pixels of the image to reduce the number of pixels.

Figure 3A:
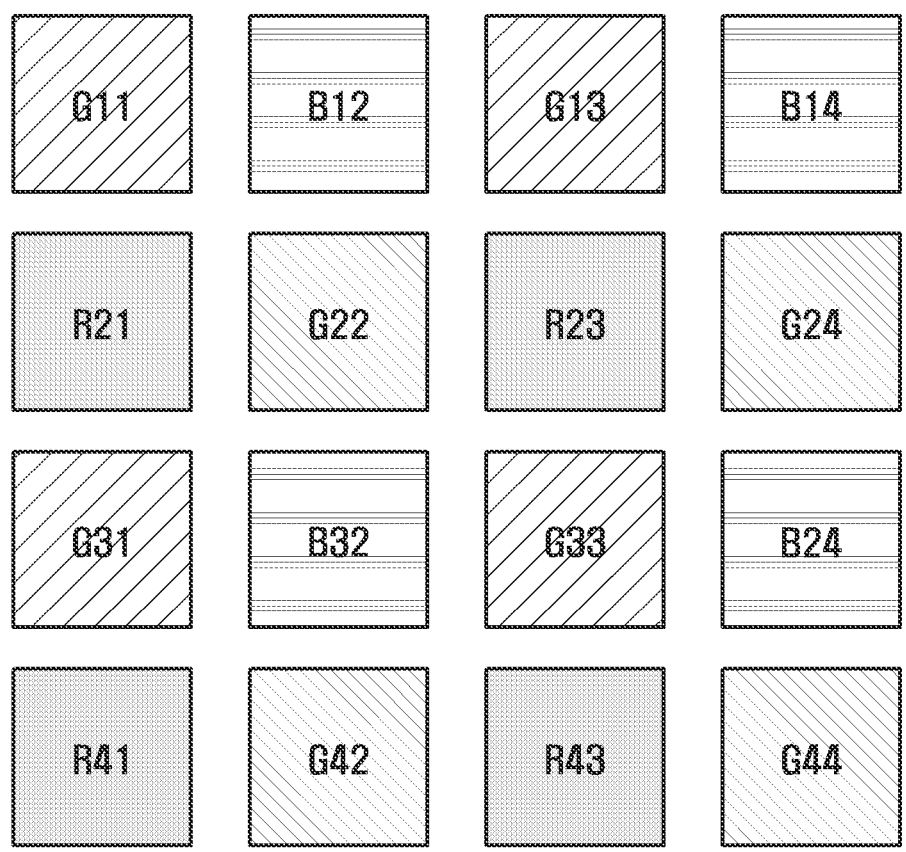
FIGS. 3A to 3B are diagrams illustrating exemplary images for explaining operation of a summing and averaging part of a scaler according to an exemplary embodiment of the present invention.
Figure 3B:
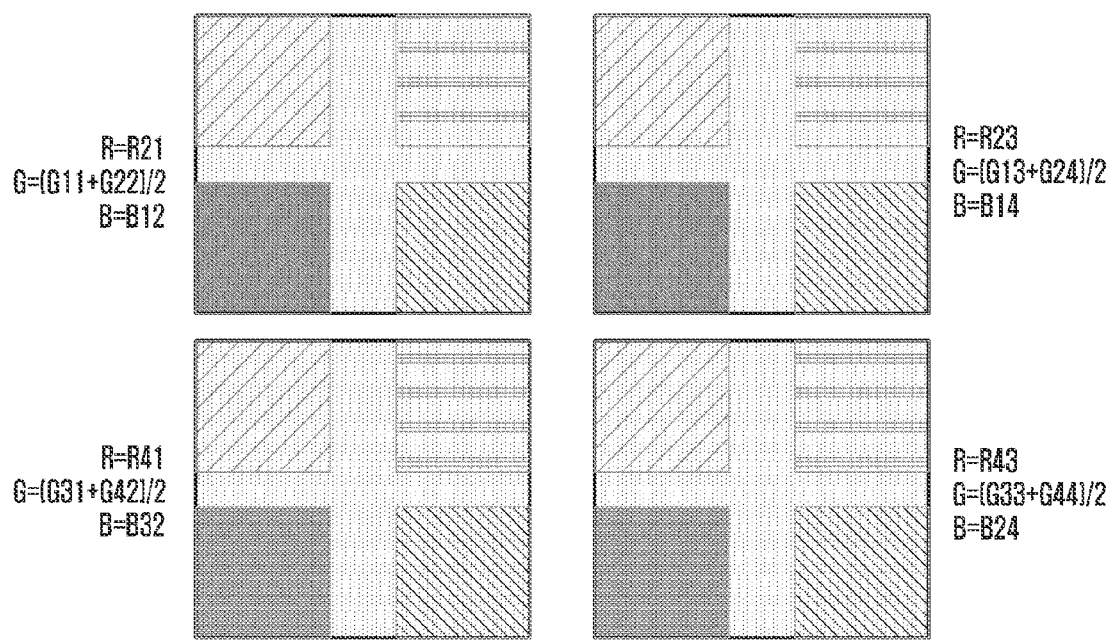

FIGS. 3A to 3B are diagrams illustrating exemplary images for explaining operation of a summing and averaging part of a scaler according to an exemplary embodiment of the present invention.

Referring to FIGS. 3A and 3B, the summing and averaging part sums and averages the adjacent pixels of the image output by the camera 110 to reduce the number of pixels of the viewing image. The summing and averaging part can accomplish improvement in signal-to-noise ratio and resolution through pseudo-Foveon method. The pixels of the image output from the camera 110 are structured as shown in FIG. 3A. As illustrated in FIG. 3A, the pixels are arranged such that 4 adjacent pixels include 1 Red (R), 1 Blue (B), and 2 Green (G) pixels. Accordingly, by summing and averaging the four pixels to one pixel, it is possible to scale the image at the ratio of 4:1. In an exemplary embodiment of the present invention, the description is directed to the case in which the summing and averaging part sums and averages 4 pixels to 1 pixel. In order to accomplish this, the summing and averaging part sums and averages the two G pixels into one G pixel and combines the averaged G pixel and the R and B pixels into a signal pixel. In FIG. 3A, if the G11, B12, R21, and G22 pixels are processed into one pixel, the pixels $R=R21$, $B=B12$, $G=(G11+G22)/2$ are processed into one pixel having an RGB value. Through the summing and averaging process, the four pixels are processed into one pixel as shown in FIG. 3B along with the color interpolation process. The 16 pixels arranged as shown in FIG. 3A can be averaged through the above described method so as to be scaled down to 4 pixels and, at this time, the pixels are color-interpolated. The pixels scaled by the summing and averaging part are supplied to the post-processor 230 via the multiplexer 250, and the post-processor performs color interpolation, IPC process, and image conversion on the pixels to generate a YUV image. In the case in which the scaler 220 performs image scaling with the summing and averaging part, the color interpolator 231 of the pre-processor 250 may perform only the color interpolation function with the exception of full color conversion of the pixel data.

The scaler 220 can be implemented with both the resizer for resizing the image output from the camera 110 to the viewing image size and the summing and averaging part for summing and averaging the pixels of the pre-processed images to the number of pixels of the viewing image. In this case, the scaler 220 can be configured to perform resizing first then averaging, averaging first then resizing, or output one of the processing results of the resizer and summing and averaging part selectively.

The image scaled to the view image size is supplied to the multiplexer 250, which selects the viewing image output from the scaler 220 and outputs the viewing image to the post-processor 230. In the preview mode, the post-processor 230 is capable of configuring the size of the image to be post-processed to the size for processing the viewing image under the control of the control unit 100. In this case, the post-processor 230 post-processes the pre-processed viewing image output from the image scaler 220 and, at this time, the post-processing may be at least one of color interpolation, noise reduction, gamma correction, and image conversion, and the like.

The post-processor 230 is capable of including a color interpolator, an Image Processing Chain (IPC), and an image converter. The color interpolator performs color interpolation function for converting the Bayer image to a color image. The image sensor of the camera 110 can be a CCD or CMOS image sensor. At this time, the CCD/CMOS image sensor uses a color filter array such that each pixel sensor has only one of channel among the three color channels for forming a color image. The color interpolator is responsible for performing the full color function of converting the pixels of the image output from the camera 110 to a color pixel including RGB. The color interpolator performs color interpolation function using the correlation among the adjacent pixels. Typically, the image processing before the color interpolation is referred to as pre-process and the image processing after the color interpolation is referred to as post-process in the image processor. Secondly, the IPC performs noise reduction, gamma correction, and luminance correction on the color-interpolated image. Thirdly, the imager convertor converts the post-processed image (raw data or Bayer data) to a YUV image. For example, the post-processor 230 performs the post-process such as color interpolation and YUV image conversion on the pre-processed image. The viewing image processed as described above is supplied to the display unit 140 via the demultiplexer 255 to be displayed on the screen.

According to an exemplary embodiment of the present invention, the camera 110 is configured to have the viewing image processing path with the multiplexer 250 and the demultiplexer 255 in the preview mode such that each frame image acquired by the camera 110 is processed into a viewing image for display on the display unit 140 through the pre-processor 210, the image scaler 220, and the post-processor 230. The image preprocessed by the pre-processor 210 is buffered in the buffer 240. For example, the image processor 120 performs only the operation for generating the viewing image but not the operation related to the process for storing image. At this time, the viewing image is in the state of being scaled down, and the high resolution image for recording is in the state of only being buffered, the camera can be in the state of low electric current consumption and low heat.

Typically, a camera takes an image delayed a certain number of frames from the timing of the image presented on the viewfinder or display unit 140 due to the shutter delay. For example, there is a delay (shutter lag or time lag) between triggering the shutter and when the camera records an image actually. The time delay is variable depending on the camera, and the control unit 100 should know the delay time acquired statistically. According to an exemplary embodiment of the present invention, the camera buffers the images acquired through the camera 110 by taking notice of the shutter lag and selects the frame image taken at the timing when the shutter is triggered as a capture image among the buffered images. For example, the camera according to an exemplary embodiment of the present invention buffers the images acquired through the camera 110 in the preview mode to accomplish zero shutter lag.

If a capture request is input through the input unit 150 in the preview mode, the control unit 100 detects the shutter press time and accesses the frame image taken at the shutter press time (i.e. image with zero shutter lag) among the images buffered in the buffer 240. The control unit 110 controls the multiplexer 250 and the demultiplexer 255 to establish the path for processing the capture image. For example, the control unit 100 controls the multiplexer 250 and the demultiplexer 255 to establish the path for processing the capture image and controls the post-processor 230 to post-process the image acquired by the camera 110. The control unit 100 controls the multiplexer 250 and the demultiplexer 255 to process the capture image during one frame period or to process both the viewing and capture images in a time divisional manner during one frame period.

In processing the capture image, the control unit 100 controls the multiplexer 250 and the demultiplexer 255 to select the capture image processing path and accesses the shutter lag-compensated frame image (e.g., frame image taken at the shutter press timing with zero shutter lag) in the buffer 240. The multiplexer 250 selects the image output from the buffer 240 and supplies the selected image to the post-processor 230 which post-processes the capture image accessed in the buffer 240. The demultiplexer 255 supplies the post-processed image as the capture image to the still image codec 260, which encodes the capture image to store the encoded image in the storage unit. At this time, the still image codec 260 can be a still image encoder such as JPEG encoder. Although the exemplary embodiments of the present invention are directed to the case in which the still image corresponds to a JPEG image, the still image can be an image encoded in another still image format (e.g., Tagged-Image File Format (TIFF)). The compressively encoded still image is stored in the storage unit 130.

Although the description is directed to the case in which the capture image is the image acquired by the camera 110, the image acquired by the camera 110 can be scaled if necessary. For example, the user of the camera may capture a still image with a size (or resolution) smaller than the camera's full resolution image. In this case, the user of the camera is capable of recording a capture image with a small size (small number of pixels). Although the description is directed to the case in which the camera is provided with a buffer to buffer the images acquired by the camera in an exemplary embodiment of the present invention, the capture image processor can be configured with a scaler at the output node of the buffer 240 which differs from the scaler 220 such that the output of the buffer 240 is supplied to the newly introduced scaler. In this case, if the user inputs a capture request command with the indication of the size (number of pixels) of the image, the control unit 100 controls such that the output of the buffer 240 is supplied to the scaler (not the scaler 220) following the buffer 240 and controls the scaler to scale the image from the camera to the user's intended size for post-processing.

As described above, in the case in which the image processor 120 is capable of processing the viewing and capture images simultaneously during one frame period, the control unit 110 controls the multiplexer 250 and the demultiplexer 255 in time divisional manner to process the viewing and capture images in sequence during one frame period. In this case, the viewing image processing period is set to be shorter than the capture image processing period. The post-processor 230 can be configured to process the viewing and capture images in different sizes under the control of the control unit 100.

If a capture request is detected, the control unit 100 controls the multiplexer 250 and the demultiplexer 255 to establish a viewing image processing path and a capture image processing path in time divisional manner during one frame period. In the case in which the viewing image processing path is established, the viewing image scaled already is displayed while, in the case in which the capture image processing path is established, the image of the frame capable of accomplishing zero shutter lag is retrieved from the buffer 240, the retrieve image being post-processed and encoded to be stored.

As described above, the camera device according to an exemplary embodiment of the present invention is capable of accomplishing zero shutter lag. The image taken by the camera in response to the user's intention is the frame image acquired with delay from the user-intended capture image. For example, the capture image intended by the user is the image preceding the frame image acquired by the camera 110. In order to accomplish zero shutter lag, the camera device according to an exemplary embodiment of the present invention selects the image of a preceding frame among the images buffered in the buffer 240 in response to the capture request.

The photo taken at the time when the user enters the capture request may not correspond to the photo captured in the normal condition. In an exemplary case of a portrait photo, the photo may be taken with closed eyes or with shaking hand. In this case, it may be preferred to record another frame image. The camera device according to an exemplary embodiment of the present invention buffers a predetermined number of frame images in the buffer 240 so as to use one of the buffered images selectively. For example, the camera device according to an exemplary embodiment of the present invention buffers a plurality of frame images such that when the captured image is not satisfactory it is possible to replace the capture image with another selected in the buffer.

If the user enters a continuous shot mode (burst shot mode) request, the control unit 100 accesses the frame images buffered from the timing when the burst shot mode has been requested, the post-processor 230 processes the continuously accessed frame images, and the still image codec 260 performs continuous encoding on the frame images to store the encoded image in the storage unit 130. For example, in the burst shot mode, the images taken by the cameras are buffered in the buffer 240 at every frame period, and the control unit accesses the buffered full resolution images continuously to process and encode for recording.

In the above state, if an image playback request is input through the input unit 150, the control unit 100 accesses the image stored in the storage unit 130, and the still image codec 260 decodes the accessed image, and the display unit 140 plays the decoded image. If a motion image playback request is input through the input unit 150, the control unit 100 retrieves the requested motion image from the storage unit and supplies the retrieved motion image to the motion image codec 270 which decodes the motion image to play the decoded motion image on the display unit 140.

Referring to FIG. 2B, another configuration of the image processor 120 is illustrated. As shown in FIG. 2B, the image processor 120 is configured to buffer and scale the image acquired by the camera 110 and to pre-process and post-process the buffered image or scaled viewing images. Referring to FIG. 2B, the scaler 220 scales the full resolution image output from the camera 110 to a size appropriate for display on the display unit 140. The buffer 240 buffers the images output from the camera 110 the outputs the image of a frame pre-designated camera output image for use in the capture mode under the control of the control unit 100.

The multiplexer 250 supplies the viewing image output by the scaler 220 and/or the images buffered in the buffer 240 to the scaler selectively under the control of the control unit 100. For example, the multiplexer 250 delivers the output of the scaler 220 selectively in the preview mode under the control of the control unit 100. The multiplexer 250 delivers the image output from the buffer 240 or the viewing image output from the scaler 220 and the capture image output from the buffer 240 in the time divisional manner during the corresponding frame period (frame period for processing capture image) under the control of the control unit 100.

The preprocessor 210 pre-processes the image output from the multiplexer 250, and the post-processor 230 post-processes the image output from the multiplexer 250. The pre-processor 210 and the post-processor 230 are capable of processing the images having the viewing image size or the capture image size under the control of the control unit 100. For example, the pre-processor 210 and the post-processor 230 process the viewing image in the preview mode and process the capture image or viewing and capture images input in time divisional manner in the capture mode.

The demultiplexer 255 demultiplexes the output of the post-processor 230 under the control of the control unit 100. In the preview mode, the demultiplexer 255 supplies the viewing image output from the post-processor 230 to the display unit 140. In the capture mode, the demultiplexer 255 supplies the capture image output from the post-processor 230 to the still image codec 260. In the capture mode, the demultiplexer 255 is capable of performing time-divisional demultiplexing on the viewing and capture images output from the post-processor 230 to supply the viewing image to the display unit 140 and the capture image to the still image codec 260 under the control of the control unit 100. The demultiplexer 255 can be implemented with any of various types of demultiplexers.

The still image codec 260 encodes the capture image output from the demultiplexer 255 to store the encoded image in the storage unit 130. In the motion image shot mode, the motion image codec 270 encodes the viewing image output from the demultiplexer 255 to store the encoded image in the storage unit 130. In the image processor 120 structure as shown in FIG. 2B, if the user enters a camera driving command through the input unit 150, the control unit 110 drives the camera 110 and supplies the images acquired by the camera 110 to the image scaler 220 and the buffer 240. The buffer 240 buffers the images output from the camera.

The image scaler 220 scales the full resolution image to the size appropriate for display on the display unit 140. In the preview mode, the multiplexer 250 selects the output of the image scaler 220 and the demultiplexer 255 selects the output of the post-processor 230 to supply the image to the display unit 140 under the control of the control unit 100. For example, in the preview mode, the control unit 100 controls the multiplexer 250 and the demultiplexer 255 to establish the preview image processing path but the capture image processing path. In this state, the viewing image output from the image scaler 220 is supplied to the pre-processor 210 via the multiplexer 250 such that the pre-processor 210 prep-processes the viewing image and the post-processor 230 post-processes the pre-processed viewing image. For example, in the preview mode, the control unit 100 controls the multiplexer 250 and the demultiplexer 255 to establish a viewing image processing path such that the image scaler 220, the pre-processor 210, and the post-processor 230 process the every frame image acquired by the camera 110, the processed frame images being buffered in the buffer 240. If a capture request is input through the input unit 150 afterward, the control unit 100 retrieves the frame image capable of accomplishing zero shutter lag among the images buffered in the buffer 240 as the capture image. The control unit 100 controls the multiplexer 250 and the demultiplexer 255 in a time divisional manner to establish the viewing image and capture image processing paths. For example, the control unit 100 controls the multiplexer 250 and the demultiplexer 255 to establish the viewing image (or capture image) processing path and then the capture image (or viewing image) processing path.

First, the control unit 100 controls the multiplexer 250 and the demultiplexer 255 to establish the viewing image processing path. In this case, the viewing image output from the image scaler 220 is processed by the pre-processor 210 and the post-processor 230 in series so as to be output in the form of a YUV image to the display 140 for display. Thereafter, the control unit 100 controls the multiplexer and the demultiplexer to establish the capture image processing path and retrieves the shutter lag-compensated frame image (e.g., zero shutter lag image taken at the shutter press time) from the buffer 240. The retrieved capture image (e.g., image acquired by the camera 110) is pre- and post-processed by the pre-processor 210 and the post-processor 230 so as to be output in the form of a YUV image to the still image codec 260 via the demultiplexer 255. The still image codec 260 encodes the capture image, the capture image being stored in the storage unit 130.

Upon detecting the capture request, the control unit 100 controls the multiplexer 250 and the demultiplexer 255 to establish the viewing and capture image processing paths in a time-divisional manner during one frame period. In this case, the viewing image processing period is set to be shorter than the capture image processing period. The pre-processor 210 and the post-processor 230 can be configured to process the viewing and capture images in different sizes under the control of the control unit 100.

The image processor 120 structured as shown in FIG. 2B supplies the image acquired by the camera 110 to the image scaler 220 and the buffer 240 simultaneously, and the pre-processor 210 is interposed between the multiplexer 250 and the post-processor 230. The operations of the components constituting the image processor 120 (pre-processor, post-processor, image scaler, buffer, multiplexer, and demultiplexer) are identical with those of FIG. 2A with the exception that the pre-processor 210 of FIG. 2A pre-processes the image acquired by the camera while the pre-processor 210 of FIG. 2B pre-process both the viewing image size and capture image size images.

FIG. 2C is a block diagram illustrating another exemplary configuration of the image processor 120. The image processor 120 of FIG. 2C is configured so as to buffer the images output from the camera 110, scale the buffered image, and multiplex the scaled images or buffered images for pre-processing and post-processing.

Referring to FIG. 2C, the buffer 240 buffers the images output from the camera 110 at every frame period and outputs a pre-designated camera image for use in the capture mode under the control of the control unit 100. At this time, a predetermined number of frame images can be buffered in the buffer 240. The image scaler 220 scales the camera's full resolution image buffered in the buffer 240 to the size appropriate for display on the display unit 140.

The multiplexer 250 receives the output of the buffer 240 and the image scaler 220 as input, and outputs the viewing image output by the image scaler 220 and/or the camera-output images buffered in the buffer 240 selectively. The pre-processor 210 pre-processes the image output from the multiplexer 250. The post-processor 230 post-processes the image output from the pre-processor 210. The demultiplexer 255 performs demultiplexing on the output of the post-processor 230 under the control of the control unit 100. In the preview mode, the demultiplexer 255 supplies the viewing images output by the post-processor 230 to the display unit 140 and, in the capture mode, supplies the capture image output by the post-processor 230 to the still image codec 260. The still image codec 260 encodes the capture image output by the demultiplexer 255 compressively. The compressed image may be stored in the storage unit 130.

The image processor 120 structured as shown in FIG. 2C operates in such a way that the buffer 240 buffers the images output by the camera 110 and the image scaler 220 scales the camera output images buffered in the buffer 240. The follow-up configuration and operations are identical with those of the image processor of FIG. 2B. At this time, the image scaler 220 is capable of scaling the image of the current frame (e.g., the frame image taken by the camera 110 most recently) among the images taken by the camera 110 and buffered in the buffer 240 to the viewing image.

FIG. 2D illustrates another exemplary configuration of the image processor 120. The image processor 120 of FIG. 2D buffers the camera output images, pre-processes and scales the buffered images, and multiplexes the scaled images or buffered images for post-processing.

According to the exemplary embodiment of the present invention illustrated in FIG. 2D, the buffer 240 buffers the camera output images. The pre-processor 210 pre-processes the camera output image output from the buffer 240. The image scaler scales the camera output image output from the pre-processor 220. The multiplexer 250 supplies, in the preview mode, the output of the image scaler 220 and, in the capture mode, the output of the camera output image preprocessed by the pre-processor 210 to the post-processor 230 under the control of the control unit 100. The post-processor 230 post-processes the pre-processed viewing image in the preview mode and the pre-processed image in the capture mode under the control of the control unit 100. The demultiplexer 255 supplies the viewing image as the output of the post-processor 230 to the display unit 140 in the preview mode. The demultiplexer 255 supplies the viewing image as the output of the post-processor 230 to the still image codec 260 in the capture mode under the control of the control unit 100. In the motion image shot mode, the motion image codec 270 encodes the viewing image output from the demultiplexer 255 to store the encoded image in the storage unit 130. The configuration of the image processor of FIG. 2D is identical with that of the image processor of FIG. 2C with the exception that the image processor of FIG. 2C is configured in such a way that the pre-processor 210 is connected to the output end of the buffer 240, the image scaler 220 scales the pre-processed image to the viewing image size, the multiplexer 250 multiplexes the pre-processed viewing images and/or capture images under the control of the control unit 100.

Figure 4B:
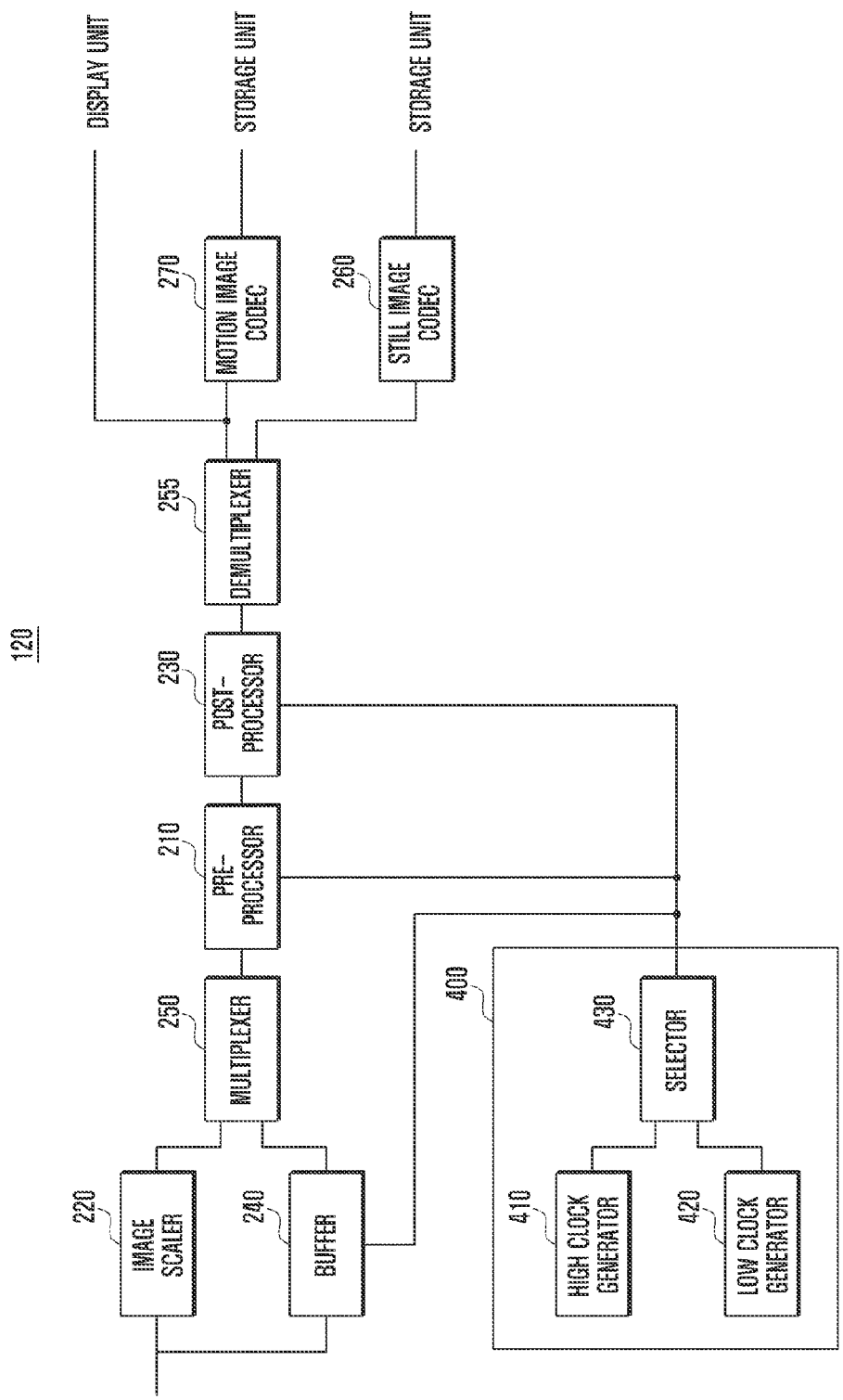
Figure 4C:
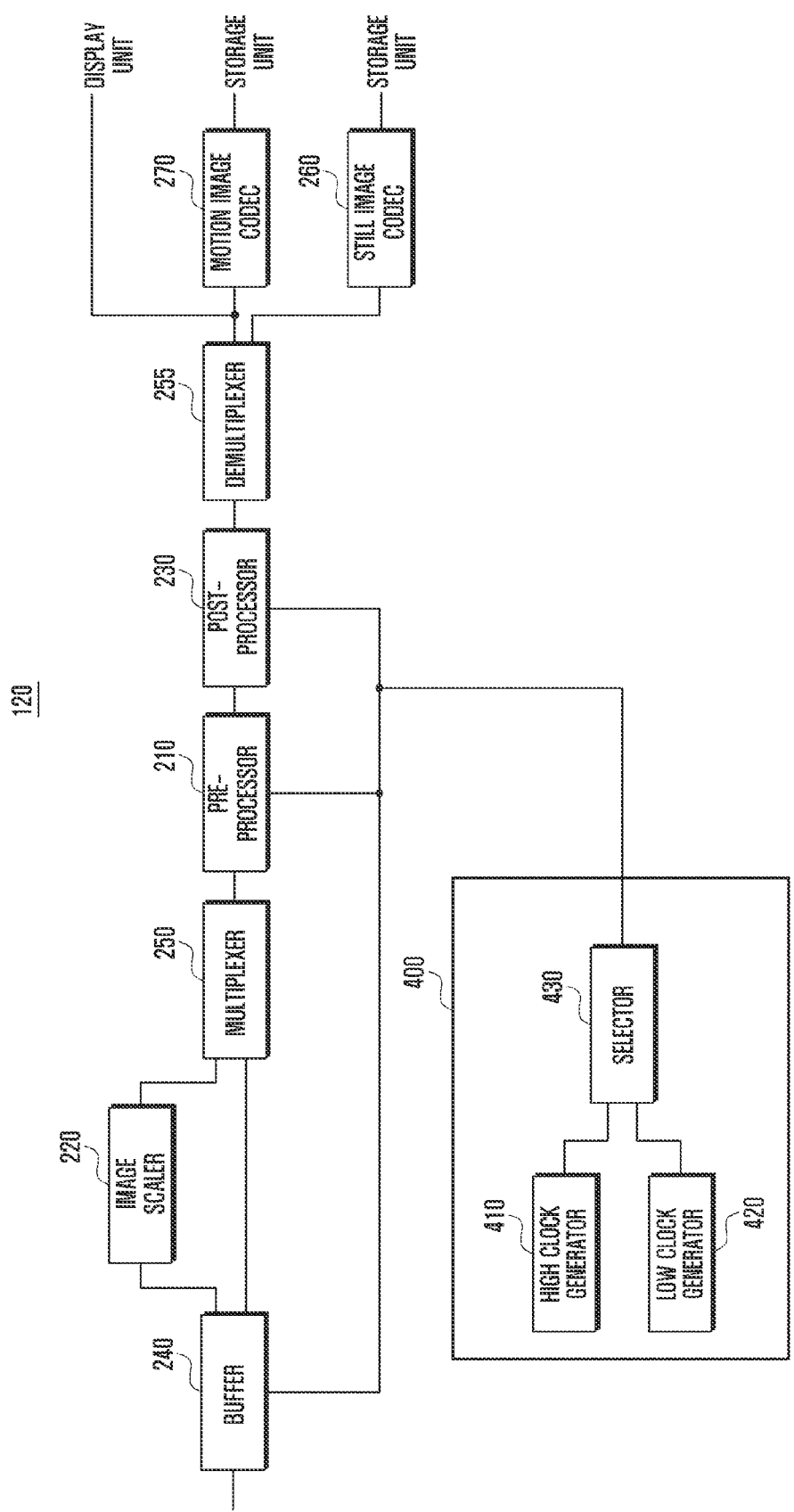

FIGS. 4A to 4C are block diagrams illustrating exemplary configurations of an image processor such as, for example, the image processor of FIG. 1 according to a second exemplary embodiment of the present invention.

Referring to FIGS. 4A to 4C, the image processor 120 is characterized in that the image processing rate can be changed by adjusting the operation clock.

Figure 5:
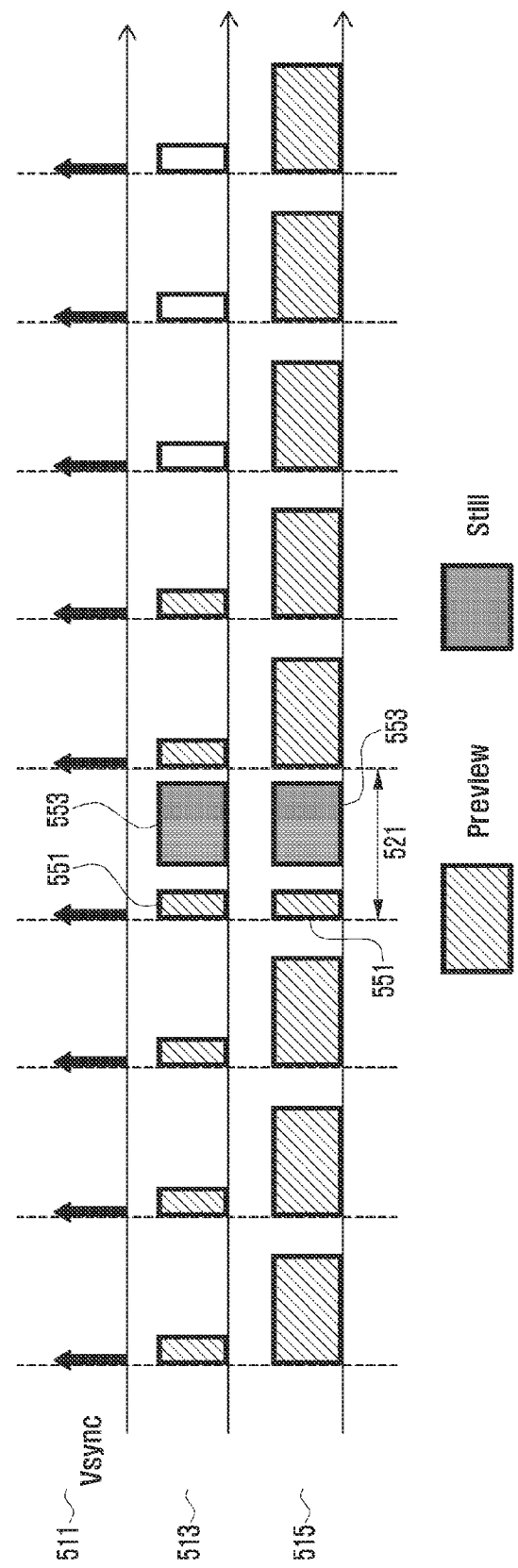
FIG. 5 is a diagram illustrating an image processing timing of an image processor such as, for example, the image processor structured as shown in any of FIGS. 4A to 4C depending on a selected operation clock according to an exemplary embodiment of the present invention.

FIG. 5 is a diagram illustrating an image processing timing of an image processor such as, for example, the image processor structured as shown in any of FIGS. 4A to 4C depending on a selected operation clock, according to an exemplary embodiment of the present invention.

Referring to FIGS. 4A to 4C and 5, the pre-processor 210 pre-processes the camera output image. The pre-processed image is supplied to the image scaler 220 to be scaled to the size and/or number of pixels of the viewing image. At this time, the image scaler 220 can be configured with a resizer and/or a summing and averaging part. The camera output images output from pre-processor are buffered in the buffer 240.

The image processor 120 is capable of processing the images at a frame rate of 30 fps or higher. Assuming that the image processor 120 operates at the frame rate of 30 fps, the viewing image is taken at 30 frame images per second. Although the viewing image is scaled as described above, the capture image is processed in the format of camera's full resolution image. In this case, the image processor can be configured to operate at a low image processing rate in the preview mode but at a high image processing rate for processing both the viewing and capture images in the capture mode. Of course, the image processor can be configured to operate at the high image processing rate in both the preview mode for processing the viewing images and the capture mode for processing the viewing and capture images in the time divisional manner.

The clock generation unit 400 includes a high clock generator 410 for generating a high clock, a low clock generator 420 generating a low clock lower than the high clock in frequency, and a selector 430 which selects one of the high and low clock to be provided as the operation clock in processing capture images under the control of the control unit 100. The buffer 240 buffers the camera output image. First, the camera 110 generates and outputs a frame image in units of vertical synchronization signal Vsync as denoted by reference number 511 of FIG. 5. For example, the vertical synchronization signal Vsync occurs at a period of one frame. The operation clock for processing the viewing image in the preview mode can be set to the low clock or the high clock. If the high clock is selected, the selector 430 supplies the output of the high clock generator 410 to the buffer 240 and the post-processor 230 as the operation clock. In the preview mode, the control unit 100 controls the multiplexer 250 and the demultiplexer 255 to establish the viewing image processing path and, at this time, does not access the buffer 240. The multiplexer 250 selects the output of the scaler 220 and the demultiplexer 255 supplies the output of the post-processor 230 to the display unit 140 so as to establish the viewing image processing path. The camera output image is pre-processed by the pre-processor 210, scaled to the viewing image size by the image scaler 220, and then delivered to the post-processor 230 via the multiplexer 250 at the period as denoted by reference number 511 of FIG. 5. The post-processor 230 processes the viewing image at the high clock rate ad denoted by reference number 513 of FIG. 5 and outputs the post-processed viewing image to the demultiplexer 255 which delivers the post-processed viewing image to the display unit 140 for display.

If a capture request is input in the above state, the control unit 100 controls the multiplexer 250 and the demultiplexer 255 at the beginning part of the frame period (e.g., frame period 521 of FIG. 5) to establish the viewing image processing path as denoted by reference number 551 and then controls the clock generation unit 400 to supply the high clock as the operation clock of the buffer 240 and the post-processor 230. The multiplexer 250 and the demultiplexer 255 operate to establish the viewing image processing path for outputting the selected and processed viewing image to the display unit 140. The image pre-processed by the pre-processor 210 is scaled to the viewing image size by the image scaler 220 and then post-processed by the post-processor 230 to be displayed on the display unit 140.

After processing the viewing image, the control unit 100 controls the multiplexer 250 and the demultiplexer 255 at the ending part of the frame period (frame period 521 of FIG. 5) to establish the capture image processing path as denoted by reference number 553 and then controls the clock generation unit 400 to supply the high clock as the operation clock of the buffer and the post-processor 230. The control unit 100 retrieves the pre-designated camera output image among the camera output images buffered in the buffer 240. At this time, the retrieved image can be the shutter lag-compensated image (e.g., zero shutter lag image). The image retrieved from the buffer 240 is supplied to the post-processor 230 via the multiplexer 250 so as to be post-processed for the duration of 553 of FIG. 5 and then output to the still image codec 260 via the demultiplexer 255. The still image codec 260 encodes the post-processed image, and the storage unit 130 stores the image output from the still image codec 260.

Accordingly, if an image capture request is input, the image processor 120 establishes the viewing image processing path first at the beginning part of the frame period for processing the viewing image and then the capture image processing path during at the residual part of the frame period for processing the capture image.

Second, if the low clock is selected, the selector 430 supplies the output of the low clock generator 420 as the operation clock of the post-processor 230. In the preview mode for processing the viewing image, the control unit 100 controls the multiplexer 250 and the demultiplexer 255 to establish the viewing image processing path and, at this time, does not access the buffer 240. The frame image output by the camera 110 at the period as denoted by reference number 511 of FIG. 5 is preprocessed by the pre-processor 210 and scaled to a viewing image by the image scaler 220, the viewing image being supplied to the post-processor 230 via the multiplexer 250. The post-processor 230 post-processes the viewing image at the low clock rate as denoted by reference number 515 of FIG. 5 and outputs the post-processed viewing image to the demultiplexer 255, which supplies the post-processed viewing image to the display unit 140 for display. For example, when the post-processor 230 operates at the low clock rate, the image processor 120 establishes the viewing image processing path and processes the viewing image of the corresponding frame at the low clock rate as denoted by reference number 515 of FIG. 5. By processing the viewing image at the low clock rate, it is possible to reduce power consumption.

If an image capture request is input, the control unit 100 controls the selector 430 to select the high clock generator 410 such that the high clock rate of the high clock generator 410 is supplied to the buffer 240 and the post-processor 230. For example, the control unit 100 controls the selector 430 to supply the high clock rate to the image processor 120 for the frame period 521 of FIG. 5. The control unit 100 controls the multiplexer 250 and the demultiplexer 255 to establish the viewing image processing path at the beginning part 551 of the corresponding frame 521 and process the viewing image at the high clock rate. The control unit 100 controls the multiplexer 250 and the demultiplexer 255 to establish the capture image processing path at the residual part 553 of the frame period 521 and retrieves the frame image capable of achieving zero shutter lag from the buffer 240. The zero shutter lag frame image retrieved from the buffer 240 is supplied to the post-processor 230 via the multiplexer 250 so as to be post-processed and then output to the still image codec 260 via the demultiplexer 255. The still image codec 260 encodes the post-processed image into a capture image which is stored in the storage unit 130. Accordingly, upon detection of the capture request, the operation clock of the image processor 120 switches from the low clock rate to the high clock rate such that the viewing image processing path is established at the beginning part of the frame period for processing the viewing image at the high clock rate and then the capture image processing path is established at the residual part of the frame period for processing the capture image at the high clock rate.

In the motion image shot mode, the motion image codec 270 encodes the post-processed image from the demultiplexer 255 into the capture image and stores the encoded image in the storage unit 130.

Referring to FIGS. 4B and 5, the camera output image is input to both the image scaler 220 and the buffer 240. The buffer 240 buffers the camera output images while the image scaler 220 scales the camera output image to the viewing image size. As aforementioned, the scaler can be provided with a resizer and/or a summing and averaging part. The clock unit 400 is capable of generating a low clock or a high clock to the buffer 240, the pre-processor 210, and the post-processor 230 as their operation clock. The clock unit 400 may include a high clock generator 410, a low clock generator 420, and a selector 430.

In the preview mode for processing the viewing image, the control unit 100 controls the multiplexer 250 and the demultiplexer 255 to establish the viewing image processing path. Once the viewing image processing path has been established, the multiplexer 250 supplies the viewing image output by the image scaler 220 to the pre-processor 210, and the demultiplexer 255 supplies the output of the post-processor 230 to the display unit 140. At this time, if the high clock rate is provided to the pre-processor 210 and the post-processor 230 as operation clock rate, the pre-processor 210 and the post-processor 230 perform pre-processing and post-processing at the corresponding parts of the frame duration as denoted by reference number 513 of FIG. 5 respectively such that the processed viewing image is display by the display unit 140. If the low clock rate is provided to the pre-processor 210 and the post-processor 230 as the operation clock rate, the pre-processor 210 and the post-processor 230 perform pre-processing and post-processing at the corresponding parts of the frame duration as denoted by reference number 515 of FIG. 5 respectively such that the processed viewing image is displayed by the display unit 140.

If an image capture request is input for the frame duration 521 of FIG. 5, the control unit controls the clock generation unit 400 to provide the high clock rate to the buffer 240, the pre-processor 210, and the post-processor 230 as the operation clock rate. The control unit 100 controls the multiplexer 250 and the demultiplexer 255 to establish the viewing image processing path at the beginning part of the frame duration 521. In this case, the multiplexer 250 supplies the viewing image of the current frame which is processed by the image scaler 200 to the pre-processor 210, and the pre-processor 210 and the post-processor 230 process the viewing image at the part 551 of FIG. 5, the processed viewing image being supplied to the display unit 140 via the demultiplexer 250 for display. Thereafter, the control unit 100 controls to establish the capture image processing path at the residual part 553 of the frame 521 and retrieves a pre-designated camera output image (e.g., zero shutter lag image) from the buffer 240. In this case, the multiplexer 250 supplies the output of the buffer 240 to the pre-processor 210, and the capture image processed by the pre-processor 210 and the post processor 230 is supplied to the still image codec 260 through the demultiplexer 255. The still image codec encodes the capture image compressively so as to be stored in the storage unit 130. As described above, the image processor 120 processes the viewing image of the current frame and the pre-designated frame image (e.g. camera output image with zero shutter lag) in a time divisional manner for the frame duration. In response to the image capture request, the image processor 120 generates the viewing image of the current frame to the display unit 140, the viewing image being displayed, and encodes the pre-designated camera output image for accomplishing zero shutter lag or selected by the user compressively, the compressed image being stored in the storage unit 130.

In the motion image shot mode, the motion image codec 270 encodes the post-processed image from the demultiplexer 255 into the capture image and stores the encoded image in the storage unit 130.

Referring to FIG. 4C, the clock generation unit 400 includes a high clock generator 410 and a low clock generator 420 and a selector 430. The clock generation unit 400 supplies the high clock rate or a low clock rate to the buffer 240, pre-processor 210, and the post-processor 230 as operation clock under the control of the control unit 100. The buffer 240 buffers the camera output images. The image scaler 220 scales the camera output image of the current frame from the buffer 240 to the viewing image. The multiplexer 250 supplies the viewing image to the image scaler 220 in the preview mode and the viewing image output from the image scaler 220 and the capture image output from the buffer 240 to the multiplexer 250 sequentially in the capture mode in the time divisional manner during the one frame period. The pre-processor 210 pre-processes the viewing and capture images output from the multiplexer 250 in a time divisional manner under the control of the control unit 100. The post-processor 230 post-processes the pre-processed viewing and capture images under the control of the control unit 100. The demultiplexer 255 supplies the viewing image output from the post-processor 230 to the display unit in the preview mode and supplies the viewing and capture images output from the post-processor 230 to the display unit 140 and the still image codec 260 respectively in a time divisional manner in the capture mode sequentially. In the motion image shot mode, demultiplexer 255 supplies the capture image to motion image codec 270 which encodes the capture image and stores the encoded image in the storage unit 130.

In the preview mode, the image processing unit 120 processes the viewing image at a low clock rate in the preview mode and processes the viewing and capture images at a high clock rate in the capture mode. The image processor 120 is also capable of processing the camera output image at the high clock rate in both the preview mode and the capture mode.

In the preview mode of processing the viewing image, the buffer 240 buffers the camera output images and the image scaler 220 scales the camera output image of the current frame to the viewing image under the control of the control unit 100. The control unit 100 controls the multiplexer 250 and the demultiplexer 255 to establish the viewing image processing path. Once the viewing image processing path has been established, the multiplexer 240 supplies the viewing image generated by the image scaler 220 to the pre-processor 210, and the demultiplexer 255 supplies the output of the post-processor 230 to the display unit 140. At this time, if the high clock rate is provided to the pre-processor 210 and the post-processor 230 as the operation clock, the pre-processor 210 and the post processor 230 pre-processes and post-processes, respectively, the viewing image generated by the image scaler at a partial duration of the corresponding frame duration as denoted by reference number 513 of FIG. 5, the processed viewing image being supplied to the display unit 140. If the low clock rate is provided to the pre-processor 210 and the post-processor 230 as the operation clock, the pre-processor 210 and the post-processor 230 pre-processes and post-processes, respectively, the viewing image generated by the image scaler 220 in the corresponding frame duration as denoted by reference number 515 of FIG. 5, the processed viewing image being supplied to the display unit 140.

If an image capture request is input for the frame duration 521 of FIG. 5, the control unit 100 controls the clock generation unit 400 to provide the high clock rate to the buffer 240, the pre-processor 210, and the post-processor 230 as the operation clock. The control unit 100 controls the multiplexer 250 and the demultiplexer 255 to establish the viewing image processing path at the beginning part of the frame duration 521. In this case, the multiplexer 250 supplies the current frame viewing image processed by the image scaler 240 the pre-processor 210, and the pre-processor 210 and the post-processor 230 processes the viewing image at the part 551 of the frame duration as shown in FIG. 5, the viewing image being supplied to the display unit 140 via the demultiplexer 255 so as to be displayed. Thereafter, the control unit 100 controls to establish the capture image processing path for the residual duration 553 of the frame 521 and retrieves the camera output image at a camera output image frame (e.g., zero shutter lag image) from the buffer 240. The multiplexer 250 supplies the output of the buffer 240 to the pre-processor 210, and the capture image processed by the pre-processor 210 and the post-processor 230 is supplied to the still image codec 260 via the demultiplexer 255. The still image codec encodes the capture image compressively such that the compressed image is stored in the storage unit 130.

Although not depicted, the image processor 120 can be configured such that the output end of the buffer 240 is connected to the pre-processor 210, the output ends of the pre-processor 210 and the buffer 240 are connected to the multiplexer 250, the output end of the multiplexer 250 to the image scaler 220, and the output end of the image scaler 220 is connected to the post-processor 230.

Figure 6A:
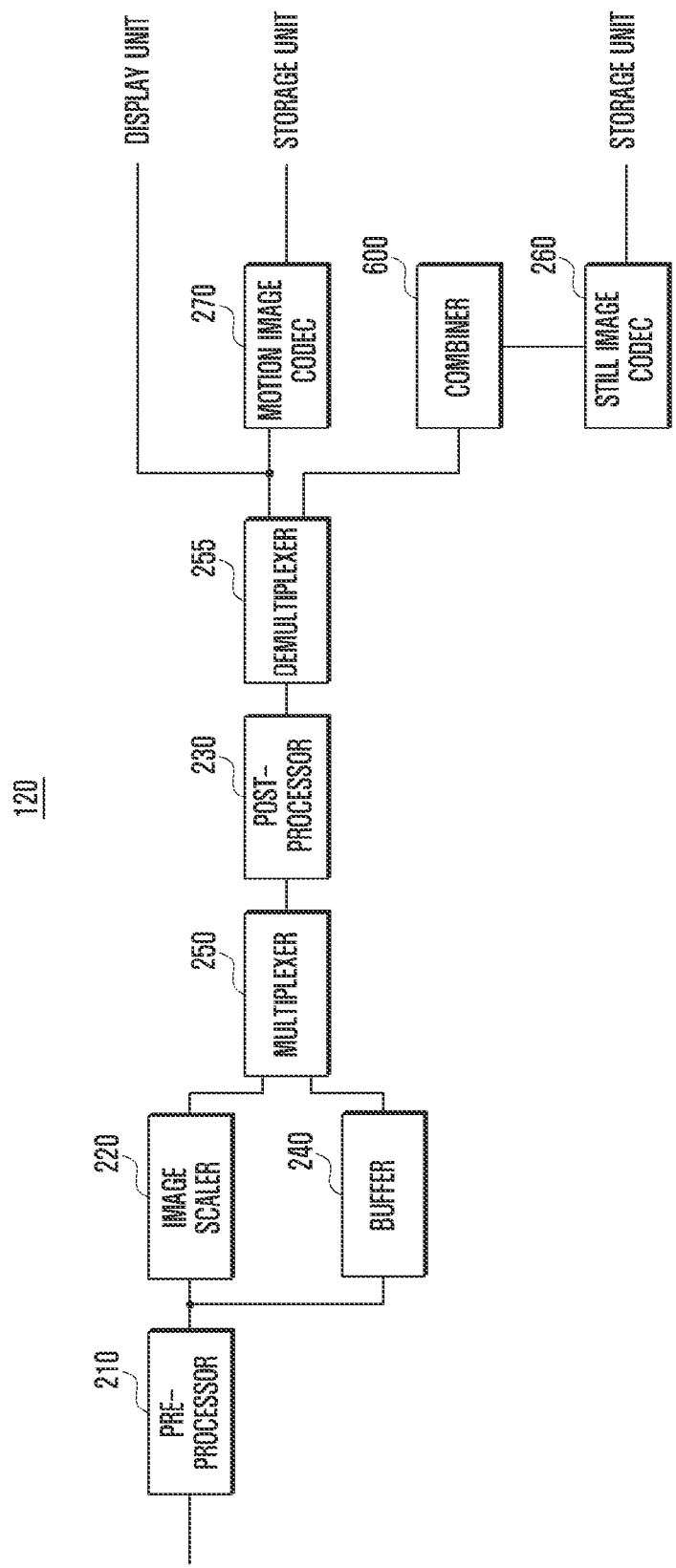
Figure 6C:
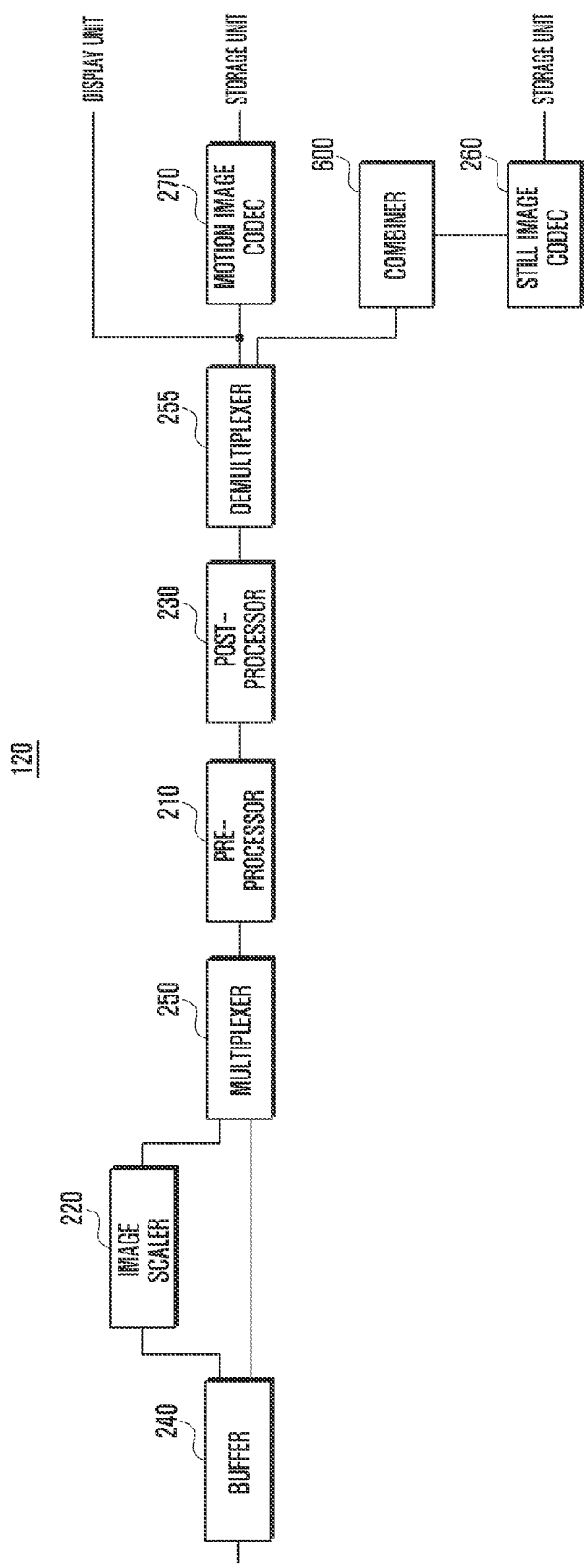

FIGS. 6A to 6C are block diagrams illustrating exemplary configurations of an image processor such as, for example, the image processor of FIG. 1 according to another exemplary embodiment of the present invention.

Referring to FIGS. 6A to 6C, the illustrated configurations of the image processor 120 are directed to the cases in which the image processor 120 divides a frame image into plural image blocks, processes the image blocks, and combines the processed image blocks into a capture image.

Figure 7A:
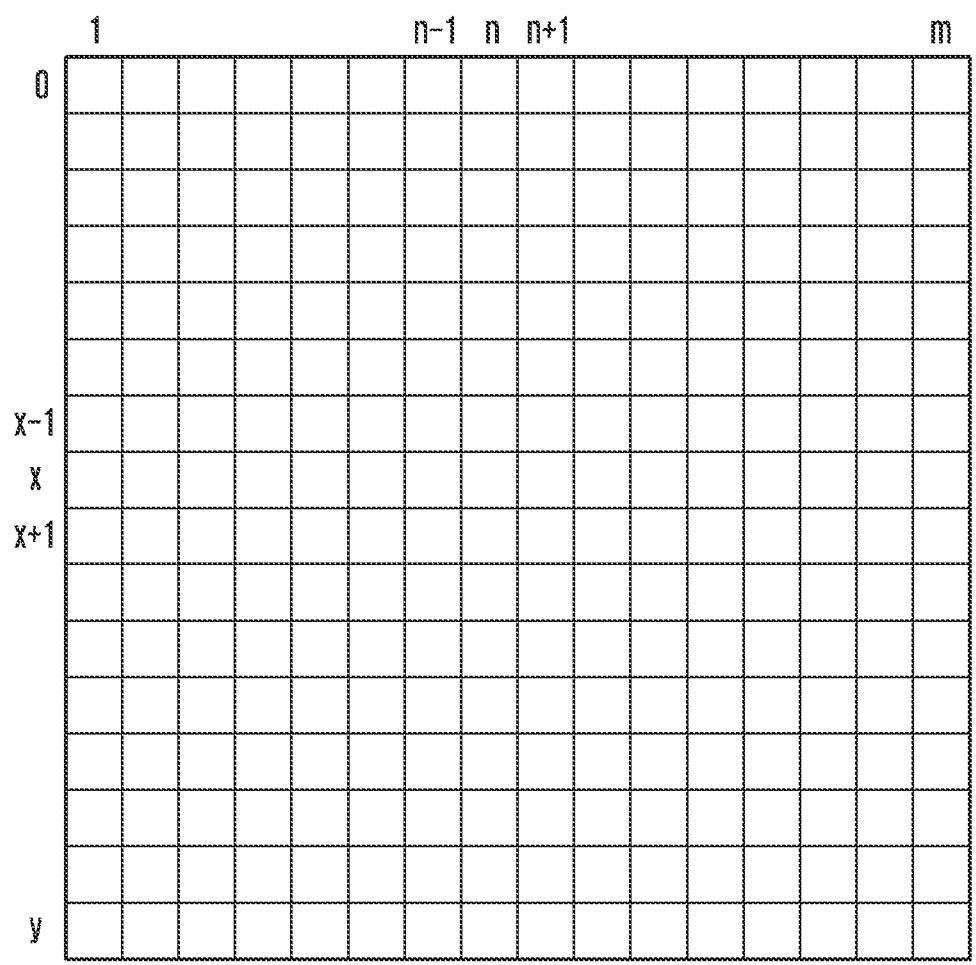
FIGS. 7A to 7C are diagrams illustrating a principle of processing a frame image in a state of image blocks in an image processor such as, for example, image processors of FIGS. 6A to 6C according to an exemplary embodiment of the present invention.
Figure 7B:
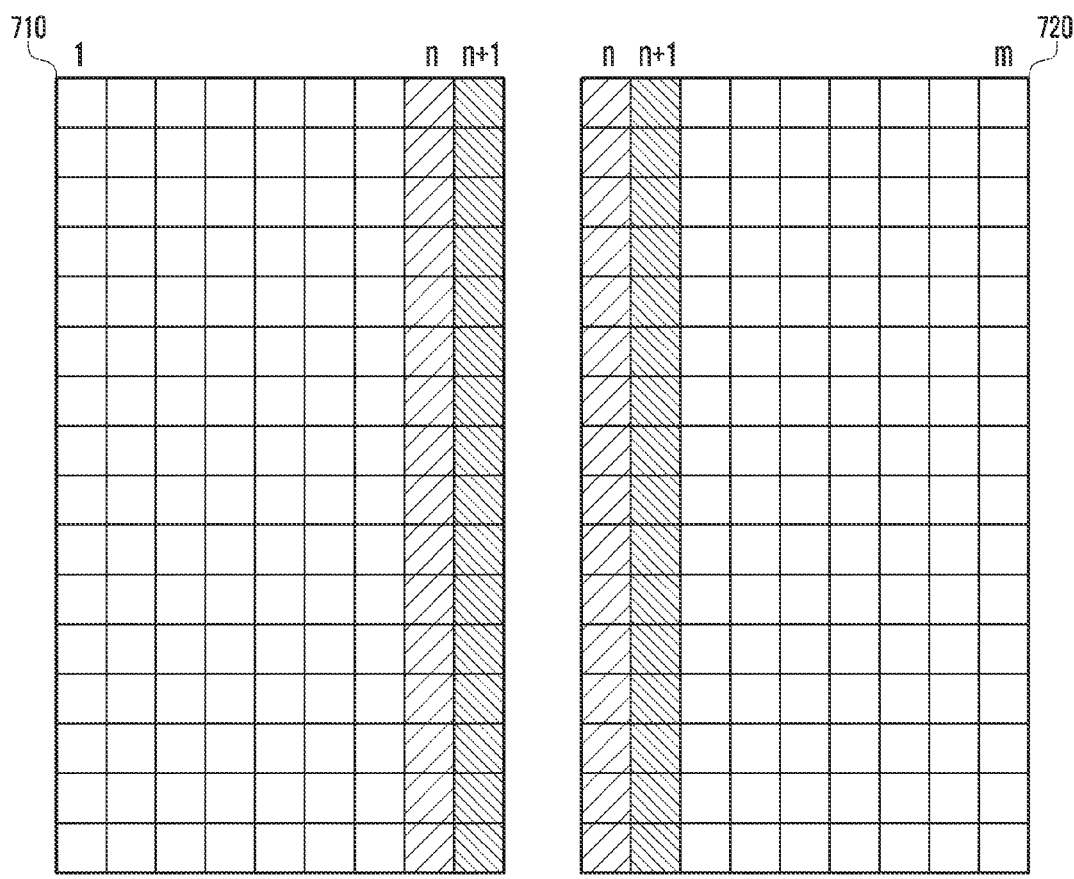
Figure 7C:
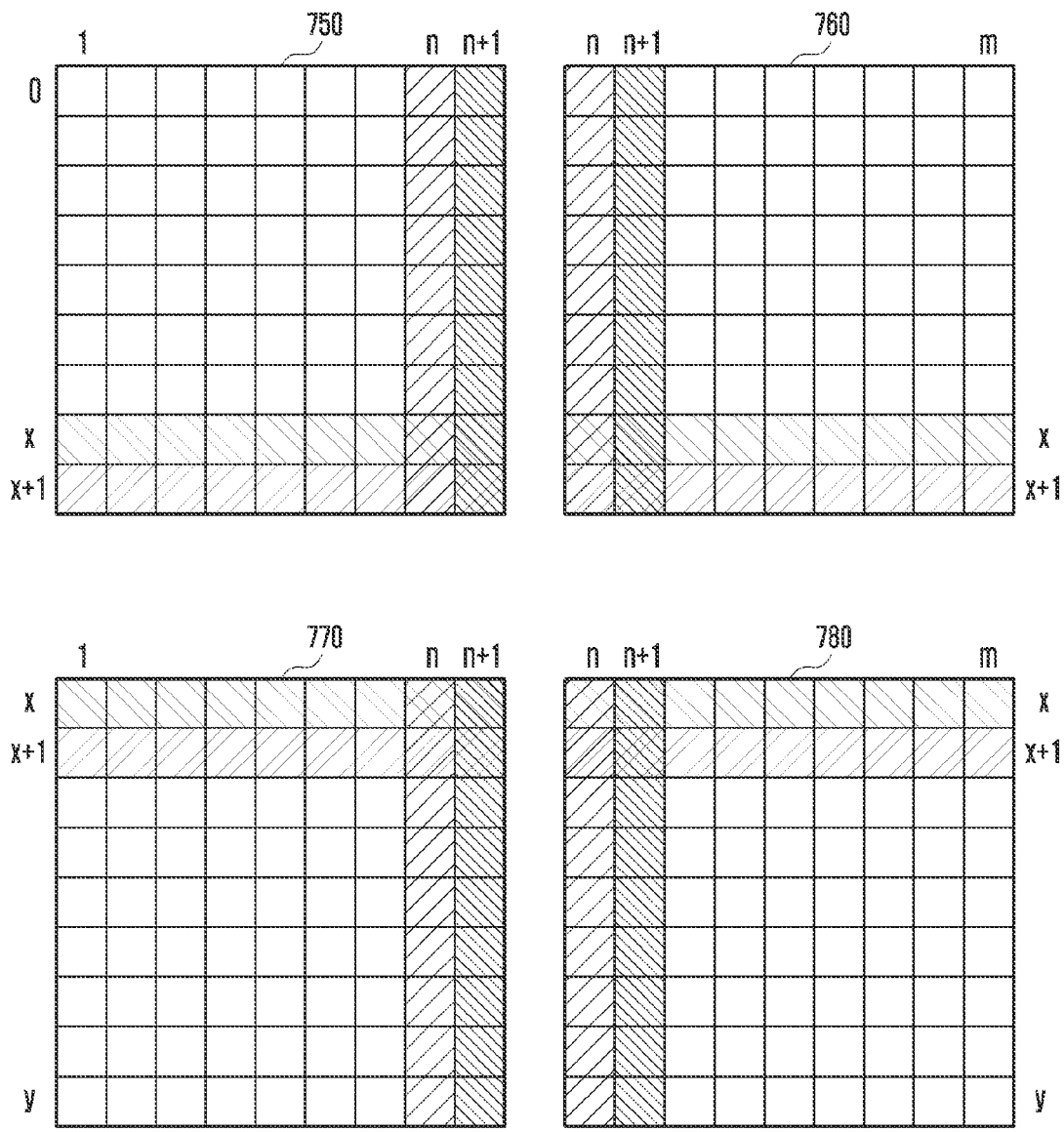

FIGS. 7A to 7C are diagrams illustrating a principle of processing the frame image in a state of image blocks in an image processor such as, for example, image processors of FIGS. 6A to 6C.

Referring to FIGS. 6A and 7A to 7C, the pre-processor 210 pre-processes the camera output image. The pre-processed image is transferred to the image scaler 220 so as to be scaled to the size and/or number of pixels of the viewing image. At this time, the image scaler 220 is capable of including a resizer and/or a summing and averaging part. In the preview mode of processing the viewing image, the control unit controls the multiplexer 250 and the demultiplexer 255 to establish the viewing image path for transferring the output of the image scaler 220 to the display unit 140. The multiplexer 250 supplies the viewing image output from the image scaler 220 to the post-processor 230. The post-processor 230 performs color interpolation, IPC processing, and image conversion on the image scaled to the size (or number of pixels) of the viewing image by the image scaler 220. The demultiplexer 255 transfers the post-processed viewing image to the display unit 140, which displays the viewing image. In the state of operating in the preview mode, the camera output image from the pre-processor 210 is buffered in the buffer 240. Because the control unit 100 does not perform image processing on the images buffered in the buffer 240 in the preview mode, it is possible to save power in the preview mode.

If a capture request is input in the above state, the control unit 100 controls the multiplexer 250 and the demultiplexer 255 in a time divisional manner for processing the viewing and capture images for the capture image frame duration. In this case, the multiplexer 250 and the demultiplexer 255 select the viewing image at the beginning part of the frame and then the capture image at the residual part of the frame under the control of the control unit 100 in a time divisional manner. The capture image processing duration can be set to be longer than the viewing image processing duration. In the viewing image processing duration, the viewing image is transferred to the display unit 140 via the image scaler 220, the multiplexer 250, the post-processor 230, and the demultiplexer 255. In the capture image processing duration, the capture image is transferred to the combiner 600 via the buffer 240, the multiplexer 250, the post-processor 230, and the demultiplexer 255.

A description is made of the image processing operation at the capture image frame. The control unit 100 controls the image processor 120 in a time divisional manner to process the viewing and capture images. The control unit 100 first establishes the viewing image processing path such that the camera output image pre-processed by the pre-processor 210 is buffered in the buffer 240 and scaled to the viewing image by the image scaler 220 simultaneously. The viewing image is supplied to the post-processor 230 via the multiplexer 250 so as to be processed by the post-processor 230 and then supplied to the display unit 140 via the demultiplexer 255, the viewing image being displayed by the display unit 140. As described above, the viewing image processing procedure is performed in the same manner as the preview image processing procedure. Thereafter, the control unit 100 processes the capture image at the residual part of the capture image frame.

In the capture image processing duration, the control unit retrieves the camera output image at a pre-designated frame from the buffer 240 as the capture image. The capture image can be the camera output image capable of compensating for the shutter lag among the frame images buffered in the buffer 240 which is selected by taking notice of the shutter lag. At this time, the selected camera output image can be structured as shown in FIG. 7A. FIG. 7A shows an exemplary frame image having the size of m*y under the assumption of m=2n and y=2x. When processing the capture image, the control unit reads the capture image from the buffer 240 in unit of block having a predetermined size and the block images (tile images) are supplied to the post-processor 230 through the multiplexer 250. The post-processor 230 post-processes the tile images and the demultiplexer 255 outputs the post-processed tile images to the combiner 600. The combiner 600 combines the time images into one frame image. The reason for post-processing the camera output image in the form of divided tile images is to reduce the number of gates of the post-processor 250 and thus simplify the hardware configuration and reduce power consumption. Also, the reason for processing the camera output image in the form of divided tile images is to facilitate processing the camera output image which is too large (e.g., a high pixel image) such that the viewing image and camera output image cannot be processed simultaneously in one frame duration.

First, a description is made of the operation of post-processing the camera output image (frame image) as divided into two tile images. In the case that the camera output image is divided into two tile images equal in size, each of the two tile images has a size of n*y. At this time, the frame image can be divided horizontally into a tile image consisted of columns (1)-(n) and a tile image consisted of columns (n+1)-(m). However, when post-processing the frame image, the color interpolation and IPC processing are performed with adjacent pixels such that the frame image is divided into the first tile image including (1)-(n+a) columns and the second tile image including (n−a+1)-(m) columns, where 'a' varies depending on post-processor's processing type. For example, 'a' denotes a number of overlapped columns and, in an exemplary embodiment of the present invention, a=1 is assumed. The control unit 100 reads the first tile image 710 of FIG. 7B and supplies the first tile image 710 to the post-processor 230, and the post-processor 230 post-processes the first tile image 710 as described above and outputs the post-processed first tile image to the combiner 600 via the demultiplexer 255. Thereafter, the control unit 100 reads the second tile image 720 of FIG. 7B and supplies the second tile image 720 to the post-processor 250, and the post-processor 230 post-processes the second tile image 720 and outputs the post-processed second tile image to the combiner 600 via the demultiplexer 255. By transferring the camera output image of FIG. 7A as divided into the first and second tile images 710 and 720 of FIG. 7B, it is possible to transfer the tile images in one frame duration or in the frames as many as the number of tile images. In the latter case, the two tile images are processed for two frames duration. The combiner 600 combines the two tile images received for the two frame duration into one frame image.

At this time, because the tile images transferred via the demultiplexer 255 further include adjacent pixels in order to use the information of the adjacent pixels in post-processing (pixels on column n+1 in case of the tile image 710 of FIG. 7B and pixels on column n in case of the tile image 720 of FIG. 7B), the pixels of the corresponding column before combining the tile images should be removed. In the case that the post-processed tile images as denoted by reference number 710 and 720 of FIG. 7B are input, the combiner 600 removes the pixels of the column n+1 of the first tile image and the pixels of the column n of the second tile images and then combines the tile images into the frame image. Thereafter, the frame image output by the combiner 600 is supplied to the still image codec 260 which encodes the frame image compressively, the compressed image being stored in the storage unit 130.

Second, a description is made of the operation of post-processing the frame image as divided into four tile images. As illustrated in FIG. 7C, in the case in which the frame image is divided into four tile images, each tile image has a size of n*x, and the tile images can be expressed as a set {(1)-(n), (1)-(x); {(n+1)-(m), (1)-(x); (1)-(n), (x+1)-(y); {(n+1)-(m), (x+1)-(y)}.

However, when post-processing the frame image, the color interpolation and IPC processing are performed with adjacent pixels such that the frame image is divided into the four tile images as denoted by reference numbers 750, 760, 770, and 780, i.e. {(1)-(n+1), (1)-(x+1); {(n)-(m), (1)-(x+1); (1)-(n+1), (x)-(y); {(n)-(m), (x)-(y)}. Thereafter, the control unit 100 reads the first tile image 750 of FIG. 7C and supplies the first tile image 710 to the post-processor 230, and the post-processor 230 post-processes the first tile image 750 as described above and outputs the post-processed first tile image to the combiner 600 via the demultiplexer 255. Likewise, the control unit 100 reads the tile images 760, 770, and 780, supplies the tile image to the post-processor 230 in sequence, and the post-processor 230 post-processes the tile images and outputs the post-processed tile images to the combiner 600 via the demultiplexer 255 in sequence. In the case of processing the frame image of FIG. 7A as divided into the first to fourth tile images 750 to 780 of FIG. 7C, the tile images are processed for four frames duration. The combiner 600 combines the four tile images received for the four frames duration into one frame image.

At this time, because the tile images further include adjacent pixels in order to use the information of the adjacent pixels in post-processing (pixels on column n+1 and x+1 rows in case of the tile image 750 of FIG. 7C, pixels on column n and x+1 rows in case of the tile image 760 of FIG. 7C, pixels on column n and x+1 rows in case of the tile image 770 of FIG. 7C, and pixels on column n and x rows in case of the tile image 780 of FIG. 7C), the pixels of the corresponding column before combining the tile images should be removed. In the case that the post-processed tile images as denoted by reference number 750 to 780 of FIG. 7C are input, the combiner 600 removes the pixels of the adjacent columns of the tile images and then combines the tile images into the frame image. Afterward, the frame image output by the combiner 600 is supplied to the still image codec 260 which encodes the frame image compressively, the compressed image being stored in the storage unit 130.

As described above, the post-processor 230 processes the camera output images in unit of ½ of frame size in the case that the frame image is processed as divided into two tile images as shown in FIG. 7B and in unit of ¼ of frame size in the case that the frame image is processed as divided into four tile images as shown in FIG. 7C. Because the camera output images are processed as divided into a predetermined number of tile images, it is possible to reduce the number of logic gates of the post-processor 230 dramatically, resulting in reduction of power consumption.

In the motion image shot mode, the motion image codec 270 encodes the viewing image output from the demultiplexer 255 to store the encoded image in the storage unit 130.

FIG. 6B shows an exemplary procedure of a capture image in such a way of dividing the camera output image into plural tile images, pre-processes and post-processes the tile images, and combines the processed tile images into the capture image.

A description is made of the configuration and operation of the image processor 120 structured as shown in FIG. 6B. First, the camera output image is input to the image scaler 220 and the buffer 240 simultaneously. The buffer 240 buffers the camera output images while the image scaler 220 scales the camera output images to the viewing image size. As aforementioned, the image scaler 220 can be provided with a resizer and/or a summing and averaging part.

In the preview mode of processing the viewing image, the control unit 100 controls the multiplexer 250 and the demultiplexer 255 to establish the viewing image processing path. Once the viewing image processing path has been established, the multiplexer 250 supplies the viewing image generated by image scaler 220 to the pre-processor 210, and the demultiplexer 255 supplies the output of the post-processor 230 to the display unit 140. The pre-processor 210 and the post-processor 230 process the viewing image respectively such that the processed viewing image is displayed by the display unit 140.

If a capture request is input in the above state, the control unit 100 controls the multiplexer 250 and the demultiplexer 255 in a time divisional manner to process the viewing and capture images in the capture image frame duration. In this case, the multiplexer 250 and the demultiplexer 255 take the viewing image first at the beginning part of the frame and then the capture image at the residual part of the frame under the control of the control unit 100 in a time divisional manner. The capture image processing duration can be set to longer than the viewing image processing duration. The viewing image output from the image scaler 220 for the viewing image processing duration is supplied to the display unit 140 via the multiplexer 250, the pre-processor 210, the post-processor 230, and the demultiplexer 255. The tile images output from the buffer 240 for the capture image processing duration is supplied to the combiner 600 via the multiplexer 250, the pre-processor 210, the post-processor 230, and the demultiplexer 255. As described with reference to FIG. 6B, in processing the capture image, the camera output image as shown in FIG. 7A is output from the buffer 240 in the form of divided tile images as shown in FIG. 7B or 7C and processed by the pre-processor 210 and the post-processor 230 sequentially to be supplied to the combiner 600. The combiner 600 combines the processed tile images into a frame image, and the still image codec 260 encodes the combined camera output image compressively, the compressed camera output image is being stored in the storage unit 130. The camera output image division and combining processes of the image processor 120 can be performed as described with reference to FIG. 6A.

In the motion image shot mode, the motion image codec 270 encodes the viewing image output from the demultiplexer 255 to store the encoded image in the storage unit 130.

Referring to FIG. 6C, the buffer 240 buffers the camera output images. The control unit 100 controls such that the camera output image of the frame selected from the buffer 240 is read out in the form of tile images with a predetermined size. The image scaler 220 scales the current frame image output from the buffer 240 to the viewing image. The multiplexer 250 takes the output of the image scaler 220 in the preview mode of processing the viewing image and takes the viewing image output from the image scaler 220 and the tile images of the camera output image output from the buffer 240 sequentially in a time divisional manner for one frame duration in the capture mode of capturing the camera output image. The pre-processor 210 pre-processes the viewing image and the tile images output from the multiplexer 250 in a time divisional manner under the control of the control unit 100. The post-processor 230 post-processes the pre-processed viewing image and tile images under the control of the control unit 100. The demultiplexer 255 supplies the viewing image output from the post-processor 230 to the display unit 140 in the preview mode and the viewing image and the tile images output from the post-processor 230 to the display unit 140 and the combiner 600 respectively in a time divisional manner under the control of the control unit 100. The combiner 600 combines the tile images into the camera output image of one frame, and the still image codec 260 encodes the camera output image supplied by the combiner 600 compressively, the compressed image is stored in the storage unit 130.

In the motion image shot mode, the motion image codec 270 encodes the viewing image output from the demultiplexer 255 to store the encoded image in the storage unit 130.

According to an exemplary embodiment of the present invention, as illustrated FIG. 6C, in the preview mode of processing the viewing image, the buffer buffers the camera output images in the preview mode and the image scaler 220 scales the camera output image of the current frame to the viewing image under the control of the control unit 100. The control unit 100 also controls the multiplexer 250 and the demultiplexer 255 to establish the viewing image processing path. Once the viewing image processing path has been established, the multiplexer 250 supplies the viewing image generated by image scaler 220 to the pre-processor 210, and the demultiplexer 255 supplies the output of the post-processor 230 to the display unit 140.

If a camera output image capture request is input, the control unit 100 controls the multiplexer 250 and the demultiplexer 255 to establish the viewing image processing path. The multiplexer 250 supplies the viewing image processed by the image scaler 240 to the pre-processor 210, the pre-processor 210 and the post-processor 230 process the viewing image, and the demultiplexer 255 supplies the processed viewing image to the display unit 140 for display. Afterward, the control unit 100 controls the multiplexer 25 and the demultiplexer 255 to establish the capture image processing path and controls the buffer 240 to output the tile images of the capture image of the pre-designated frame (e.g., an image with zero shutter lag). The multiplexer 250 supplies the tile images output from the buffer 240 to the pre-processor, and the pre-processor 210 and the post-processor 230 process the tile images, the processed tile images being supplied to the combiner 600 via the demultiplexer 255. The capture image processing operation is repeated as many as the number of tile images constituting a frame of camera output image, and the combiner 600 combines the processed tile images into the camera output image of one frame, the combined camera output image being supplied to the still image codec 260. The still image codec 260 encodes the combined camera output image compressively, the compressed image is stored in the storage unit 130 as the capture image. The operations of dividing and combining the camera output image are performed as described with reference to FIGS. 6A and 7A to 7C. Although not depicted, the image processor 120 can be configured such that the output end of the buffer 240 is connected to the pre-processor 210, the output ends of the pre-processor 210 and the buffer 240 are connected to the multiplexer 250, the output end of the multiplexer 240 to the image scaler 220, and the output end of the image scaler 240 is connected to the post-processor 230.

The image processor 120 structured as shown in any of FIGS. 6A to 6C processes the camera output image of a predetermined as divided into the tile images in response to a capture request. This is to simplify the hardware configuration of the image processor 120 (e.g., a reduction of the number of gates of the pre-processor 210 and/or post processor 230) and reduce the power consumption of the image processor 120. The reason for processing (pre-processing and/or post-processing) the camera output image in the form of divided tile images is to facilitate processing the camera output image which is too large (i.e. high pixel image) such that the viewing image and camera output image cannot be processed simultaneously in one frame duration. By processing the camera output image as divided into tile images in the capture mode, it is possible to capture the high volume and high pixel image stably.

Figure 8A:
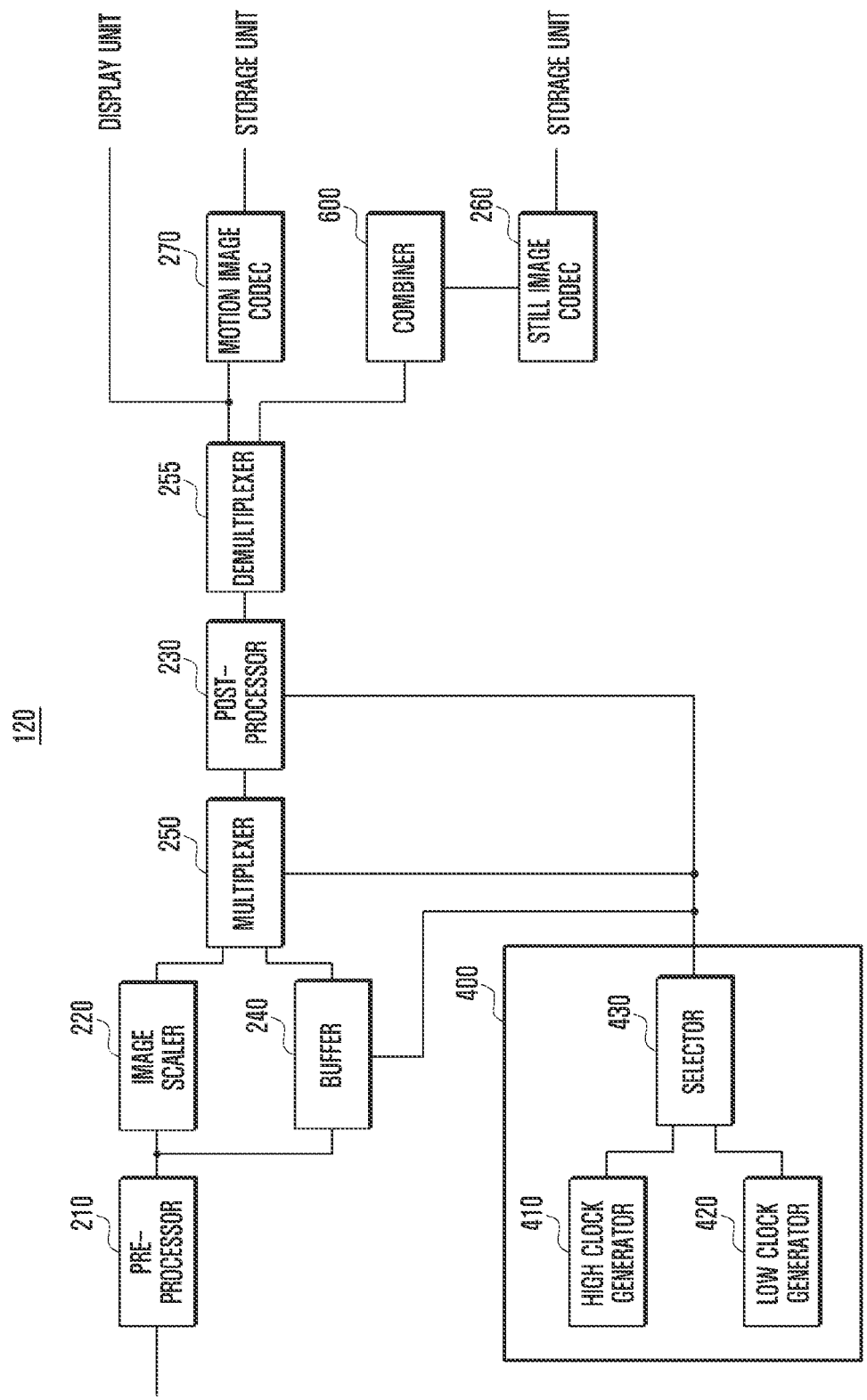
Figure 8B:
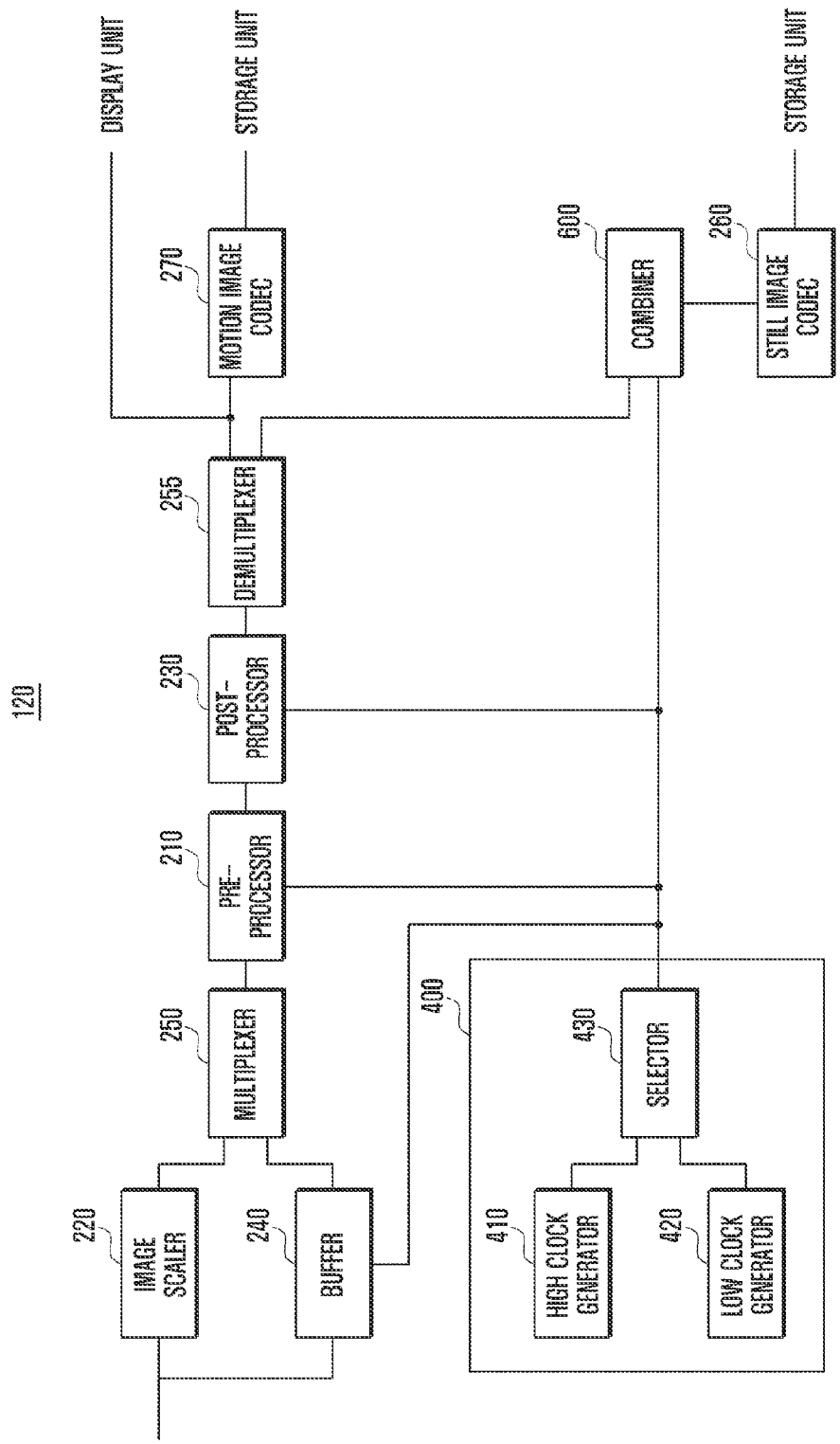

FIGS. 8A to 8C are block diagrams illustrating exemplary configurations of an image processor such as, for example, the image processor of FIG. 1 according to an exemplary embodiment of the present invention.

Referring to FIGS. 8A to 8C, according to exemplary embodiments of the present invention, the image processor 120 uses plural operation clocks, processes the frame image as divided into tile images for acquiring a capture image, and combines the processed tile images into the capture image.

FIG. 9 is a diagram illustrating an image processing timings of an image processor such as, for example, the image processor structured as shown in any of FIGS. 8A to 8C.

As shown in FIGS. 7A to 7C, the camera output image of one frame is divided into plural tile images having a predetermined size in the capture image processing mode, the tile images being processed independently and then combined into the capture image.

Referring to FIGS. 7A to 7C, 8A, and 9, the pre-processor 210 pre-processes the camera output image. The image scaler 220 scales the pre-processed image to the size and/or number of pixels of the viewing image. At this time the image scaler 220 can be implemented with a resizer and/or a summing and averaging part. In the preview mode, the image output by the pre-processor 210 is buffered in the buffer 240. At this time, the post-processor 230 and the still image codec 260 are disabled to save power in the preview mode.

The clock generation unit 400 includes a high clock generator 410 for generating a high clock, a low clock generator 420 generating a low clock lower than the high clock in frequency, and a selector 430 which selects one of the high and low clock to be provided as the operation clock in processing capture images under the control of the control unit 100. First, the camera 110 generates and outputs a frame image in unit of vertical synchronization signal Vsync as denoted by reference number 911 of FIG. 9. For example, the vertical synchronization signal Vsync occurs at a period of one frame. The operation clock for processing the viewing image in the preview mode can be set to the low clock or the high clock. If the high clock is selected, the selector 430 supplies the output of the high clock generator 410 to the buffer 240 and the post-processor 230 as the operation clock. In the preview mode, the control unit 100 controls the multiplexer 250 and the demultiplexer 255 to establish the viewing image processing path without access the buffer 240. The frame image generated by the camera 110 at the period as denoted by reference number 911 of FIG. 9 is processed by the pre-processor 210 and the image scaler 220 to generate a viewing image which is transferred to the post-processor 230 via the multiplexer 250. The post processor 230 processes viewing images at the high clock rate as denoted by reference number 913, and the demultiplexer 255 transfers the post-processed viewing image to the display unit 140 for display. Second, if the low clock is selected, the selector 430 supplies the output of the low clock generator 420 as the operation clock of the post-processor 230. The post-processor processes the viewing image at the high clock as denoted by reference number 915 of FIG. 9, and the demultiplexer 255 supplies the post-processed viewing image to the display 140 for display.

If a capture request is input in the above state, the control unit 100 controls the multiplexer 250 and the demultiplexer 255 to establish the viewing image processing path in the capture frame period and process the viewing at a high clock rate in the capture frame period as denoted by reference numbers 951 and 961. Afterward, the control unit 100 controls the multiplexer 250 and the demultiplexer 255 to establish the capture image processing path in the capture frame period (frame duration 921 and 923 of FIG. 9) as denoted by reference number 953 and 963 and retrieves the camera output image of a pre-designated frame (e.g. frame image with zero shutter lag) from the buffer 240. At this time, the control unit 100 reads out the camera output image of one frame in the divided tile images having a predetermined size as described with reference to FIGS. 7A to 7C. For example, if a capture request is input, the control unit 100 reads the frame image from the buffer 240 by block size (e.g., tile image) to the post-processor 230 via the multiplexer 250. The post-processor 230 post-processes the tile images and outputs the post-processed tile images to the combiner 600 via the demultiplexer 255. The combiner 600 combines the processed tile images into a frame of camera output image.

In the case in which the camera output image is read out in the form tile images having size of ½ of the frame image, the control unit 100 reads the first and second tile images as denoted by reference numbers 710 and 720 of FIG. 7B. The first tile image 710 read out from the buffer 240 in the frame duration 921 is transferred to the post-processor 230 via the multiplexer 250 so as to be post-processed and then supplied to the combiner 600 via the demultiplexer 255. Afterward, the second tile image 720 of FIG. 7B read out from the buffer 240 in the next frame duration (frame duration 923 of FIG. 9) is transferred to the post processor 230 via the multiplexer 250 as denoted by reference number 963 of FIG. 9 and then supplied to the combiner 600 via the demultiplexer 255.

At this time, because the tile images transferred via the demultiplexer 255 further include adjacent pixels in order to use the information of the adjacent pixels in post-processing (pixels on column n+1 in case of the tile image 710 of FIG. 7B and pixels on column n in case of the tile image 720 of FIG. 7B), the pixels of the corresponding column before combining the tile images should be removed. In the case that the post-processed tile images as denoted by reference number 710 and 720 of FIG. 7B are input, the combiner 600 removes the pixels of the column n+1 of the first tile image and the pixels of the column n of the second tile images and then combines the tile images into the frame image. Thereafter, the frame image output by the combiner 600 is supplied to the still image codec 260 which encodes the frame image compressively, the compressed image being stored in the storage unit 130. In this way, the image processor 120 processes the viewing image at the selected clock rate in the preview mode as denoted by reference numbers 913 and 915. In the capture mode, if the high clock selected, the control unit controls the multiplexer 250 and the demultiplexer 255 to process the viewing and capture images within one frame duration. The control unit 100 controls such that the camera output image is divided into plural tile images, the tile images are processed at the high clock rate across the frame durations as many as the number of tile images. If the number of tile images is 3, the time images are processed across three frames duration; and if the number of tile image is 4 (as shown in FIG. 7C), the tile images are processed across four frames duration.

Referring to FIG. 8B, the camera output image is input to the image scaler 220 and the buffer 240 simultaneously. The buffer 240 buffers the camera output image while the image scaler 220 scales the camera output image to the viewing image size. As aforementioned, the image scaler 220 is capable of including a resizer and/or a summing and averaging part. The clock generation unit 400 provides the selected clock (low clock or high clock) as the operation clock of the image processor 120.

In the preview mode of processing the viewing image, the control unit 100 controls the multiplexer 250 and the demultiplexer 255 to establish the viewing image processing path. The control unit 100 controls the clock generation unit 400 to provide the low clock or the high clock as the operation clock of the image processor 120. Once the viewing image processing path has been established, the multiplexer 250 supplies the viewing image generated by image scaler 220 to the pre-processor 210, and the demultiplexer 255 supplies the output of the post-processor 230 to the display unit 140. The pre-processor 210 and the post-processor 230 process the viewing image respectively such that the processed viewing image is displayed by the display unit 140. If the low clock is provided as the operation clock, the image processor 120 processes the viewing image as denoted by reference number 915 of FIG. 9; and if the high clock is provided as the operation clock, the image processor processes the viewing image as denoted by reference number 913 of FIG. 9.

If a capture request is input in the above state, the control unit 100 controls the multiplexer 250 and the demultiplexer 255 in a time divisional manner to process the viewing and capture images in the capture image frame duration. The control unit 100 controls the clock generation unit 400 to provide the high clock as the operation clock of the image processor 120. In this case, the multiplexer 250 and the demultiplexer 255 take the viewing image first at the beginning part of the frame and then the capture image at the residual part of the frame under the control of the control unit 100 in a time divisional manner. In the case in which the camera output image is processed as divided into two tile images, the viewing image output by the image processor 220 in the viewing image processing duration as denoted by reference number 951 and 961 is transferred to the display unit 140 via the multiplexer 250, the pre-processor 210, the post-processor 230, and the demultiplexer 255. Thereafter, the tile images output from the buffer 240 for the capture image processing duration as denoted by reference number 953 and 963 of FIG. 9 are supplied to the combiner 600 via the multiplexer 250, the pre-processor 210, the post-processor 230, and the demultiplexer 255. As described with reference to FIG. 8A, the camera output image as shown in FIG. 7A is output from the buffer 240 in the form of divided tile images as shown in FIG. 7B or 7C and processed by the pre-processor 210 and the post-processor 230 sequentially to be supplied to the combiner 600. The combiner 600 combines the processed tile images into a frame image, the still image codec 260 encodes the combined camera output image compressively, the compressed camera output image being stored in the storage unit 130. The camera output image division and combining operations of the image processor 120 can be performed as described with reference to FIGS. 6A and 8A.

Referring to FIG. 8C, the buffer 240 buffers the camera output images. The control unit 100 controls such that the camera output image of the frame selected from the buffer 240 is read out in the form of tile images with a predetermined size. The image scaler 220 scales the camera output image of the current frame read out from the buffer 240 to the viewing image. The clock generation unit 400 selects one of the low and high clock rates and provides the selected clock rate as the operation clock rate of the image processor 120 under the control of the control unit 100. The multiplexer 250 takes the output of the image scaler 220 in the preview mode of processing the viewing image, and takes the viewing image output from the image scaler 220 and the tile images of the camera output image output from the buffer 240 sequentially in a time divisional manner for one frame duration in the capture mode of capturing the camera output image. The pre-processor 210 pre-processes the viewing image and/or tile images output from the multiplexer 250 in a time divisional manner under the control of the control unit 100. The post-processor 230 post-processes the pre-processed viewing image and/or tile images under the control of the control unit 100. The demultiplexer 255 transfers the viewing image output from the post-processor 230 to the display unit 140 in the preview mode and transfers the viewing image and the tile images output from the post-processor 230 to the display unit 140 and the combiner 600 respectively in the time divisional manner, under the control of the control unit 100. The combiner 600 combines the tile images into a frame of camera output image, and the still image codec 260 encodes the camera output image output from the combiner 600 compressively, the compressed image being stored in the storage 130.

In the preview mode of processing the viewing image, the buffer 240 buffers the camera output image and the image scaler 220 scales the camera output image of the current frame of the buffer 240 to the viewing image under the control of the control unit 100. The control unit 100 controls the multiplexer 250 and the demultiplexer 255 to establish the viewing image processing path and controls the clock generation unit 400 to supply one of the low and high clock rates as the operation clock of the image processor 120. Once the viewing image processing path has been established, the multiplexer 250 supplies the viewing image generated by image scaler 220 to the pre-processor 210, and the demultiplexer 255 supplies the output of the post-processor 230 to the display unit 140. If the low clock rate is supplied as the operation clock, the image processor 120 processes the viewing image as shown in part 915 of FIG. 9; and if the high clock rate is supplied as the operation clock, the image processor 120 processes the viewing image as shown in part 913 of FIG. 9.

If a camera output image capture request is input, the control unit 100 controls the multiplexer 250 and the demultiplexer 255 to establish the viewing image processing path and controls the clock generation unit 400 to supply the high clock rate to the image processor 250 as the operation clock rate. The multiplexer 250 supplies the viewing image processed by the image scaler 220 to the pre-processor 210, and the pre-processor 210 and the post-processor 230 process the viewing image for the durations 951 and 961 of FIG. 9, the viewing image being supplied to the display unit 130 via the demultiplexer 255 for display. Thereafter, the control unit 100 controls the multiplexer 25 and the demultiplexer 255 to establish the capture image processing path, controls the buffer 240 to output the tile images of the capture image of the pre-designated frame (e.g. image with zero shutter lag). The multiplexer 250 supplies the tile images output from the buffer 240 to the pre-processor, the pre-processor 210 and the post-processor 230 process the tile images for the durations 953 and 963 of FIG. 9, and the demultiplexer 255 supplies the post-processed tile images to the combiner 600. The capture image processing operation is repeated as many as the number of tile images constituting a frame of the camera output image, and the combiner 600 combines the processed tile images into the camera output image of one frame, the combined camera output image being supplied to the still image codec 260. The still image codec 260 encodes the combined camera output image compressively, the compressed image being stored in the storage unit 130. The operations of dividing and combining the camera output image are performed as described with reference to FIGS. 6A and 7A to 7C.

Although not depicted, the image processor 120 can be configured such that the output end of the buffer 240 is connected to the pre-processor 210, the output ends of the pre-processor 210 and the buffer 240 are connected to the multiplexer 250, the output end of the multiplexer 240 is connected to the image scaler 220, and the output end of the image scaler 240 is connected to the post-processor 230 in FIG. 8C.

The image processor 120 structured as shown in any of FIGS. 8A to 8C processes the camera output image of a predetermined as divided into the tile images in response to a capture request. This is to simplify the hardware configuration of the image processor 120 (e.g., a reduction of the number of gates of the pre-processor 210 and/or post processor 230) and reduce the power consumption of the image processor 120. By processing (pre-processing and/or post-processing) the camera output image as divided into tile images it is possible to process the viewing image and camera image of the large volume high pixel simultaneously in a time divisional manner.

The camera device equipped with the image processor 120 structured as shown in any of FIGS. 2A to 2D, 4A to 4C, 6A to 6C, and 8A to 8C is capable of processing the motion image and the capture image simultaneously. That is, the viewing image is the image can be recorded as a motion image. Accordingly, in the motion image recording mode, the above structured image processor 120 generates the viewing image to the display unit 140 and the motion image codec 270 simultaneously at every frame period. In the motion image recording mode, the image processor 120 displays the viewing image on the screen of the display unit 140 and encodes the viewing image by means of the motion image codec to record the encoded image in the storage unit 130 simultaneously. If a capture request command is input in this state, the image processor 120 encodes the frame image with zero shutter lag along with the viewing image. The image processor 120 encodes the viewing image by means of the motion image codec 270, the encoded image being stored, while displaying the viewing image on the screen of the display unit 140 simultaneously.

Figure 10A:
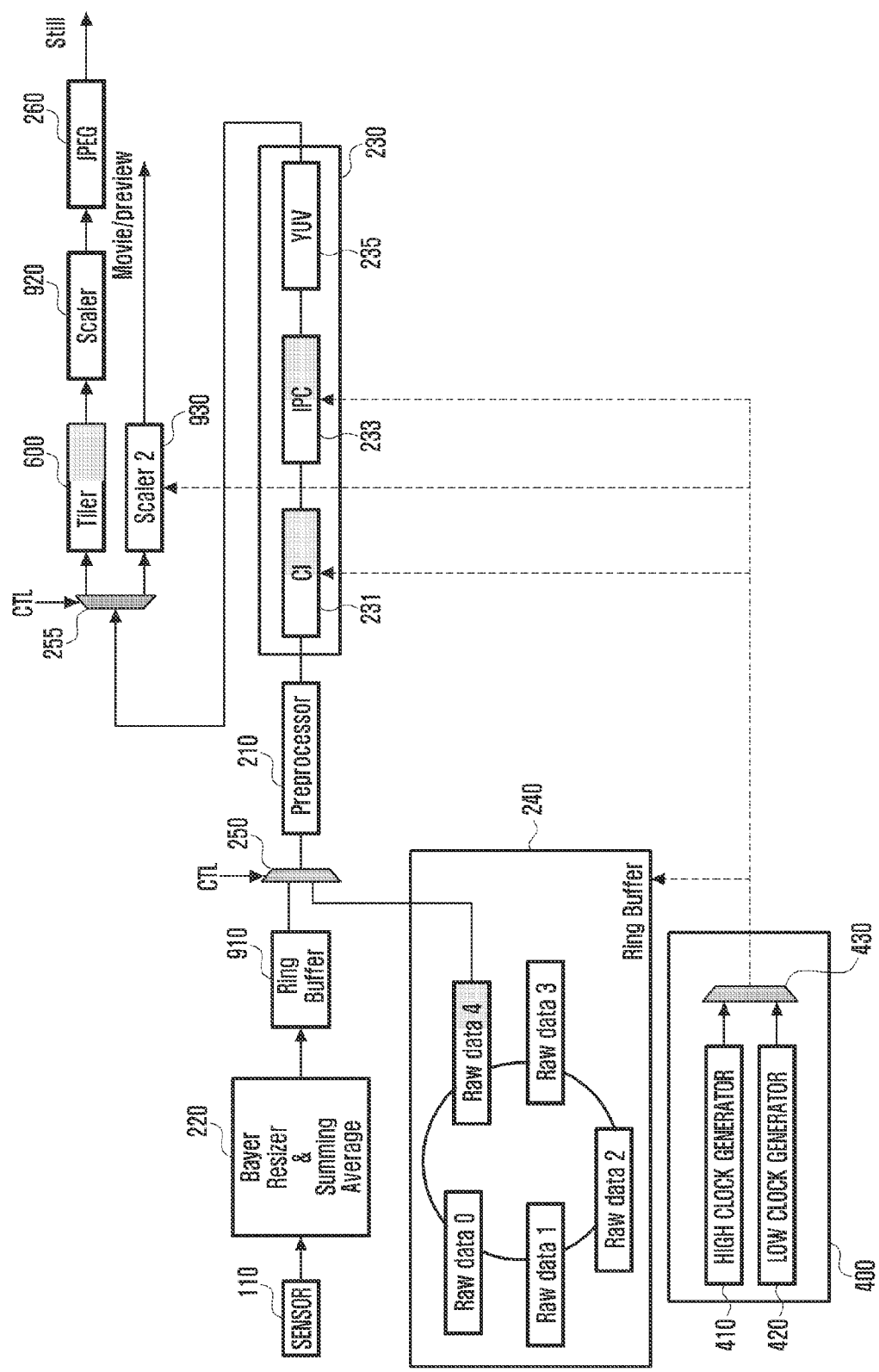

FIGS. 10A and 10B are block diagrams illustrating detailed configurations of an image processor such as, for example, the image processor according to exemplary embodiments of the present invention.

Referring to FIG. 10A, a detailed configuration of an image processor such as, for example, the image processor 120 of FIG. 8A is illustrated. The image processor of FIG. 10A further includes the buffer 240 structured as a 5-element ring buffer capable of buffering 5 camera output images, a ring buffer 910 for buffering the viewing images output from the pre-processor 210, a scaler 920 for scaling the output of the combiner 600 to the size of data to be stored, and a scaler 930 for scaling the viewing image to be fit for the display size of the display unit 140, in addition to the configuration of FIG. 8A. Although FIG. 10A is directed to the image processor 120 including a clock generation unit 400 and a combiner 600, the clock generation unit 400 and/or the combiner 600 may not be included. For example, the image processor of FIG. 10A also can be configured as shown in any of FIGS. 2A, 4A, and 6A.

Referring to FIG. 10A, the control unit 100 controls, in the preview mode, the multiplexer 250 to supply the output of the ring buffer 910 to the pre-processor 210 and controls the demultiplexer 255 to supply the output of the post-processor 230 to the scaler 930. In this state, the camera output image is pre-processed by the pre-processor 210, scaled to the display size of the display unit 140 by the scaler 220, and then buffered in the ring buffer 910. The ring buffer 910 buffers the viewing images and has a size capable of buffering the viewing images of 2 to 3 frames. The reason for using the ring image 910 is to compensate for the frame delay which may occur in processing the capture image. The capture image is a camera output image, and there may be frame delay in processing the capture image. In this case, the viewing images are buffered in the ring buffer 910 so as to be processed after the capture image has been processed. In this way, it is possible to avoid time lag of viewing image in processing the capture image. The viewing image read out from the ring buffer 910 is supplied to the post-processor 230 via the multiplexer 250 and then to the scaler 930 via the demultiplexer 255. The scaler 930 scales the post-processed viewing image to the display size of the display unit 140 such that the display unit 140 displays the viewing image output from the scaler 930. In the preview mode, the camera output image pre-processed by the pre-processor 210 is buffered in the buffer 240. In FIG. 10A, the buffer 240 is structured as a ring buffer capable of buffering 5 camera output images. According to exemplary embodiments of the present invention, it is preferred that the ring buffer is provided with a size large enough for compensating the shutter lag of the camera. In the preview mode, the control unit 100 controls the buffer 240 to buffer the images taken by the camera 110 but does not access the images buffered in the buffer 240.

According to exemplary embodiments of the present invention, it is assumed that the image processor 120 operates at the low clock rate in the preview mode and at the high clock rate in the capture image processing mode and a frame of camera output image is processed as divided into two tile images. It is assumed that the frame image capable of compensating the shutter lag at the capture request timing is Raw data 4. If a capture request is input, the control unit 100 controls the multiplexer 250 and the demultiplexer 255 to establish the image processing paths for processing the viewing and capture images in one frame duration in a time divisional manner as denoted by reference numbers 921 and 923 of FIG. 9. The control unit 100 controls the selector 430 to select the high clock rate.

At the beginning part 951 of the frame 921 of FIG. 9, the image processor 120 establishes the viewing image processing path for processing the viewing image as described above under the control of the control unit 100. Thereafter, the control unit 100 reads out the Raw data4 from buffer 240 as the tile image having the size of ½ of the frame image (tile image 710 of FIG. 7B) at the part 953 of the frame 921 of FIG. 9 such that the tile image is post-processed and then supplied to the combiner 600 at the part 953 of the frame 921 of FIG. 9. Afterward, the image processor 120 establishes the viewing image processing path again to process the viewing image of the next frame at the part 961 of the next frame 923 of FIG. 9. The control unit reads out the Raw data4 from the buffer 240 as the tile image having the size of ½ of the frame image (tile image 720 of FIG. 7B) at the part 963 of the frame 923 of FIG. 9 such that the tile image is post-processed and then supplied to the combiner 600 at the part 963 of the frame 923 of FIG. 9.

The combiner 600 combines the two tile images into a frame of camera output image, the scaler 920 scales the camera output image to the capture image size, and the still image codec 260 encodes the scaled capture image, the encoded capture image being stored in the storage unit 130. At this time, the display unit 140 is capable of displaying the capture image. That is, the control unit 100 is capable of displaying the capture image and, in this case, the capture image can be displayed for a predetermined time duration or until the user switches the operation mode to the preview mode (e.g. before completing storage of the image with a title) without displaying the viewing image.

According to exemplary embodiments of the present invention, the post processor 230 may include a color interpolator 231, an IPC 233, and a YUV image processor 235.

According to exemplary embodiments of the present invention, the clock generator 400 may include a high clock generator 410 for generating high clock, a low clock generator 420 generating a low clock lower than the high clock in frequency, and a selector 430 which selects one of the high and low clock to be provided as the operation clock in processing capture images under the control of the control unit 100.

FIG. 10B is a diagram illustrating the detailed configuration of the image processor 120 of FIG. 8B. The image processor of FIG. 10B further includes the buffer 240 structured as a 5-element ring buffer capable of buffering 5 camera output images, a buffer 910 capable of buffering the viewing images output from the image scaler 220, a scaler 920 for scaling the output of the combiner 600 to the size of data to be stored, and a scaler 930 for scaling the viewing image to be fit for the display size of the display unit 140 in addition to the configuration of FIG. 8B. FIG. 10B is directed to the image processor 120 including a clock generation unit 400 and a combiner 600, and the clock generation unit 400 and/or the combiner 600 may not be included.

Referring to FIG. 10B, the control unit 100 controls, in the preview mode, the multiplexer 250 to supply the output of the ring buffer 910 to the pre-processor 210 and controls the demultiplexer 255 to supply the output of the post-processor 230 to the scaler 930. In this state, the camera output image is scaled by the image scaler 220 to the display size of the display unit 140 and then supplied to the ring buffer 910. The ring buffer 910 buffers the viewing images and has a size capable of buffering the viewing images of 2 to 3 frames. The reason for using the ring image 910 is to compensate for the frame delay which may occur in processing the capture image. The capture image is a camera output image, and there may be frame delay in processing the capture image. In this case, the viewing images are buffered in the ring buffer 910 so as to be processed after the capture image has been processed. Accordingly, it is possible to avoid time lag of viewing image in processing the capture image. The viewing image read out from the ring buffer 910 is supplied to the post-processor 230 via the multiplexer 250 and then to the scaler 930 via the demultiplexer 255. The scaler 930 scales the post-processed viewing image to the display size of the display unit 140 such that the display unit 140 displays the viewing image output from the scaler 930. In the preview mode, the camera output image pre-processed by the pre-processor 210 is buffered in the buffer 240.

In FIG. 10A, the buffer 240 is structured as a ring buffer capable of buffering 5 camera output images. According to exemplary embodiments of the present invention, it is preferred that the ring buffer is provided with a size large enough for compensating the shutter lag of the camera.

If a capture request is input in the above state, the control unit 100 controls the multiplexer 250 and the demultiplexer 255 to establish the image processing paths for processing the viewing and capture images in the time divisional manner in one frame duration (e.g., frame durations 921 and 923 of FIG. 9). The control unit 100 controls the selector 430 to select the high clock rate. At the beginning part 951 of the frame 921 of FIG. 9, the image processor 120 establishes the viewing image processing path for processing the viewing image as described above under the control of the control unit 100. Thereafter, the control unit 100 reads out the camera output image (e.g., Raw data4) from buffer 240 such that the tile image is post-processed and then supplied to the combiner 600 at the part 953 of the frame 921 of FIG. 9. Thereafter, the image processor 120 establishes the viewing image processing path again to process the viewing image of the next frame at the part 961 of the next frame 923 of FIG. 9. Next, the control unit 100 reads out the next tile image of the camera output image from the buffer 240 at the part 963 of the frame 923 of FIG. 9 and, the tile image being pre-processed and post-processed and then supplied to the combiner 600. The combiner 600 combines the two tile images into a frame of camera output image, the scaler 920 scales the frame image to the size of the image to be stored, and the still image codec 260 encodes the scaled image into a capture image, the capture image being stored in the storage unit 130.

Figure 11:
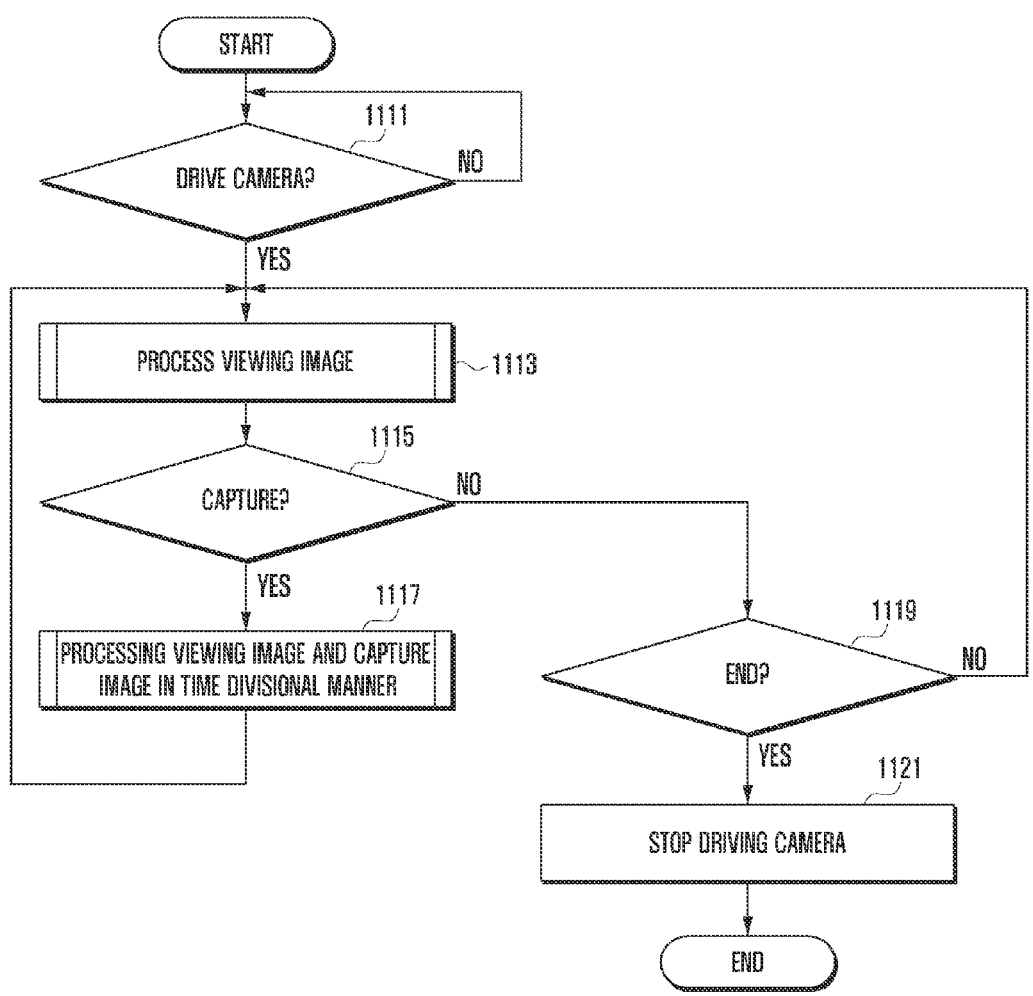
FIG. 11 is a flowchart illustrating an image processing method of a camera device or camera-equipped terminal according to an exemplary embodiment of the present invention.

FIG. 11 is a flowchart illustrating an image processing method of a camera device or camera-equipped terminal according to an exemplary embodiment of the present invention.

Referring to FIG. 11, if a camera driving command is input through the input unit 150, the control unit 100 drives the camera 110 at step 1111. For example, the camera device determines whether a command for driving the camera 110 is input at step 1111. If a command for driving the camera 110 is not input the camera device may continue to poll for reception of such a command. If a command for driving the camera 110 is input, the camera device proceeds to step 1113 at which the camera device executes the preview mode for processing the viewing image. In the preview mode, the control unit processes the viewing image through the procedures as shown in FIGS. 12A to 12D. If a capture request is input in processing the viewing image, the control unit detects the capture request at step 1115 and processes the capture image at step 1117. In processing the capture image, the control unit 100 controls to process the viewing and capture images in a time divisional manner through the procedures of FIGS. 14 to 17. The preview mode or the capture mode continues until the camera stops operation and, if the user inputs a termination request through the input unit 150, the control unit 100 detects this at step 1119 and terminates the operation of the camera 110 at step 1121.

If the control unit does not detect the capture request at step 1115, then the control unit proceeds to step 1119 at which the control unit determines whether a termination request is received. If the control unit determines that a termination request is not received at step 1119, the control unit proceeds to step 1113. In contrast, if the control unit determines that a termination request is received at step 1119, the control unit proceeds to step 1121.

FIGS. 12A to 12D are flowcharts illustrating procedures of processing a viewing image in a camera device or camera-equipped terminal according to an exemplary embodiment of the present invention. FIG. 13 is a flowchart illustrating a procedure of scaling for generating a viewing image such as, for example, the viewing image in FIGS. 12A to 12D, and post-processing and displaying the viewing image according to an exemplary embodiment of the present invention.

Figure 12A:
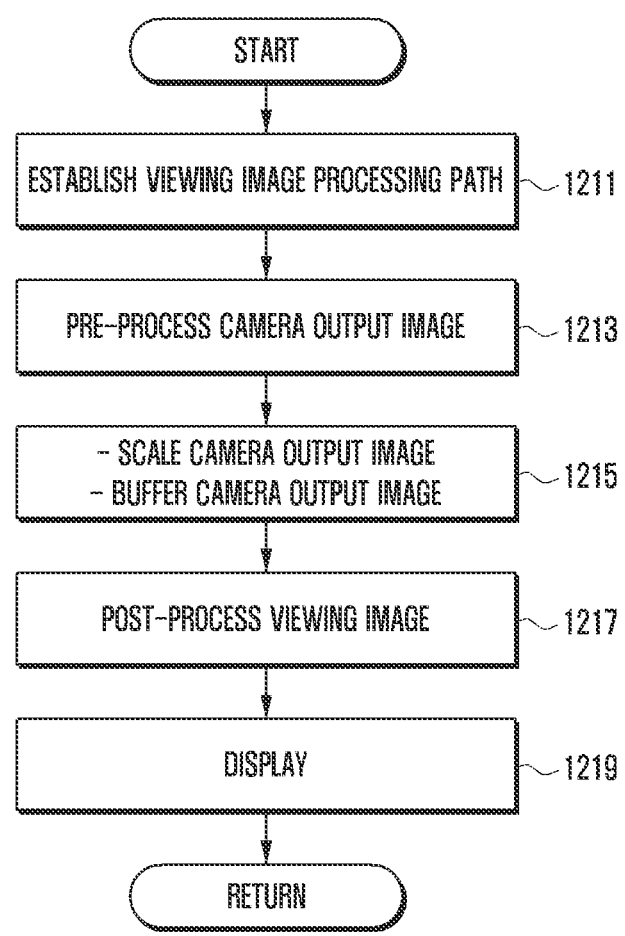
FIGS. 12A to 12D are flowcharts illustrating procedures of processing a viewing image in a camera device or camera-equipped terminal according to an exemplary embodiment of the present invention.
Figure 13:
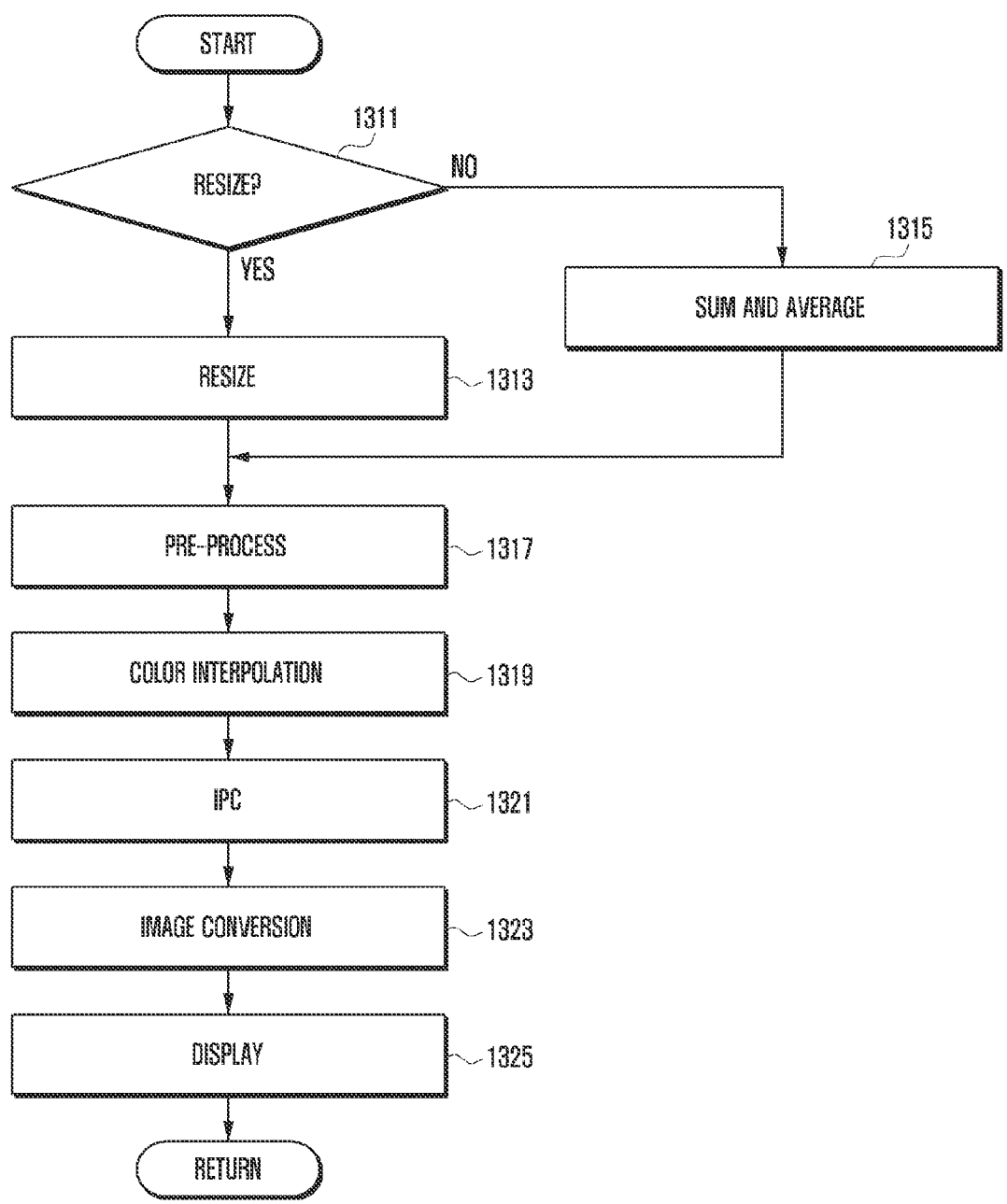
FIG. 13 is a flowchart illustrating a procedure of scaling for generating a viewing image such as, for example, the viewing image in FIGS. 12A to 12D, and post-processing and displaying the viewing image according to an exemplary embodiment of the present invention.

Referring to FIG. 12A, the control unit 100 controls the multiplexer 250 and the demultiplexer 255 of the image processor 120 to establish the viewing image processing path in the preview mode at step 1211. Next, the control unit 100 pre-processes the camera output image from the camera 110 at step 1213. As an example, in the pre-processing procedure, the image processor 120 extracts 3A from the camera output image and performs lens shading correction, dead pixel correction, and knee correction on the camera output image.

Next, the control unit 100 buffers the pre-processed camera output image in the buffer 240 and scales the camera output image to the display size of the display unit 140 to generate the viewing image at step at step 1215. Next, the control unit 100 post-processes the multiplexed viewing image at step 1217 and then displays the viewing image on the screen of the display unit 140 at step 1219.

Referring to FIG. 13, the image scaling according to an exemplary embodiment of the present invention can be performed through resizing and averaging operations. In the case in which the image scaler 220 is implemented with the resizer, the control unit 100 determines whether the image scaler 220 is implemented with the resizer at step 1311. If the control unit 100 determines that the image is to be resized at step 1311, the control unit operatively scales the camera output image to the viewing image through resizing operation at step 1313. At this time, the control unit 100 is capable of generating the viewing image by performing at least one of decimation, interpolation, and crop operations on the camera output image. In contrast, if the control unit determines that the image scaler 220 is not implemented with the resizer, the control unit proceeds to step 1315 at which the image scaler is implemented with the summing and averaging part, and the control unit 100 sums and averages adjacent pixels to reduce the number of pixels of the camera output image at step 1315. At this time, the summing and averaging operations can be performed as described with reference to FIGS. 3A to 3B.

After scaling the image, the control unit 100 pre-processes and/or post-processes the viewing image. The post-processing operation is performed through steps 1317 to 1321. As described above, the post processing can be performed through at least one of color interpolation, IPC process, and image conversion operations and, as a result, a YUV viewing image is displayed on the screen of the display unit 140 in step 1325.

In the preview mode, the control unit 100 scales the camera output image to the viewing image size through the procedure of FIG. 13, post-processes the viewing image to display the viewing image on the screen of the display unit 140 while buffering the full resolution images at every frame period.

FIG. 13 shows an exemplary post-processing operation on the scaled image. However, the control unit 100 is capable of pre-processing the viewing image after step 1313 and post processing the pre-processed viewing image through steps 1317 to 1321. For example, at step 1317, the control unit pre-processes the viewing image. At step 1319, the control unit performs a color interpolation. At step 1321, the control unit performs IPC. At step 1323, the control unit performs image conversion. At step 1325, the control unit displays the image.

Figure 12B:
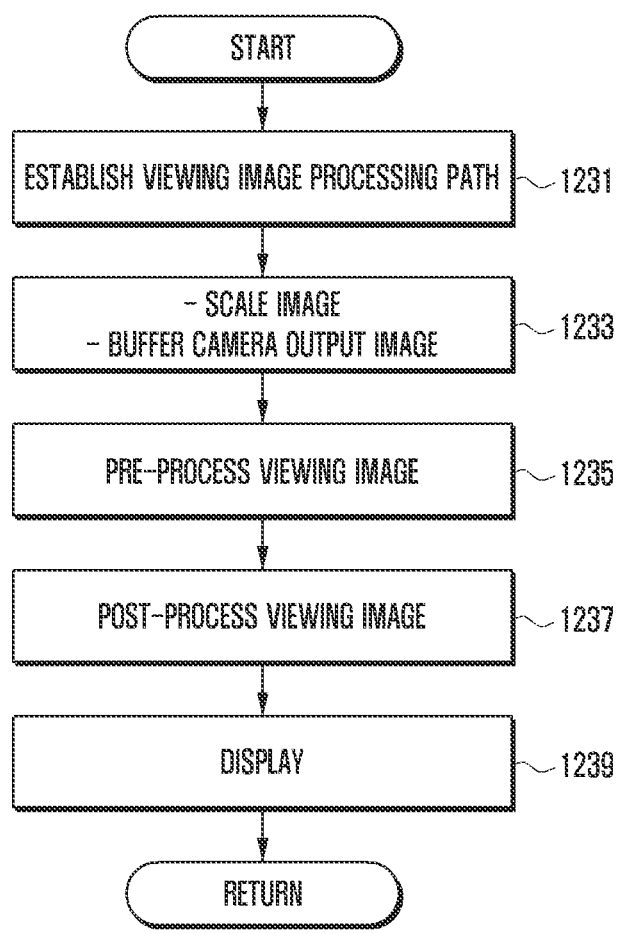

Referring to FIG. 12B, the control unit 100 controls the multiplexer 250 and the demultiplexer 255 of the image processor 120 to establish the viewing image processing path in the preview mode at step 1231. Next, the control unit 100 scales the camera output image output from the camera 110 to the viewing image and buffers the camera output image in the buffer 240 at step 1233. Next, the control unit 100 pre-processes the viewing image at step 1235, post-processes the pre-processed viewing image at step 1237, and displays the post-processed viewing image on the screen of the display unit 140 at step 1239.

Figure 12C:
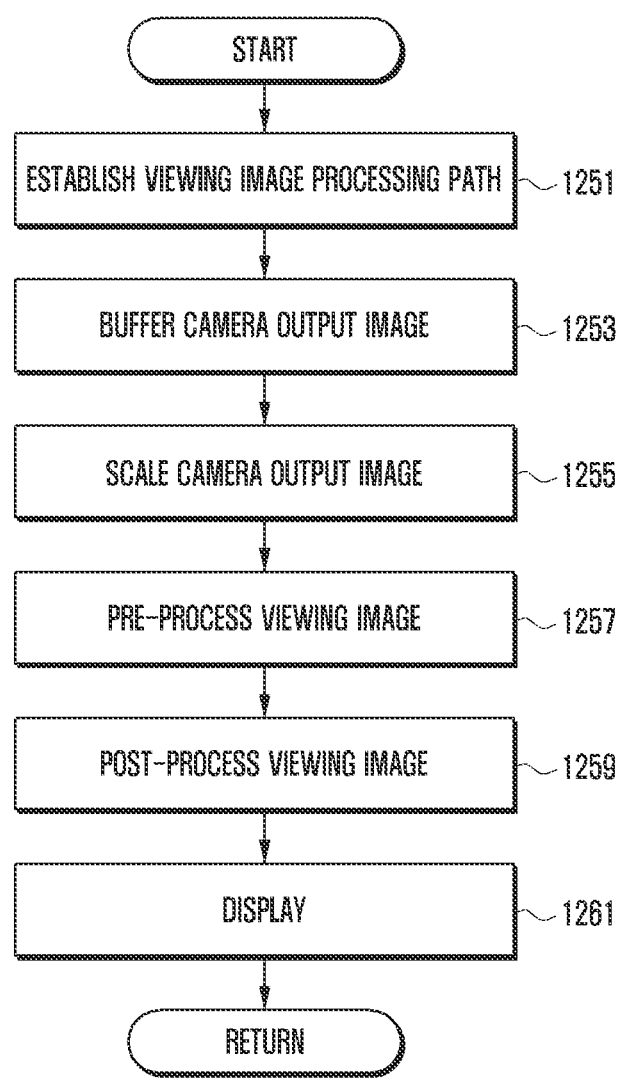

Referring to FIG. 12C, the control unit 100 controls the multiplexer 250 and the demultiplexer 255 of the image processor 120 to establish the viewing image processing path in the preview mode at step 1251. Next, the control unit 100 buffers the camera output image output from the camera 110 at step 1253 and scales the camera output image of the current frame among the buffered camera output images to the viewing image at step 1255. Next, the control unit 100 pre-processes the viewing image at step 1257, post-processes the pre-processed viewing image at step 1259, and displays the post-processed viewing image on the screen of the display unit 140 at step 1261.

Figure 12D:
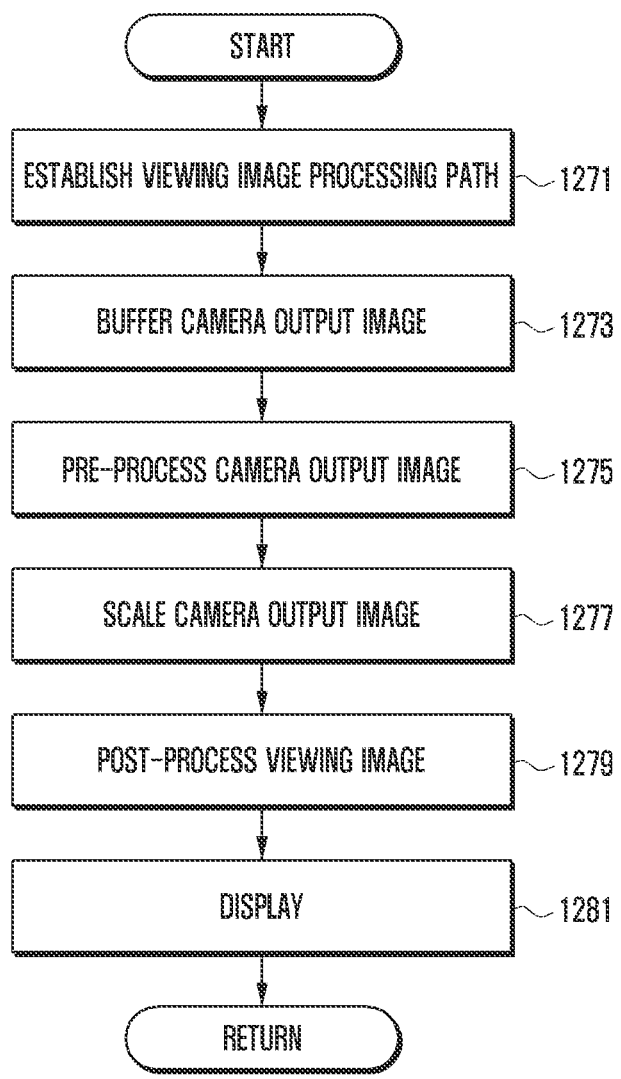

Referring to FIG. 12D, the control unit 100 controls the multiplexer 250 and the demultiplexer 255 of the image processor 120 to establish the viewing image processing path in the preview mode at step 1271. Next, the control unit buffers the camera output image output from the camera 110 at step 1273 and pre-processes the camera output image of the current frame among the buffered camera output images at step 1275. Next, the control unit 100 scales the pre-processed camera output image to the viewing image 1277, post-processes the viewing image at step 1279, and displays the post-processed viewing image on the screen of the display unit 140 at step 1281.

In the procedure of processing the viewing image, the user is capable of requesting for image capture. If the capture request is detected, the control unit 100 establishes the viewing and capture images processing paths within one frame duration in a time divisional manner and selects the camera output image of a predesigned frame (e.g., camera output image with zero shutter lag) among the buffered camera output images to record the capture image.

FIGS. 14 to 17 are flowcharts illustrating procedures of processing a capture image in a camera device or camera-equipped terminal according to exemplary embodiments of the present invention.

Figure 14:
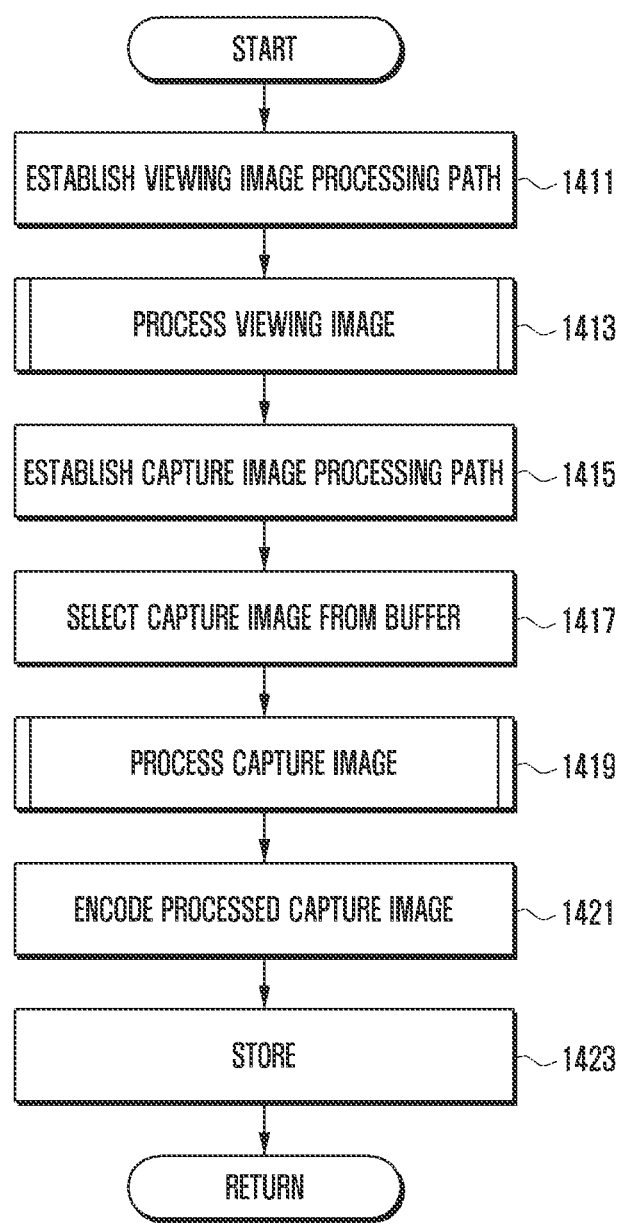
FIGS. 14 to 17 are flowcharts illustrating procedures of processing a capture image in a camera device or camera-equipped terminal according to exemplary embodiments of the present invention.

Referring to FIG. 14, if a capture request is detected, the control unit 100 controls the multiplexer 250 and the demultiplexer 255 to establish the viewing image processing path at step 1411. Next, the control unit 100 scales the image taken by the camera 110 to the viewing image and pre-processes and post-processes the viewing image to display the viewing image on the screen of the display unit 140 through the viewing image processing path at step 1413. The viewing image processing procedure of step 1413 can be performed through, for example, one of the procedures of FIGS. 12A to 12D. Next, the control unit 100 establishes the capture image processing path at step 1415, retrieves the camera output image of a pre-designated frame (e.g., the frame image with zero shutter lag) among the images buffered in the buffer 240 at step 1417, and pre-processes and post-processes the retrieved camera output image at step 1419. Next, the control unit 100 encodes the post-processed image at step 1421 and stores the encoded image in the storage unit 130 at step 1423. At this time, the capture image processing can be performed in the same manner as the viewing image processing procedure.

Figure 15:
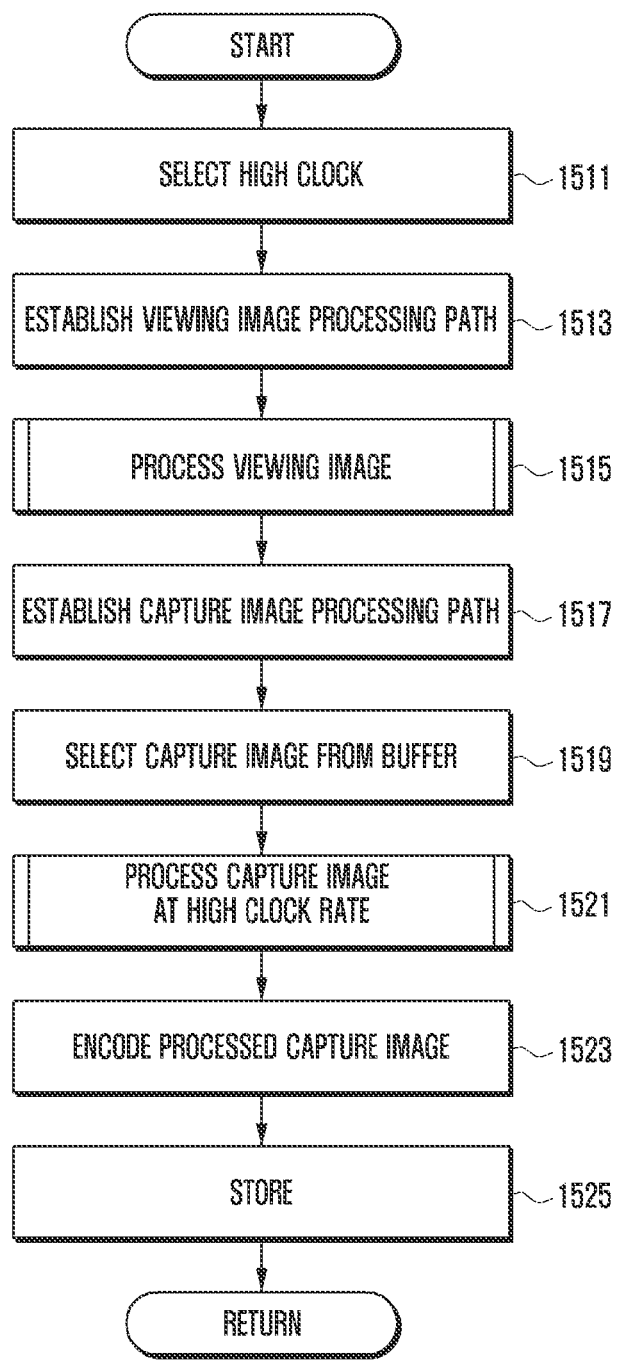

Referring to FIG. 15, the control unit 100 supplies a high clock rate as the operation clock rate of the image processor 120 in processing the capture image. In this case, the image processor 120 establishes the viewing image processing path and the capture image processing path within one frame duration in a time divisional manner and processes the viewing and capture images at the high clock rate under the control of the control unit 100. If a capture request is input, the control unit 100 supplies the high clock rate as the operation clock rate of the image processor 120 at step 1511 and control the multiplexer 250 and the demultiplexer 255 of the image processor 120 to establish the viewing image processing path at step 1513. Next, the control unit 100 scales the image taken by the camera 110 to the viewing image and pre-processes and post-processes the viewing image at the high clock rate through the viewing image processing path to display the viewing image on the screen of the display unit 140 at step 1515. The viewing image processing at step 1515 can be performed through, for example, any of the procedures of FIGS. 12A to 12D. Next, the control unit 100 establishes the capture image processing path at step 1517, retrieves the camera output image of a pre-designated frame (e.g. frame image with zero shutter lag) among the images buffered in the buffer 240 at step 1519, and pre-processes and post-processes the retrieved camera output image at the high clock rate at step 1521. Next, the control unit 100 encodes the post-processed camera output image at step 1523 and stores the encoded image in the storage unit 130 at step 1525. At this time, the capture image process can be performed in the same manner as the viewing image processing procedure.

The capture image can be processed as divided into plural tile images. This is advantageous in processing the capture image as the high pixel camera output image requiring complex configuration of the pre-processor 210 and/or post-processor 230 and large amount of power consumption. By dividing the camera output image into multiple tile images having a predetermined size, configuring the pre-processor 210 and/or the post-processor 230 in a size enough to process the tile image, and combining the tile images after being processed, it is possible to process the high pixel image efficiently.

Figure 16:
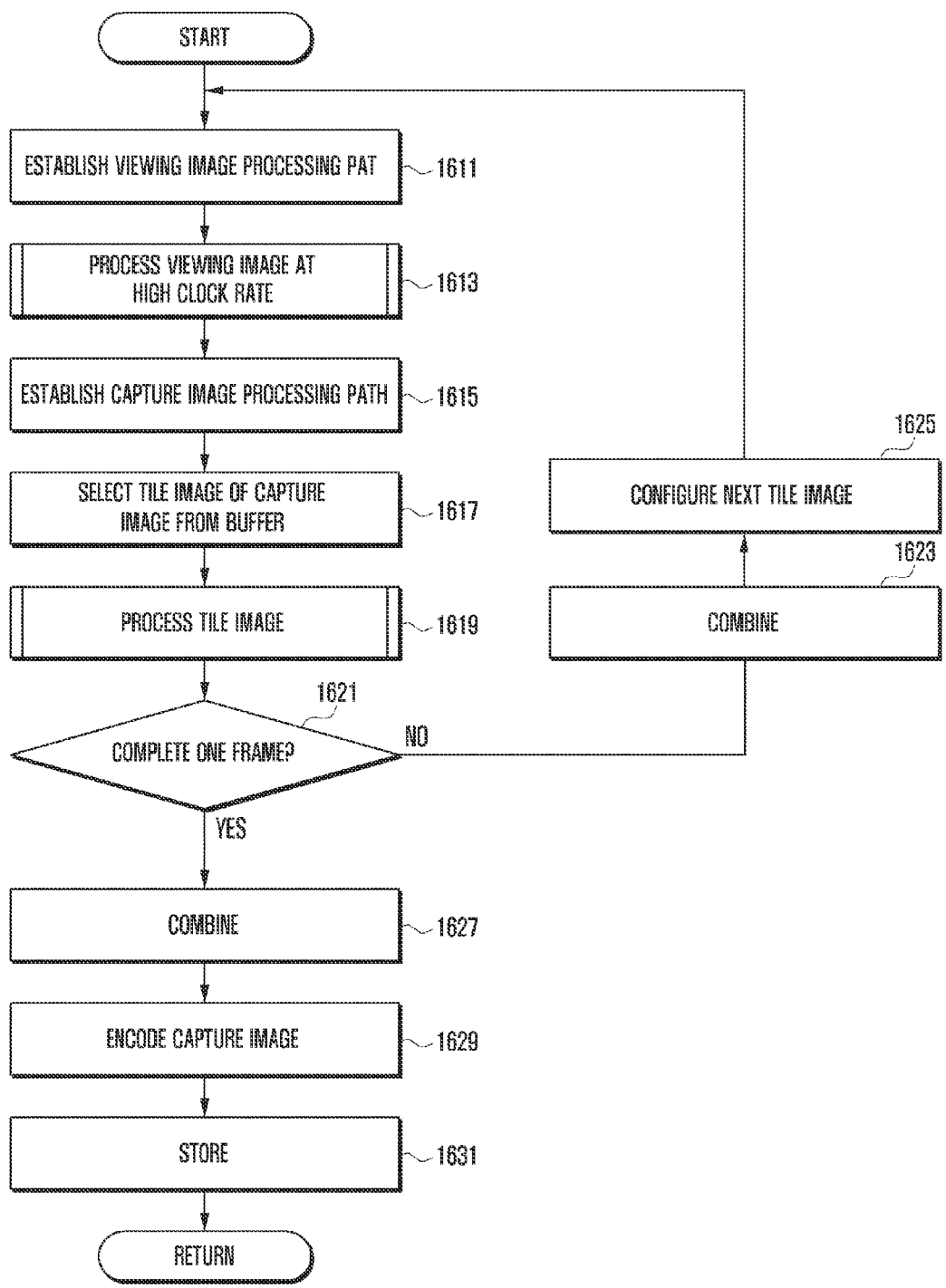

Referring to FIG. 16, a flowchart is illustrated for showing the procedure of dividing a camera output image into plural tile images, processing the tile images individually, and combining the processed tile images into a capture image in the image processor 120.

If a capture request is detected, the control unit 100 establishes the viewing image processing path for processing the image taken by the camera 110 to the viewing image at step 1611. Next, the control unit 100 scales the camera output image to the viewing image at step 1613 and pre-processes and/or post-processes the viewing image to display the viewing image at step 1613. The viewing image processing can be performed in the same manner as one of procedures of FIGS. 12A to 12D.

Next, the control unit 100 establishes the capture image processing path for buffering the image taken by the camera at the residual part of the corresponding frame duration at step 1615. Next, the control unit 100 retrieves the camera output image of a pre-designated frame (e.g., zero shutter lag image) among the buffered images and reads output tile images of the camera output image individually at step 1617. The control unit is capable of reading out the tile images as described with reference to FIGS. 7A to 7C. Next, the control unit 100 pre-processes and/or post-processes the tile image at step 1619. At this time, the tile image pre-processing and/or post-processing can be performed in the same manner as the viewing image processing procedure. After processing the tile image, the control unit 100 determines whether all tile images of a frame of camera output image have been processed completely at step 162. The control unit 100 determines whether all of the tile images have been processed (e.g., if there remains a tile image to be processed) at step 1621. If there remains a tile image to be processed, the control unit 100 proceeds to step 1623 at which the control unit 100 combines the post-processed tile image with the tile images processed previously (i.e. in the previous frame duration). Thereafter, the control unit 100 proceeds to step 1625 at which the control unit 100 configures the tile image to be accessed next. Thereafter, the control unit 100 returns the procedure to step 1611.

If the control unit 100 determines that all of the tile images have been processed completed and thus that one frame image is generated, the control unit 100 proceeds to step 1627 at which the control unit 100 combines the post-processed tile images at step 1627. Thereafter, the control unit 100 encodes the camera output image of the frame at step 1629. Thereafter, the control unit stores the encoded image in the storage unit 130 at step 1631.

FIG. 16 is an exemplary procedure of processing a tile image in one frame duration as shown in FIG. 9 as the method for processing with the access to the tile images of the camera output image in the capture mode. In the case in which the tile images can be processed in one frame duration, however, the procedure jumps from step 1625 to step 1617 such that the control unit 100 accesses the next tile image. In this case, the image processor 120 establishes the viewing and capture images processing paths in a time divisional manner to process the viewing image and then processes the plural tile images (e.g., the images of a frame of camera output image) sequentially in the duration for which capture image processing path is established.

In processing the capture image, the control unit 100 sets the operation clock rate of the image processor 120 to high clock rate to process the camera output image as divided into tile images having a predetermined size.

Figure 17:
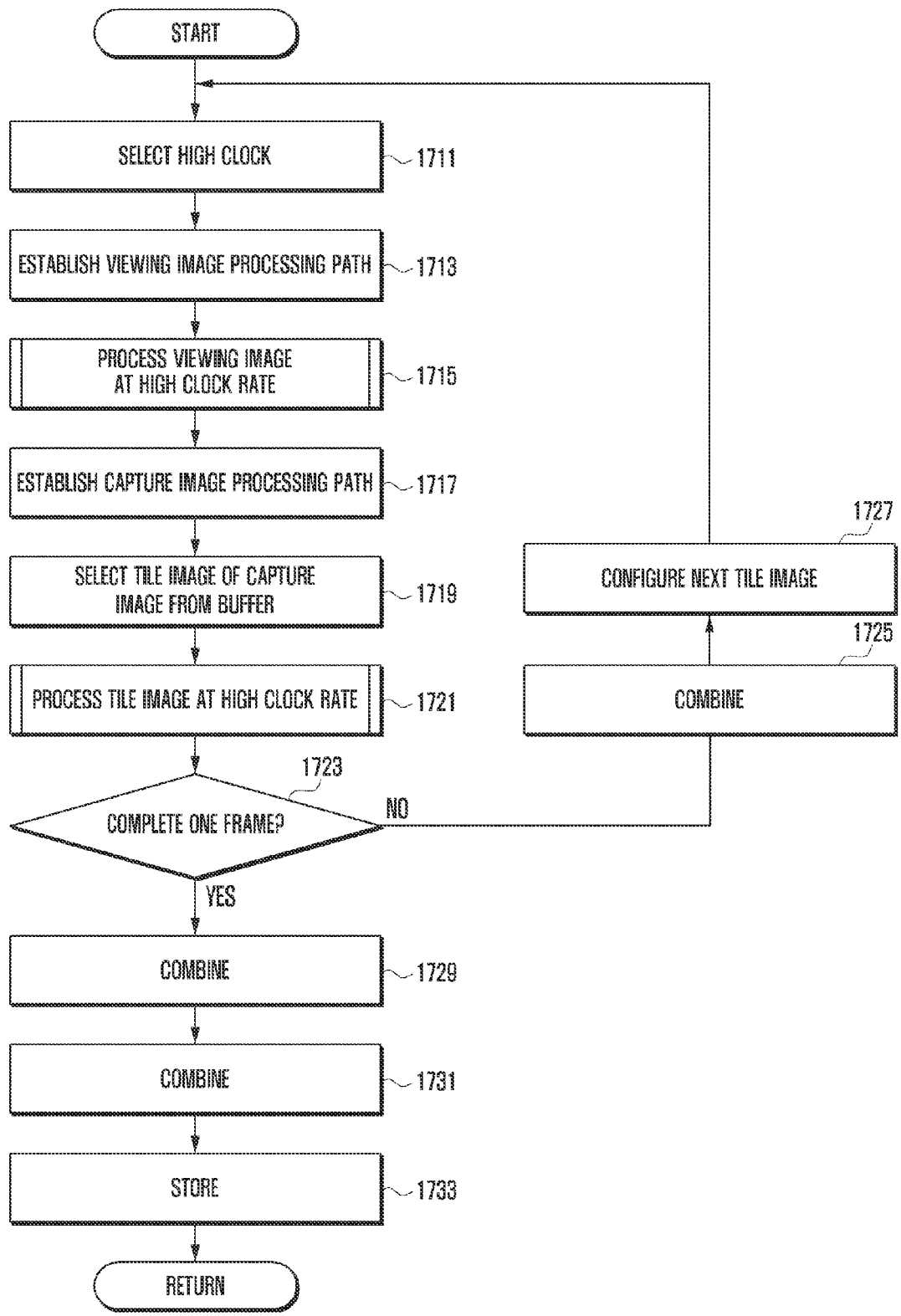

Referring to FIG. 17, a flowchart is illustrated for showing the procedure of processing the camera output image as divided into plural tile images in the image processor 120 at the high clock rate.

If a capture request is input, the control unit 100 sets the operation clock rate of the image processor 120 to high at step 1711. This means that the image processor 120 is capable of processing the viewing and capture images at the high clock rate. Next, the control unit 100 establishes the viewing image processing path for processing the image output from the camera 110 as the viewing image at step 1713. Next, the control unit 100 scales the camera output image to the viewing image and pre-processes and/or post-processes the camera output image at the high clock rate at step 1715. The viewing image processing can be performed through, for example, any of the procedures of FIGS. 12A to 12D.

Thereafter, the control unit 100 establishes the capture image processing path for storing the camera output image as a capture image at the residual part of the corresponding duration at step 1717. The control unit 100 selects a pre-designated frame (e.g., a frame image at shutter press timing, or a zero shutter lag image) and reads out the camera output image of the selected frame in unit of tile image at step 1719. The control unit 100 is capable of reading out the tile images as described with reference to FIGS. 7A to 7C. Next, the control unit 100 pre-processes and/or post-processes the tile image at the high clock rate at step 1721. The tile image pre-processing and/or post-processing procedure can be performed in the same manner as the viewing image processing procedure. After processing the tile image, the control unit 100 determines whether the camera output image of one frame is not processed completely (i.e., whether there remains any tile image to be processed), If the control unit 100 determines that the camera output image of one frame is not processed completely at step 1723, the control unit 100 proceeds to step 1725 at which the control unit 100 combines the post-processed tile image with the tile image processed at the previous state (e.g. in the previous frame duration). Thereafter, the control unit proceeds to step 1727 at which the control unit configures the tile image to be access next. Thereafter, the control unit 100 returns to step 1711. By processing the tile images repeatedly as described above, one frame image is generated.

If the control unit 100 determines that the processing the tile images of one frame image is completed at step 1723, the control unit 100 proceeds to step 1729 at which the control unit 100 combines the post-processed tile images. Thereafter, the control unit 100 encodes the camera output image of one frame at step 1731. Thereafter, the control unit 100 stores the encoded image in the storage unit 130 at step 1733.

FIG. 17 shows an exemplary procedure of processing one tile image per one frame duration as shown in FIG. 9 in the method for reading out the camera output image in unit of tile image in the capture mode. In the case in which the tile images can be processed within one frame duration, however, the control unit 100 is capable of jumping from step 1727 to step 1719 to read out and process the next tile image. In this case, the image processor 120 establishes the viewing and capture images processing paths alternately within one frame duration in a time divisional manner to process the plural tile images (e.g., the images constituting the camera output image of one frame) for the duration when the capture image path is established.

In processing the capture image with one of the procedures of FIGS. 14 to 17, the control unit 100 controls the image processor 120 in a time divisional manner within one frame duration such that the image processor 120 processes the viewing and capture images in sequence within the duration of one frame. At this time, the display unit 140 displays the viewing image while the storage unit 130 storing the capture image. In processing the capture image, the control unit is capable of controlling the display unit 130 to display the capture image. In this case, the capture image is displayed, for a predetermined time duration or until the user switches the camera operation state to the preview mode (e.g., before completing storage of the image with a tile of photo), along with or without displaying the viewing image.

As described above, because the camera device or camera-equipped terminal according to an exemplary embodiment of the present invention is capable of processing the preview/ motion images and capture images in time divisional manner, it is possible to implement the image processor in compact design.

Figure 18:
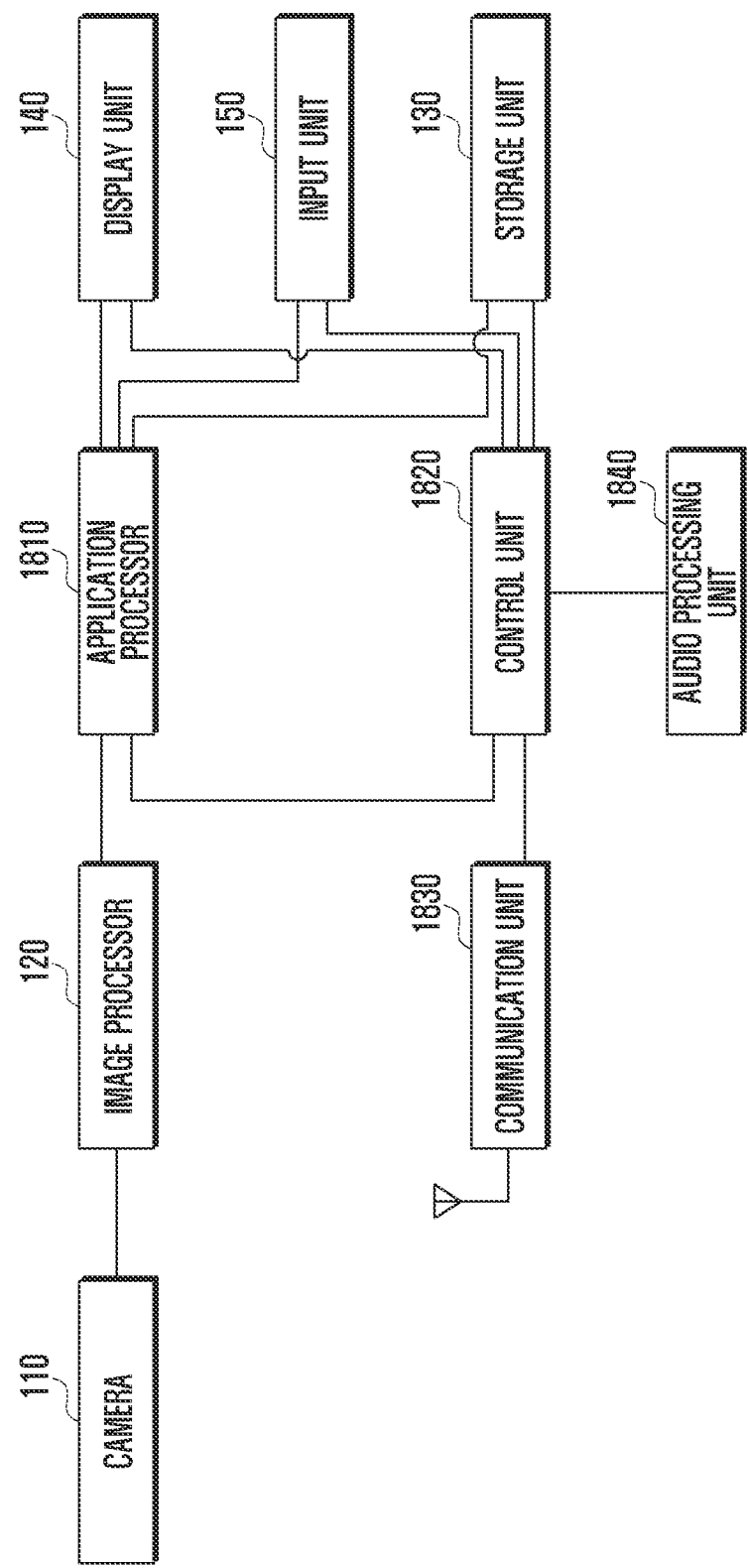
FIG. 18 is a block diagram illustrating a configuration of a portable terminal equipped with a camera according to an exemplary embodiment of the present invention.

FIG. 18 is a block diagram illustrating a configuration of a portable terminal equipped with a camera according to an exemplary embodiment of the present invention.

According to exemplary embodiments of the present invention, the portable terminal can be any of a mobile phone, a smartphone, a tablet computer, a laptop computer, a music player equipped with a camera, and the like.

Referring to FIG. 18, the portable terminal includes a camera 110, an image processor 120, a storage unit 130, a display unit 140, an input unit 150, an application processor 1810, a control unit 1820, a communication unit 1830, and an audio processing unit 1840.

The camera 110 is provided with an image sensor to acquire camera output image in a camera operation mode.

The image processor 120 processes the camera output image into the viewing image to be displayed on the screen of the display unit 140 and the capture image to be recorded in response to the capture request. The viewing image can be a YUV image, and the capture image can be a JPEG image.

The application processor 1810 executes various application functions of the terminal. The application processor 1810 processes the viewing image and/or the capture image generated by the image processor 120 in the camera operation mode according to an exemplary embodiment of the present invention. The application processor 1810 controls the display unit 140 to display the viewing image in the preview mode and controls the image processor 120 to process the camera output image of a pre-designated frame among the buffered camera output images in response to the user's capture request command. The application processor 1810 includes the function of the controller of the camera.

The communication unit 1830 is responsible for communication with another terminal, a base station, or the like. The communication unit 1830 may include a transmitter including a frequency up-converter for up-converting the frequency for the transmission signal to Radio Frequency (RF) band signal and a receiver including a low noise amplifier for low-noise-amplifying the received signal and a frequency down-converter for down-converting the received RF signal to a baseband signal. The communication unit 1830 also may include a modulator for modulating the transmission signal and transfers the modulation signal to the transmitter and a demodulator for demodulating the signal output by the receiver. The modulator/demodulator can be of supporting Wideband Code Divisional Multiple Access (WCDMA), Global System for Mobile Communications (GSM), Long-Term Evolution (LTE), Wi-Fi, WiBRO, and the like.

The control unit 1820 controls overall operations of the terminal and voice and data communication functions. The control unit 1820 may include the modulator/demodulator of the communication unit 1830 and, in this case, the communication unit 1830 includes only the RF communication part. In this case, the control unit 1820 is capable of performing modulation/demodulation and encoding/decoding on the signals. The audio processing unit 1840 is connected to the microphone and speaker of the terminal and processes voice signal in voice call mode under the control of the control unit 1820.

The input unit 150 generates various command and data input signals to the control unit 1820 and the application processor 1810. Particularly in an exemplary embodiment of the present invention, the input unit 150 is capable of generating a camera driving command and a capture command to the application processor 1810. The display unit 140 displays communication and application execution screen of the terminal under the control of the control unit 1820 and the application unit 1810. The display unit 140 also displays the viewing image processed by the image processor 120 in the preview mode according to an exemplary embodiment of the present invention. The input unit 150 can be implemented with a touch panel capable of detecting user's touch gesture, and the display unit 140 can be an Liquid Crystal Display (LCD), an Organic Light-Emitting Diode (OLED) panel, or the like capable of displaying data and image supplied in program execution. The input unit 150 and the display unit 140 can be integrated into a touchscreen. The input unit 150 is also capable of including physical buttons provided on an outer surface of the terminal.

The storage unit 130 may include a program memory for storing an Operating System (OS) of the terminal and application programs associated with the functions according to an exemplary embodiment of the present invention and a data memory for storing the data necessary for executing the programs and generated by the programs. The storage unit 130 can be implemented with at least one of non-volatile memory such as flash memory and volatile memory such as Random Access Memory (RAM). Particularly, the storage unit 130 stores the compressively encoded camera output image or scaled image output by the image processor 120 as a capture image. The storage unit may include a non-transitory computer-readable medium.

In the case of the terminal structured as shown in FIG. 18, the application processor 1810 performs the function of the controller of the image processor 120. The image processor 120 can be a structure as shown in any of FIGS. 2D, 4A to 4C, 6A to 6C, and 8A to 8C and further include a second multiplexer for multiplexing the viewing image output from the demultiplexer 255 and the output of the codec 260. The application processor 1810 includes a second demultiplexer for demultiplexing the viewing and capture images multiplexed by the second multiplexer of the image processor 120 and displays the demultiplexed viewing image and stores the demultiplexed capture image in the storage unit 130. The motion image codec 270 of the image processor 120 is capable of being included in the application processor 1810.

The terminal is capable of processing inbound/output bound calls and data communication services and the image taken by the camera unit 110 in the camera shot mode according to an exemplary embodiment of the present invention.

The application processor 1810 processes the camera output image processing applications according to an exemplary embodiment of the present invention and various other applications of the terminal.

In placing an outbound call, the user is capable of entering a phone number and a call placing request by means of the input unit 150, and upon detecting the request the control unit 1820 controls the communication unit 1830 to establish a communication path to perform outbound call processing with the base station. If an inbound call is received, the control unit 1820 detects this by means of the communication unit 1830, outputs an alarm sound by means of the audio processing unit 1840, and displays inbound call information by means of the display unit 140. If the user accepts the call by means of the input unit 150, the control unit 1820 controls the communication unit 1830 to establish the communication path for receiving the communication service. In the case of data communication, the communication path is established in the similar manner to the voice call.

The terminal is also capable of executing various applications. If the user requests for execution of a specific application by means of the input unit 150, the application processor 1810 executes the corresponding application and display the execution result on the screen of the display unit 140. If the user inputs the camera driving command, the application processor 1810 detects this and drives the camera unit 110 via the image processor 120. The image processor 120 establishes the viewing image processing path in the preview mode and the viewing and capture image processing paths alternately within one frame duration in a time divisional manner in the capture mode under the control of the application processor 1810.

At this time, the image processor 120 for processing the viewing image buffers the camera output image in the buffer 240 while converting the camera output image to the viewing image, processing the viewing image, and transfers the processed viewing image to the application processor 1810. The application processor 1810 controls the display unit 140 to display the viewing image. At this time, the viewing image processing is performed by the image processor 120 in such a way of pre-processing the camera output image, scaling the pre-processed camera output image to the viewing image, and post-processing the viewing image. The image processor 120 is also capable of scaling the camera output image to the viewing image and pre-processing and post-processing the viewing image. The image processor 120 is also capable of buffering the camera output image, scaling the buffered camera output image to the viewing image, and pre-processing and post-processing the viewing image. The image processor 120 is also capable of buffering the camera output image, pre-processing the buffered image, scaling the pre-processed image to the viewing image, and outputting the viewing image to the application processor 1810 such that the application processor 1810 displays the viewing image on the screen of the display unit 140.

In the image capture, the image processor 120 establishes the viewing image processing path and the capture image processing path in sequence in a time divisional manner within a frame duration under the control of the application processor 1810. The viewing image processing can be performed as described above. In processing the capture image, the image processor 120 selects the camera output image of a pre-designated frame among the buffered camera output images, pre-processes and post-processes the selected camera output image, and converts the processed image to the capture image under the control of the application processor 1810. At this time, the capture image processing procedure can be performed at the high clock rate and especially in unit of tile image. The viewing and capture images output by the image processor 120 in sequence in a time divisional manner are multiplexed and then supplied to the application processor 1810 such that the application processor 1810 demultiplexes the multiplexed viewing and capture images to display the viewing image on the screen of the display unit 140 and store the capture image in the storage unit.

The image processor 120 of the terminal includes the pre-processor 210; the image scaler 220; the post-processor 230; and the buffer 240 in any of FIGS. 2A to 2D, 4A to 4C, 6A to 6C, and 8A to 8C; The demultiplexer 255 and the still image codec 260 (including the combiner 600 when the capture image is processed in unit of tile image) can be integrated into the application processor 1810. In the case that image processor 120 is structured as above, the image processor 120 outputs the image (viewing image or viewing and capture images) output from the post-processor 230 to the application processor 1810 such that the application processor demultiplexes the post-processed image (viewing image or viewing and capture images) to display the viewing image on the screen of the display unit and encodes the capture image by means of the still image codec, the encoded capture image being stored in the storage unit 130. In the case that the camera output image is processed in units of tile images at the image processor 120, the application processor 1810 includes the combiner for combining the tile images output from the image processor into camera output image of one frame, which is encoded and then stored as compressed.

As described above, the camera device or camera-equipped terminal according to exemplary embodiments of the present invention is capable of processing the image acquired by the camera sensor at every frame to generate preview and capture images and to capture an image taken at the time capable of achieving zero shutter lag, thereby recording the zero shutter lag image. Also, the camera device or camera-equipped terminal according to exemplary embodiments of the present invention is capable of generating the capture image and preview image in time divisional manner with simplified image processing hardware configuration, thereby reducing power consumption of the camera device or camera-equipped terminal.

Although exemplary embodiments of the present invention have been described in detail hereinabove with specific terminology, this is for the purpose of describing particular exemplary embodiments of the present invention only and not intended to be limiting of the present invention. While particular exemplary embodiments of the present invention have been illustrated and described, it would be obvious to those skilled in the art that various other changes and modifications can be made without departing from the spirit and scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An image processing apparatus comprising:
    an image scaler which scales a camera output image so as to correspond to a viewing image;
    a buffer which buffers the camera output image;
    a multiplexer which multiplexes outputs of the image scaler and the buffer;
    an image processor which processes multiplexed images corresponding to the multiplexed outputs of the image scaler and the buffer;
    a demultiplexer which demultiplexes an output of the image processor so as to supply the viewing image to a display;
    a codec which encodes the camera output image output by the demultiplexer into a capture image; and
    a controller which controls the multiplexer and the demultiplexer in a time divisional manner within a frame duration such that the image processor processes the viewing and camera output image sequentially in a capture mode.

2. The apparatus of claim 1, wherein the image processor comprises a pre-processor which pre-processes the image and a post-processor which post-processes the pre-processed image.

3. The apparatus of claim 2, wherein the controller controls the multiplexer and the demultiplexer so as to establish a viewing image processing path in the preview mode, and
    wherein the viewing image generated by the image scaler is processed by the pre-processor and the post-processor and then output to the display.

4. The apparatus of claim 2, wherein the controller controls the multiplexer and the demultiplexer so as to establish a viewing image processing path and a capture image processing path sequentially in a time divisional manner within a frame duration in the capture mode, wherein the viewing image processing path comprises the image scaler generating the viewing image, the pre-processor and the post-processor for processing the viewing image, and the display unit for displaying the processed viewing image, and wherein the capture image processing path comprises the buffer from which a camera output image of a pre-designated frame is retrieved among the buffered camera output images, the pre-processor and the post-processor for processing the retrieved camera output image, and the codec for encoding the processed image into a capture image.

5. The apparatus of claim 4, wherein the camera output image of a pre-designated frame corresponds to the camera output image of the frame without shutter lag.

6. The apparatus of claim 5, further comprising a clock generator which generates one of a high clock rate and a low clock rate under control of the controller, wherein the clock generator supplies one of the high and low clock rates as an operation clock rate of the buffer, the pre-processor, and the post-processor.

7. The apparatus of claim 6, wherein the controller controls the clock generator to generate the low clock rate in the preview mode as the operation clock rate and to generate the high clock rate in the capture mode as the operation clock rate.

8. The apparatus of claim 5, further comprising a combiner for combining tile images processed by the post-processor into a frame image, wherein the controller reads out the camera output image of the pre-designated frame from the buffer in unit of tile image having a predetermined size in the capture mode, and wherein the combiner combines the post-processed tile images into the camera output image of one frame and outputs the combined image to the codec.

9. The apparatus of claim 8, wherein the controller controls the buffer to output one tile image per one frame duration in the capture mode, and wherein the image processor processes the one tile image for one frame duration.

10. The apparatus of claim 5, further comprising:

a clock generator which generates at least one of a high clock and a low clock under control of the controller; and a combiner which combines tile images processed by the post-processor into one frame image, wherein the controller controls the clock generator so as to generate the high clock in the capture mode, and reads the camera output image of a pre-designated frame from the buffer in unit of tile image, and wherein the combiner combines the post-processed tile images into the camera output image of one frame and outputs the camera output image to the codec.

11. The apparatus of claim 10, wherein the controller controls the clock generator to generate the low clock in the preview mode, and reads one tile image per one frame duration in the capture mode, and wherein the image processor processes the one time image for one frame duration.

12. The apparatus of claim 5, wherein the pre-processor performs dead pixel correction and lens shading correction on the image input, and wherein the post-processor performs color interpolation on the pre-processed image to generate a YUV image.

13. The apparatus of claim 5, wherein the image scaler corresponds to a resizer.

14. The apparatus of claim 5, wherein the image scaler corresponds to a summing and averaging part which sums and averages adjacent pixels of the camera output image to reduces a number of pixels to be fit for display on the display.

15. An image processing method of a camera, the method comprising:

processing a viewing image by controlling an image processor so as to establish a viewing image processing path, to buffer camera output images, and to convert at least one of the camera output images to at least one corresponding viewing image to be displayed; and processing a capture image by controlling the image processor so as to establish the viewing image processing path and a capture image processing path sequentially in a time divisional manner within a frame duration in a capture mode, and so as to process the viewing image on the viewing image processing path and a camera output image of a pre-designated frame which is selected among buffered camera output images on the capture image processing path, wherein the processing of the viewing image on the viewing image processing path comprises demultiplexing an output of the image processor.

16. The method of claim 15, wherein the processing of the capture image comprises:

establishing the viewing image processing path in the image processor;

buffering the camera output images;

converting the camera output images to the viewing image;

processing the viewing image;

displaying the viewing image;

establishing the capture image processing path in the image processor;

selecting the camera output image of the pre-designated frame from among the buffered camera output images;

processing the selected camera output image;

encoding the processed camera output image compressively; and storing the encoded image as the capture image.

17. The method of claim 16, wherein the processing of the viewing image comprises:

buffering the camera output images;

scaling at least one of the buffered images so as to correspond to at least one corresponding viewing image;

pre-processing the at least one corresponding viewing image; and post-processing the at least one pre-processed image.

18. The method of claim 16, wherein the processing of the viewing image comprises:

pre-processing at least one of the camera output images;

buffering at least one of the pre-processed image;

scaling at least one of the buffered images so as to correspond to the viewing image; and post-processing the viewing image.

19. The method of claim 16, wherein the processing of the viewing image comprises:

buffering at least one of the camera output images;

scaling at least one of the camera output image of a current frame so as to correspond to the viewing image among the at least one buffered camera output images;

pre-processing the viewing image; and post-processing the pre-processed image.

20. The method of claim 16, wherein the processing of the viewing image comprises:

buffering at least one of the camera output images;

pre-processing the camera output image of a current frame among the at least one of the buffered camera output images;
buffering the pre-processed image;
scaling the pre-processed image so as to correspond to the viewing image; and
post-processing the pre-processed image.

21. The method of claim 16, wherein the camera output image of the pre-designated frame is the camera output image without shutter lag.

22. The method of claim 16, further comprising supplying a high clock as an operation clock of the image processor in the capture mode.

23. The method of claim 16, further comprising supplying a low clock as an operation clock of the image processor in the preview mode.

24. The method of claim 16, wherein the processing of the capture image comprises:
reading out the camera output image of the pre-designated frame in a unit corresponding to a tile image, the camera output image being divided into plural equal size tile images;
combining post-processed tile images into the camera output image of one frame; and
supplying the camera output image to a codec.

25. The method of claim 24, wherein the reading out of the camera output image comprises reading out one tile image per one frame duration.

26. The method of claim 16, further comprising:
supplying a high clock as an operation clock of the image processor in the capture mode, wherein the processing of the capture image comprises:
reading out the camera output image of the pre-designated frame from a buffer in a unit corresponding to a tile image, the camera output image being divided into plural equal size tile images;
combining the post-processed tile images into the camera output image of one frame; and
outputting the combined camera output image to a codec.

27. A camera device comprising:
a camera which generates full resolution images in a camera driving mode;
a display which displays a viewing image;
an input unit which generates a preview mode signal and a capture mode signal;
a electronic storage which stores a capture image;
a controller which controls to establish a viewing image processing path in response to the preview mode signal and to establish the viewing image processing path and a capture image processing path sequentially in a time divisional manner in response to the capture mode signal within one frame duration; and
an image processor which:
in the preview mode:
establishes the viewing image processing path,
buffers the camera output image,
converts the camera output image to a viewing image,
processes the viewing image, and
outputs the processed viewing image to the display, and
in the capture mode:
establishes a viewing image processing path,
buffers the camera output images,
converts at least one of the camera output images to at least one corresponding viewing image,
processes the viewing image,
displays the processed viewing image on the display,
establishes a capture image processing path,
reads out the camera output image of a pre-designated frame among the buffered images,
processes the camera output image,
encodes the processed image to a capture image, and
stores the capture image in the electronic storage,
under the control of the control unit controller,
wherein the image processor comprises a demultiplexer which demultiplexes the post-processed image so as to form demultiplexed images.

28. The camera device of claim 27, wherein the image processor comprises:
a buffer which buffers the camera output images;
an image scaler which scales at least one of the camera output images so as to correspond to at the least one corresponding viewing image;
a multiplexer which multiplexes images output from the buffer and the image scaler;
a pre-processor which pre-processes the multiplexed image corresponding to the multiplexed outputs of the image scaler and the buffer;
a post-processor which post-processes a pre-processed image; and
a still image codec which encodes the post-processed camera output image compressively into the capture image,
wherein the demultiplexer supplies the demultiplexed images to the display and the still image codec,
wherein the preview mode is characterized such that the multiplexer selects the output of the image scaler and the demultiplexer connects the output of the post-processor to the display so as to establish the viewing image processing path, and
wherein the capture mode is characterized such that the viewing image processing path is established to process the viewing images, the multiplexer selects the output of the buffer, and the demultiplexer connects the output of the post-processor to the still image codec so as to establish the capture image processing path in a time divisional manner within one frame duration.

29. The camera device of claim 27, wherein the image processor comprises:
a pre-processor which preprocesses the camera output images;
a buffer which buffers the pre-processed image;
a image scaler which scales at least one of the buffered images so as to correspond to at least one corresponding viewing image;
a multiplexer which multiplexes the images output from the buffer and the image scaler;
a post-processor which post-processes the multiplexed image corresponding to the multiplexed outputs of the image scaler and the buffer; and
a still image codec which encodes the post-processed images into the capture image,
wherein the demultiplexer supplies the demultiplexed images to the display and the still image codec,
wherein the preview mode is characterized such that the multiplexer selects the output of the image scaler and the demultiplexer connects the output of the post-processor to the display so as to establish the viewing image processing path, and
wherein the capture mode is characterized such that the viewing image processing path is established to process the viewing images, the multiplexer selects the output of the buffer, and the demultiplexer connects the output of the post-processor to the still image codec so as to establish the capture image processing path in a time divisional manner within one frame duration.

30. The camera device of claim 27, wherein the image processor comprises:
a buffer which buffers the camera output images;
an image scaler which scales the camera output image of a pre-designated frame among the buffered images so as to correspond to a viewing image;
a multiplexer which multiplexes the images output from the buffer and the image scaler;
a pre-processor which pre-processes the multiplexed image corresponding to the multiplexed outputs of the image scaler and the buffer;
a post-processor which post-processes the pre-processed image; and
a still image codec which encodes the post-processed image into a capture image,
wherein the demultiplexer supplies the demultiplexed images to the display and the still image codec,
wherein the preview mode is characterized such that the multiplexer selects the output of the image scaler and the demultiplexer connects the output of the post-processor to the display so as to establish the viewing image processing path, and
wherein the capture mode is characterized such that the viewing image processing path is established to process the viewing images, the multiplexer selects the output of the buffer, and the demultiplexer connects the output of the post-processor to the still image codec so as to establish the capture image processing path in a time divisional manner within one frame duration.

31. The camera device of claim 27, wherein the image processor comprises:
a buffer which buffers the camera output images;
a pre-processor which pre-processes at least one image output from the buffer;
an image scaler which scales the pre-processed image so as to correspond to a viewing image;
a multiplexer which multiplexes the images output from the pre-processor and the image scaler;
a post-processor which post-processes the multiplexed image corresponding to the multiplexed outputs of the image scaler and the buffer; and
a still image codec which encodes the post-processed image into the capture image,
wherein the demultiplexer supplies the demultiplexed images to the display and the still image codec,
wherein the preview mode is characterized such that the multiplexer selects the output of the image scaler and the demultiplexer connects the output of the post-processor to the display so as to establish the viewing image processing path, and
wherein the capture mode is characterized such that the viewing image processing path is established to process the viewing images, the multiplexer selects the output of the buffer, and the demultiplexer connects the output of the post-processor to the still image codec so as to establish the capture image processing path in a time divisional manner within one frame duration.

32. A portable terminal comprising:
a camera which generates full resolution images in a camera driving mode;
a display which displays a viewing image;
an input unit which generates a preview mode signal and a capture mode signal;
a electronic storage which stores a capture image;
an application processor which processes applications of the portable terminal, controls to establish a viewing image processing path in response to a camera preview mode signal, and controls to establish the viewing image processing path and a capture image processing path sequentially within a frame duration in a time divisional manner in response to a camera capture mode signal;
a controller which controls a transceiver for communication of the terminal and communicates with the application processor; and
an image processor which:
in the preview mode:
establishes the viewing image processing path,
buffers the camera output image,
converts the camera output image to a viewing image,
processes the viewing image, and
outputs the processed viewing image to the display; and
in the capture mode:
establishes a viewing image processing path,
buffers the camera output images,
converts at least one of the camera output images to at least one corresponding viewing image,
processes the viewing image,
displays the processed viewing image on the display unit,
establishes a capture image processing path,
reads out the camera output image of a pre-designated frame among the buffered images,
processes the camera output image,
encodes the processed image to a capture image, and
stores the capture image in the electronic storage, under the control of the application processor,
wherein the image processor comprises a demultiplexer which demultiplexes the post-processed image so as to form demultiplexed images.

33. The portable terminal of claim 32, wherein the image processor comprises:
a buffer which buffers the camera output images;
an image scaler which scales at least one of the camera output images so as to correspond to the at least one corresponding viewing image;
a multiplexer which multiplexes images output from the buffer and the image scaler;
a pre-processor which pre-processes the multiplexed image corresponding to the multiplexed outputs of the image scaler the buffer;
a post-processor which post-processes a pre-processed image; and
a still image codec which encodes the post-processed camera output image compressively into the capture image,
wherein the demultiplexer supplies the demultiplexed images to the display and the still image codec,
wherein the preview mode is characterized such that the multiplexer selects the output of the image scaler and the demultiplexer connects the output of the post-processor to the display so as to establish the viewing image processing path, and
wherein the capture mode is characterized such that the viewing image processing path is established to process the viewing images, the multiplexer selects the output of the buffer, and the demultiplexer connects the output of the post-processor to the still image codec so as to establish the capture image processing path in a time divisional manner within one frame duration.

34. The portable terminal of claim 32, wherein the image processor comprises:

a pre-processor which preprocesses the camera output images:

a buffer which buffers the pre-processed image;

a image scaler which scales at least one of the buffered images so as to correspond to at least one corresponding viewing image;

a multiplexer which multiplexes the images output from the buffer and the image scaler;

a post-processor which post-processes the multiplexed image corresponding to the multiplexed outputs of the image scaler and the buffer; and a still image codec which encodes the post-processed images into the capture image, wherein the demultiplexer supplies the demultiplexed images to the display and the still image codec, wherein the preview mode is characterized such that the multiplexer selects the output of the image scaler and the demultiplexer connects the output of the post-processor to the display so as to establish the viewing image processing path, and wherein the capture mode is characterized such that the viewing image processing path is established to process the viewing images, the multiplexer selects the output of the buffer, and the demultiplexer connects the output of the post-processor to the still image codec so as to establish the capture image processing path in a time divisional manner within one frame duration.

35. The portable terminal of claim 32, wherein the image processor comprises:

a buffer which buffers the camera output images;

an image scaler which scales the camera output image of a pre-designated frame among the buffered images so as to correspond to a viewing image;

a multiplexer which multiplexes the images output from the buffer and the image scaler;

a pre-processor which pre-processes the multiplexed image corresponding to the multiplexed outputs of the image scaler and the buffer;

a post-processor which post-processes the pre-processed images; and a still image codec which encodes the post-processed image into a capture image, wherein the demultiplexer supplies the demultiplexed images to the display and the still image codec, wherein the preview mode is characterized such that the multiplexer selects the output of the image scaler and the demultiplexer connects the output of the post-processor to the display so as to establish the viewing image processing path, and wherein the capture mode is characterized such that the viewing image processing path is established to process the viewing images, the multiplexer selects the output of the buffer and the demultiplexer connects the output of the post-processor to the still image codec so as to establish the capture image processing path in a time divisional manner within one frame duration.

36. The portable terminal of claim 32, wherein the image processor comprises:

a buffer which buffers the camera output images;

a pre-processor which pre-processes at least one image output from the buffer;

an image scaler which scales the pre-processed image so as to correspond to a viewing image;

a multiplexer which multiplexes the images output from the pre-processor and the image scaler;

a post-processor which post-processes the multiplexed image corresponding to the multiplexed outputs of the image scaler and the buffer; and a still image codec which encodes the post-processed image into the capture image, wherein the demultiplexer supplies the demultiplexed images to the display and the still image codec, wherein the preview mode is characterized such that the multiplexer selects the output of the image scaler and the demultiplexer connects the output of the post-processor to the display so as to establish the viewing image processing path, and wherein the capture mode is characterized such that the viewing image processing path is established to process the viewing images, the multiplexer selects the output of the buffer, and the demultiplexer connects the output of the post-processor to the still image codec so as to establish the capture image processing path in a time divisional manner within one frame duration.

* * * * *